US009146644B2

(12) United States Patent
Hershman et al.

(10) Patent No.: US 9,146,644 B2
(45) Date of Patent: Sep. 29, 2015

(54) SYSTEMS AND METHODS FOR DETECTING MULTIPLE TOUCH POINTS IN SURFACE-CAPACITANCE TYPE TOUCH PANELS

(75) Inventors: Ziv Hershman, Givat Shmuel (IL); Ilia Stolov, Holon (IL); Einat Nosovitsky, Herzliya (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 568 days.

(21) Appl. No.: 13/533,618

(22) Filed: Jun. 26, 2012

(65) Prior Publication Data

US 2012/0262419 A1     Oct. 18, 2012

Related U.S. Application Data

(63) Continuation-in-part of application No. 13/042,965, filed on Mar. 8, 2011, now Pat. No. 8,872,788.

(60) Provisional application No. 61/645,349, filed on May 10, 2012, provisional application No. 61/521,027, filed on Aug. 8, 2011, provisional application No. 61/311,440, filed on Mar. 8, 2010.

(51) Int. Cl.
*G06F 3/044* (2006.01)

(52) U.S. Cl.
CPC ...... *G06F 3/044* (2013.01); *G06F 2203/04104* (2013.01)

(58) Field of Classification Search
CPC ....... G06F 3/044; G06F 3/0416; G06F 3/041; G06F 3/0412; G06F 2203/04104; G09G 5/006

USPC ............... 345/173–178; 178/18.01–18.11
See application file for complete search history.

(56) References Cited

U.S. PATENT DOCUMENTS

| 5,825,352 | A   | * | 10/1998 | Bisset et al. .............. 345/173 |
| 6,188,391 | B1  |   | 2/2001  | Seely et al. |
| 6,222,528 | B1  |   | 4/2001  | Gerpheide et al. |
| 6,297,811 | B1  |   | 10/2001 | Kent et al. |
| 7,129,935 | B2  |   | 10/2006 | Mackey |
| 7,218,124 | B1  |   | 5/2007  | Mackey et al. |
| 7,292,859 | B2  |   | 11/2007 | Park |
| 7,797,115 | B2  |   | 9/2010  | Tasher et al. |
| 8,203,538 | B2  | * | 6/2012  | Lin et al. .............. 345/174 |

(Continued)

FOREIGN PATENT DOCUMENTS

WO    WO 2008/108514 A1    9/2008
WO    WO 2010/079393 A1    7/2010

OTHER PUBLICATIONS

U.S. Appl. No. 13/042,965, filed Mar. 8, 2011, Ilia Stolov et al.

(Continued)

*Primary Examiner* — Dmitriy Bolotin
(74) *Attorney, Agent, or Firm* — Oliff PLC

(57) ABSTRACT

A multi touch sensing module comprising a plurality of electrically conductive touch surfaces, each connected to at least one trace, wherein the touch surfaces are arranged in more than two columns, each including more than two touch surfaces, wherein touch surfaces in corresponding positions in said columns form staggered rows, and all touch surfaces reside in a single layer of electrically conductive material.

29 Claims, 36 Drawing Sheets

(56) References Cited

U.S. PATENT DOCUMENTS

| | | | |
|---|---|---|---|
| 8,462,127 | B2 | 6/2013 | Chiu et al. |
| 8,493,355 | B2 | 7/2013 | Geaghan et al. |
| 8,525,799 | B1 | 9/2013 | Grivna et al. |
| 2005/0270039 | A1 | 12/2005 | Mackey |
| 2006/0097991 | A1* | 5/2006 | Hotelling et al. ............ 345/173 |
| 2008/0074398 | A1 | 3/2008 | Wright |
| 2009/0002337 | A1* | 1/2009 | Chang ......................... 345/174 |
| 2009/0085894 | A1* | 4/2009 | Gandhi et al. ................ 345/175 |
| 2009/0267916 | A1* | 10/2009 | Hotelling ..................... 345/174 |
| 2009/0314621 | A1* | 12/2009 | Hotelling ..................... 200/600 |
| 2010/0001973 | A1* | 1/2010 | Hotelling et al. ............ 345/174 |
| 2010/0013800 | A1* | 1/2010 | Elias et al. .................... 345/178 |
| 2010/0144391 | A1* | 6/2010 | Chang et al. ................. 455/566 |
| 2010/0149108 | A1* | 6/2010 | Hotelling et al. ............ 345/173 |
| 2011/0017523 | A1 | 1/2011 | Bulea et al. |
| 2011/0062969 | A1 | 3/2011 | Hargreaves et al. |
| 2011/0062971 | A1 | 3/2011 | Badaye |
| 2011/0157083 | A1* | 6/2011 | Hershman et al. ............ 345/174 |
| 2011/0216038 | A1 | 9/2011 | Stolov et al. |
| 2012/0162109 | A1* | 6/2012 | Sasaki .......................... 345/173 |
| 2013/0300707 | A1* | 11/2013 | Hershman ..................... 345/174 |

OTHER PUBLICATIONS

U.S. Appl. No. 13/855,911, filed Apr. 3, 2013, Ziv Hershman.

R. Seguine, "Capacitive sensing techniques and considerations—The basics" http://www.eetimes.com/design/automotive-design/4016274/Capacitive-sensing-techniques-and-considerations-The-basics, (2007).

Wikipedia article, "Capacitive Sensing" http://en.wikipedia.org/w/index.php?title=Capacitive_sensing&oldid=491422295, (2012).

* cited by examiner

Fig. 13

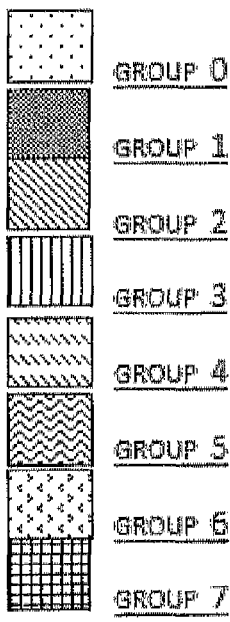
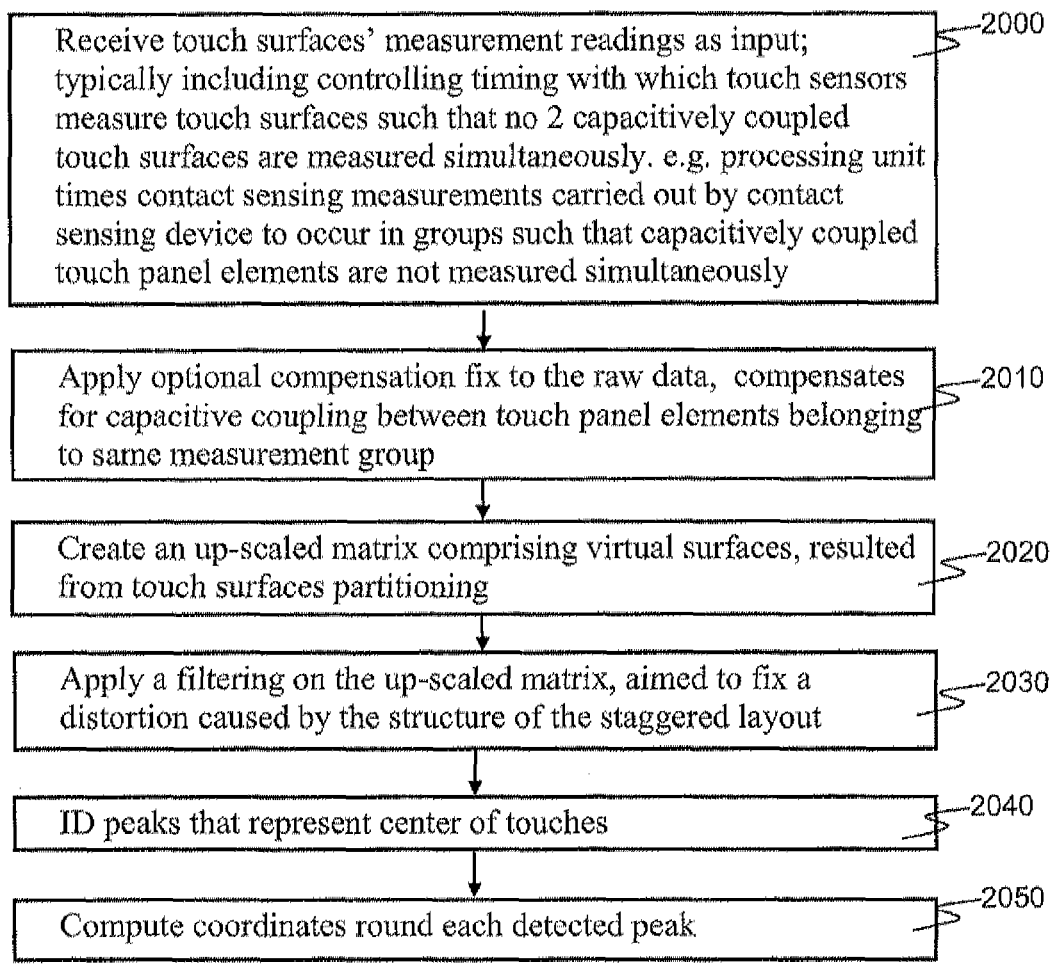
Fig. 16b
Fig. 17

Staggered         Virtual touch

|     |     |     |     |
|-----|-----|-----|-----|
|     | P1h | P2h |     |
|     | P1  | P2  |     |
|     | P1l | P2l |     |
|     |     |     |     |

|     |     |     |     |
|-----|-----|-----|-----|
|     | 90  | 95  |     |
|     | 100 | 98  |     |
|     | 50  | 50  |     |
|     |     |     |     |

*Original matrix fragment*          *search area matrix*

| l4  | m4 | r4 |
|-----|----|----|
| l3  | m3 | r3 |
| l2  | m2 | r2 |
| l1  | m1 | r1 |
| l0  | p  | r0 |
| L1  | M1 | R1 |
| L2  | M2 | R2 |
| L3  | M3 | R3 |
| L4  | M4 | R4 |

| l4+m4+r4 |
|----------|
| l3+m3+r3 |
| l2+m2+r2 |
| l1+m1+r1 |
| l0+p+r0  |
| L1+M1+R1 |
| L2+M2+R2 |
| L3+M3+R3 |
| L4+M4+R4 |

```
┌─────────────────────────────────────────────────────────────┐
│ Filter the matrix to form a 31x13 virtual sensors; typically │
│ including splitting the sensor readings between the two vertical │
│ halfs using horizontal sensors reading weights, using        │
│ Half_sensor_weight = 4*min(right_neighb,left_neighb) +       │
│         1*max(right_neighbor,left_neighbor)                  │
└─────────────────────────────────────────────────────────────┘
                              │  2610
                              ▼
┌─────────────────────────────────────────────────────────────┐
│ On the filtered matrix, find primary peaks based on direct 4 │
│            neighbors max (up,down,left,right)                │
└─────────────────────────────────────────────────────────────┘
                              │  2620
                              ▼
┌─────────────────────────────────────────────────────────────┐
│ Find the width (X) and height (Y) of each primary peak based │
│ on the number of descending sensors above '0' at each side on │
│                        each axis                             │
└─────────────────────────────────────────────────────────────┘
                              │  2630
                              ▼
┌─────────────────────────────────────────────────────────────┐
│ Sort peaks according to their filtered sensors reading       │
└─────────────────────────────────────────────────────────────┘
                              │  2640
                              ▼
┌─────────────────────────────────────────────────────────────┐
│ Legalize peaks: Scan sensors from high reading to low reading,│
│       high sensors may 'remove' low sensor if:               │
│                  // Regular case                             │
│              { DeltaX <=1  &  DeltaY <=1 }                   │
│                        OR                                    │
│       // One of the sensors is considered 'wide' case:       │
│     { DeltaX <=2  &  DeltaY <=1 & ( (WidhtX1 >=5 &           │
│   WidthY1 >=4 ) OR (WidhtX1 >=5 & WidthY1 >=4 ) ) }          │
└─────────────────────────────────────────────────────────────┘
                              │  2650
                              ▼
                    to Fig. 26b, step 2660
```

Fig. 26a from Fig. 26a, step 2650

For each legal peak, get a search area for a secondary peak.
a. Sum the peak column with the two adjacent columns
b. Take the portion which does not overlap with other peaks

―2660

Refine peak Y location (same, one above or one below), by max grade (higher grade, also termed herein "stronger") criteria:
Grade = $z[n] - (z[n-1]+z[n+1])/2$

―2670

Find secondary peak (if exists) within this summed column portion, above and below the primary peak. Typically: Assume the following summed column with several elements E1 ... E5. E2 is the primary peak (it is symmetrical, e.g., when E4 is the primary peak); and if ALL the following conditions are true, a secondary peak is detected at E4:
   i. $E5*3+E4 > E2$
   ii. $E3 >= E4$
   iii. $E4 >= E5$
   iv. $E3 * (E4-E5) / (E4-E5 + E2-E1) < E4$

―2680

Legalize peaks (e.g. as above).

```
{
    for (j=1; j<(INT16)numPeaks; j++)
    {
        key = array[j];
        i   = j-1;

while(i>=0)
        {
            if (DETECTION_PeakCompare(&array[i],
&key) < 0)
            {
                array[i+1] = array[i];
                i--;
            }
            else
            {
                break;
            }
        } array[i+1] = key;
    }
}
```

Fig. 35

SYSTEMS AND METHODS FOR DETECTING MULTIPLE TOUCH POINTS IN SURFACE-CAPACITANCE TYPE TOUCH PANELS

REFERENCE TO CO-PENDING APPLICATIONS

The present application is a continuation-in-part of co-owned U.S. Ser. No. 13/042,965, filed 8 Mar. 2011 and entitled "System And Methods For Using Capacitive Surface For Detecting Multiple Touch Points . . . ".

Priority is claimed from U.S. provisional application No. 61/521,027, entitled "Layouts For Detecting Multiple Touch Points . . . " and filed 8 Aug. 2011.

Priority is claimed from U.S. provisional application No. 61/645,349, entitled "Systems And Methods For Capacitive Touch Detection" and filed 10 May 2012.

FIELD OF THE INVENTION

The present invention relates generally to touch panels and more particularly to capacitive touch sensor arrays.

BACKGROUND OF THE INVENTION

According to Wikipedia, capacitive sensing is a technology for detecting proximity, position, etc., based on capacitive coupling effects.

Two-directional (or two-way) capacitive surface scans, implemented by row and column sensors, are known in the art.

According to Wikipedia, "A capacitive touchscreen panel consists of an insulator such as glass, coated with a transparent conductor such as indium tin oxide (ITO) . . . . As the human body is also an electrical conductor, touching the surface of the screen results in a distortion of the screen's electrostatic field, measurable as a change in capacitance. Different technologies may be used to determine the location of the touch. The location is then sent to the controller for processing."

Co-pending United States Patent Application 20110216038, entitled "Systems And Methods For Detecting Multiple Touch Points In Surface-Capacitance Type Touch Panels", is published (8 Sep. 2011).

Nuvoton's Touch sensing module is hardware operative to perform measurements of touch sensors connected to touch surfaces placed on a touch panel. The touch panel may then be placed on top of a phone or tablet's screen.

The disclosures of all publications and patent documents mentioned in the specification, and of the publications and patent documents cited therein directly or indirectly, are hereby incorporated by reference.

SUMMARY OF THE INVENTION

The following terms may be construed either in accordance with any definition thereof appearing in the prior art literature or in accordance with the specification, or as above.
Active Area: The area of the touch panel which, when touched, results in detection of the touch.
Active area terminals: Points located on the active area perimeter and on traces connecting the active area with the touch panel terminals.
Capacitive sensor, touch sensor or Sensor: unit e.g. sampling logic that measures capacitance of exactly one touch surface.
Electro-conductive shapes: see "touch shape"
LCD: Display using LCD technology, (display). Commercially available liquid crystal displays are distributed inter alia by Samsung, LG, Philips.
Linear array: a row or column or diagonal of diamonds (or other electro-conductive shapes) extending along a portion of, or all of the relevant dimension (x, y or diagonal) of the touch panel.
Main processor: The main processing unit of a system in which the touch module, panel or screen resides. For PCs, the distributor may for example be Intel; for Smartphone and tablets the distributor may for example be Samsung, TI, nVidia, Qualcomm.
Neighbors: touch surfaces that are adjacent to an individual touch surface on the touch panel, either vertically, horizontally or diagonally.
"Overlies," "touches", "come into contact" and "activates" are used generally interchangeably to describe contact or proximity between a finger and at least a portion of (i.e. some or all of) a touch surface or diamond.
Peak: an approximate location of a touch induced by a touching object, for example, computed as described in step 2040 of FIG. 17.
Pitch: The distance between two adjacent objects, typically from center to center.
Surface pitch: The distance from center to center of two adjacent touch surfaces along one axis.
Row pitch: The distance from center to center of two adjacent touch surfaces on the same column.
Column pitch: The distance from center to center of two adjacent columns of touch surfaces
Raw Data: all the sensors readings of sensors connected to touch surfaces on the current touch panel
Sensor Reading: value measured by the sampling logic of a capacitive sensor representing touch intensity
Set of shapes: diamonds (or any other shapes) which need not necessarily be disposed adjacently to one another.
Staggered layout: e.g. as in FIG. 13, a layout in which most or all touch surfaces are arranged in linear arrays e.g. columns and the vertical locations of the center of masses of the touch surfaces are staggered between the columns such that vertical locations of center of masses of touch surfaces in any individual column are slightly above (or below) vertical locations of center of masses of closest touch surfaces in adjacent columns of the linear array. So for example, the vertical location of the center of mass (e.g. y-coordinate) of any one of most of the touch surfaces in one column may be half a touch surface's height away from (distant from) the vertical location of the center of mass of the closest touch surface in an adjacent column. For example, the E surfaces' layer of the "Zipper"-type layout of FIGS. 1*a*-1*b* constitutes a staggered layout.
Staggering level: Number of different offsets which each column might have (assuming columns are mutually staggered). For example, in two level staggering (FIGS. 5*a* and 5*b*), the first "complete" touch surface in a column (from bottom e.g.) may start right at the bottom of the touch panel or at ½ the height of a touch surface. In contrast, in three level staggering (FIG. 5*c*), the first complete touch surface in a column (from bottom e.g.) may start right at the bottom of the touch panel, at ⅓ the height of a touch surface or at ⅔ the height of a touch surface. A "complete" touch surface is a fully sized touch surface as opposed e.g. to a touch surface adjacent an edge of a touch panel which may be truncated. Typically most touch surfaces in a touch panel are complete. The height of a touch surface refers here to the vertical distance between the lowest point of a complete touch surface to the lowest point of the touch surface above it.

Storage device: device for storing computer data such as but not limited to DRAM Substrate: insulator e.g. glass, over which the touch surfaces and traces may be disposed Touch capacitive device: capacitive measurement device: a set of capacitive sensors serving an entire touch panel.

Touch controller: sensing device and a processing unit. If the touch controller resides on a chip, the total 'processing unit' serving the touch panel may be distributed between the chip and a main processor. Distributors include Cypress Atmel, ELAN, Synaptics, Melfas.

Touch layout or Layout: a geometric positioning of touch surfaces in a touch panel.

Frameless layout: a touch layout whose touch surfaces border with at least three sides of the touch panel active area and their connecting traces extend beyond the active area of the touch panel from only one side.

Touch module: touch panel+controller+interconnect (e.g. flex). Commercially available touch modules are distributed inter alia by Samsung, WTK, TPK, YFO, AUO, HSD.

Touching object: an object that touches the touch panel (e.g. finger, stylus, copper rod)

Touch panel or capacitive surface: touch pad or track pad or touch screen including a multiplicity of electrically conductive shapes e.g. polygons such as quadrilaterals e.g. diamonds (90 degree angles, 4 equal sides) or even circles. Commercially available touch screens are distributed inter alia by Samsung, WTK, TPK, YFO, AUO, HSD.

Touch-surface device: Touch panel

Touch panel element: Touch surface and a Trace connecting the touch surface to a touch sensor, a contact sensing device (also termed herein "sensing device") or to a touch panel terminal. For touchscreen application, the touch panel element is typically implemented by "transparent conductor" patterning.

Touch panel terminals: Pads on the touch panel via which the touch sensors may be connected to the touch panel elements.

Touch shape: an electrically conductive shape at least one of which forms a touch surface. It is appreciated that any suitable geometrical shape may be employed, such as but not limited to "diamonds" e.g. as shown in FIGS. 1a-4b, or "rectangles" e.g. as shown in the staggered layout of FIG. 13 or other shapes as shown in FIGS. 31a-31c. Each "diamond" typically includes a quadrangle e.g. square, whose sides are oriented diagonally vis a vis the sides (axes) of the typically rectangular touch panel. Each "rectangle" typically includes a quadrangle e.g. rectangle e.g. square, whose sides are oriented parallel vis a vis the sides (axes) of the typically rectangular touch panel.

Touch surface or E surface: a set of one or more electroconductive shapes (also referred to as touch shapes) e.g. diamonds connected to (shorted to) a single unit that measures capacitance. It is appreciated that here and throughout the specification, mutatis mutandis, any suitable triangle, quadrilateral or other shape can be used to replace the diamonds provided in the illustrated embodiment and mentioned in the present description, by way of example.

Traces: electrical connections e.g. connecting wires between touch shapes, touch surfaces, touch panel terminals and touch sensors.

Self-capacitance or surface-capacitance: a capacitance measurement method that measures the capacitance of an object and does not require separate drive and sense electrodes, in contrast to mutual capacitance measurement methodology.

Certain embodiments of the present invention seek to provide single-layer touch panel layouts and a multi-touch detection apparatus operative in conjunction therewith.

Certain embodiments of the present invention seek to provide a multi touch sensing module including a touch panel, a contact sensing device including touch sensors, and a processing unit, the touch panel including an insulating substrate e.g. glass, and touch panel elements each comprising a touch surface and a trace connecting the touch surface to the contact sensing device or to the touch panel terminal, the processing unit being operative to initiate measurement operations of the contact sensing device which result in results also termed herein "sensor readings", and to apply a computational detection method for deriving multiple locations at which respective multiple touch objects have touched the touch panel. Typically, the touch panel elements are all included in a single layer, rather than in multiple layers as in conventional systems, thereby to reduce manufacturing costs.

The processing unit typically performs some or all of:
  initiates measurements of capacitance of touch surfaces, by sensing device
  receives the sensor readings from the sensing device
  resolves the locations of touch objects
  Also provided are:
  A capacitive surface design that enables the detection of the locations of multiple touch objects using a combination of row and column sensors and several isolated surfaces evenly distributed across the touch-surface device, referred to as encapsulated surfaces or encapsulated sensors.

An apparatus and a method for resolving locations of multiple touches on a touch-surface device. The method may include detecting a number of touches on the touch-surface device, and resolving locations of multiple touches on the touch-surface device.

The apparatus may include a set of sensor elements disposed on a two-directional surface and a set of encapsulated isolated surfaces connected to additional sensors.

A touch-surface device ambiguity resolution method, comprising detecting the presence of a plurality of substantially simultaneous touches on a touch-surface device at respective locations on the touch-surface device; and resolving locations of multiple substantially simultaneous touches of the plurality of substantially simultaneous touches on the touch-surface device.

A touch-surface device ambiguity resolution method as above, wherein resolving locations comprises: sensing the presence of conductive objects on a two-directional surface of the touch-surface device; sensing for the presence of conductive objects near encapsulated surfaces of the touch-surface device; and determining locations of sensed presences by the two-directional surface and the encapsulated surfaces.

A touch-surface device ambiguity resolution method as above wherein resolving locations comprises: sensing for the presence of conductive objects on a two-directional surface of the touch-surface device; sensing for the presence of conductive objects near groups e.g. arrays of encapsulated surfaces of the touch-surface device; and determining locations of sensed presences by the two-directional surface and the encapsulated surfaces.

A touch-surface device ambiguity resolution method as above wherein weighted average, quadratic parabola function (examples) of the measured sensors weights is used to determine the locations of the sensed presences.

A touch-surface device ambiguity resolution method as above wherein a weighted average of the measured sensors weights is used to determine the locations of the sensed presences.

A touch-surface device ambiguity resolution method as above wherein resolving the number of actual touches comprises: sensing for presences of conductive objects on the encapsulated surfaces of the touch-surface device.

A surface-capacitance-based multi-touch touch panel apparatus including:

a. A touch panel having dimensions L, K respectively along first and second axes respectively and including a multiplicity of electrically conductive shapes, the touch panel including:
   i. At least one row touch surface comprising a subset of the multiplicity of shapes arranged in a row along the first axis wherein all shapes in the subset are connected to a row-specific capacitive sensor; and
   ii. A plurality of approximate position-indicative touch surfaces, wherein each approximate position-indicative touch surface's dimensions along the first and second axes respectively are less than L and K respectively, and wherein the plurality of approximate position indicative touch surfaces are respectively uniquely connected to a respective plurality of approximate position indicative capacitive sensors; and b. A response analyzer operative to identify an approximate location of each touch along both of the axes, based on at least one response obtained from at least one of the approximate position indicative touch surfaces, to refine at least one component, along at least one of the first and second axes, of the approximate location using at least one response obtained from the at least one row touch surface, and to output a refined location for the touch along both of the axes, accordingly.

The present invention typically includes at least the following embodiments:

Embodiment 1

A multi touch sensing module comprising:
a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material.

Embodiment 2

The module of embodiment 1 wherein most of the touch surfaces are substantially longer along one dimension than along another dimension. For example, the electrically conductive touch surfaces may satisfy:

1.2<={row pitch}/{column pitch}

Embodiment 3

The module of embodiment 1 or 2, wherein most traces pass between, rather than through, touch surfaces.

Embodiment 4

The module of embodiment 2 wherein the touch surfaces have axes and the touch surfaces are staggered such that the axes of at least most of the touch surfaces define a ratio between them which is equal, order of magnitude, to a staggering level defined by said staggered touch surfaces.

Embodiment 5

The module of embodiment 2 or 4 wherein the electrically conductive touch surfaces satisfy:

0.6*{stagger level}<={row pitch}/{column pitch}<=1.8*{stagger level}).

Embodiment 6

The module of embodiment 1 or 2 or 3 wherein said rows have a staggering level equal to 2.

Embodiment 7

The module of embodiment 1 or 2 or 3 wherein the touch surfaces are rectangular.

Embodiment 8

The module of embodiment 1 or 2 or 3 and also comprising:
a contact sensing device including touch sensors operative to sense contact between a touching object and at least one of the plurality of electrically conductive touch surfaces; and
a processing unit, connected to the contact sensing device, which is operative for: reading self-capacitance measurements generated by the contact sensing device, and resolving the touch sensor measurements into multiple locations of respective multiple objects which have come into contact with the touch surfaces.

Embodiment 9

The module of embodiment 8 wherein the processing unit times contact sensing measurements carried out by the contact sensing device to occur in groups such that capacitively coupled touch panel elements are not measured simultaneously.

Embodiment 10

The module of embodiment 8 in which the processing unit adjusts at least one individual touch sensor reading to compensate for known capacitive coupling effects of adjacent touch panel elements on the individual touch sensor reading.

Embodiment 11

The module of embodiment 8 wherein said resolving comprises compensating for possible distortion caused by staggering between linear arrays of touch surfaces, by converting readings of sensors connected to touch surfaces into a matrix of computed theoretical capacitance readings of virtual surfaces partitioned from the touch surfaces to form non-staggered rows of surfaces.

Embodiment 12

The module of embodiment 8 wherein said resolving comprises identifying sensed peaks on the touch panel.

Embodiment 13

The module of embodiment 12 wherein said identifying comprises finding peaks which represent possible touches and applying a peak removal test to filter out peaks that do not represent real touches.

Embodiment 14

The module of embodiment 12 wherein a peak splitting procedure is applied.

Embodiment 15

The module of embodiment 12 wherein computing coordinates of each individual peak comprises, for each coordinate along an x or y axis:

computing a weighted average of sensor readings generated by the touch sensors adjacent said individual peak where the weight of each sensor reading comprises a coordinate of a center of the sensor along said axis.

Embodiment 16

The module of embodiment 8 or 11 or 12 or 15 in which the processing unit computes X and Y coordinates of peaks using sets of virtual surfaces partitioned from the touch surfaces to form non-staggered rows of surfaces, and wherein more rows of virtual surfaces than columns of virtual surfaces are used for X coordinate computation, and more columns of virtual surfaces than rows of virtual surfaces are used for Y coordinate computation.

Embodiment 17

The module of embodiment 16 wherein within rows and columns used for coordinate computation, at least one almost-adjacent virtual surface around a peak is used only if the almost-adjacent surface's value is lower than or equal to a more directly-adjacent virtual surface around the peak.

Embodiment 18

The module of embodiment 1 or 2 or 3 wherein the traces extend beyond the active area of the touch panel only on one side of the touch panel and not on any side of the touch panel other than said one side.

Embodiment 19

The module of embodiment 1 or 2 or 3 wherein the portion of the traces connecting each of at least most of the touch surfaces with a corresponding active area terminal, are routed in non-straight lines such as a sequence of straight segments.

Embodiment 20

The module of embodiment 1 or 2 or 3 wherein the portion of the traces connecting each of at least most of the touch surfaces with a corresponding active area terminal, are routed in straight lines.

Embodiment 21

A method for multi touch sensing comprising:
providing a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material; and
employing a processing unit which utilizes self-capacitance measurements for resolving multiple locations of multiple objects which have come into contact with the touch panel.

Embodiment 22

The method of embodiment 21 wherein most of the touch surfaces are substantially longer along one dimension than along another dimension.

Embodiment 23

The method of embodiment 21 wherein all traces pass between, rather than through, touch surfaces.

Embodiment 24

A computer program product, comprising a non-transitory tangible computer readable medium having computer readable program code embodied therein, said computer readable program code adapted to be executed to implement a touch detection method operative in conjunction with a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material, said method comprising:
reading self-capacitance measurements and resolving the touch sensor measurements into multiple locations of respective multiple objects which have come into contact with the touch surfaces,
wherein said resolving comprises
partitioning virtual surfaces from the touch surfaces to form non-staggered rows of surfaces; and
compensating for possible distortion caused by staggering between linear arrays of touch surfaces, by converting readings of sensors connected to touch surfaces into a matrix of computed theoretical capacitance readings of the virtual surfaces.

Embodiment 25

Apparatus according to embodiment 24 residing in a processing unit.

Embodiment 26

A method according to embodiment 21 wherein at least most of the touch surfaces each have a first axis and a second, Y axis longer than the first axis, and wherein a peak is deemed to be indicative of two close touch objects along a single column arranged along the second axis, rather than being indicative of a single touch object, if a touch detection topology characterized by a long flat plateau with sharp slopes along the second axis and a much shorter plateau, ruling out a thumb or wide single object, along the first axis, is detected. The touch detection topology may for example result from the filtered virtual readings of the touch surfaces surrounding a peak touch surface value as depicted in FIG. 36, or from the selected sensor and his neighbors as depicted in FIG. 10a.

Embodiment 27

The module of embodiment 13 wherein at least one first peak which is adjacent to a second peak with a higher grade than the first peak, is filtered out.

Embodiment 28

The module of embodiment 8 wherein said resolving comprises using image processing.

Embodiment 29

The module of embodiment 8 wherein said resolving comprises using polynomial approximation.

There is thus further provided, in accordance with at least one embodiment of the present invention, an apparatus wherein the multiplicity of shapes are spaced, thereby to define boundary areas between adjacent ones of the multiplicity of shapes and wherein the approximate position indicative touch surface covers at least some of the boundary areas.

There is thus yet further provided, in accordance with at least one embodiment of the present invention, an apparatus wherein each approximate position indicative touch surface, corresponding to a respective one of the plurality of approximate position indicative capacitive sensors, includes a subset of the multiplicity of electrically conductive shapes and wherein all shapes in the subset and only the shapes in the subset, are connected to the respective one of the plurality of approximate position indicative capacitive sensors.

There is thus yet further provided, in accordance with at least one embodiment of the present invention, an apparatus wherein the approximate position indicative touch surfaces are distributed such that any touch of the touch panel at least partly touches at least a portion of each of a unique set of shapes.

There is thus yet further provided, in accordance with at least one embodiment of the present invention, an apparatus wherein no shapes outside of the row are connected to the row-specific capacitive sensor.

There is thus yet further provided, in accordance with at least one embodiment of the present invention, an apparatus comprising at least one column touch surface comprising a subset of the multiplicity of shapes arranged in a column along the second axis wherein all shapes in the subset are connected to a column-specific capacitive sensor; and wherein the response analyzer is operative to refine both components, along both of the first and second axes, of the approximate location using at least one response obtained from the at least one row touch surface and at least one response obtained from the at least one column touch surface, and to output a refined location for the touch along both of said axes, accordingly.

There is thus yet further provided, in accordance with at least one embodiment of the present invention, an apparatus wherein the at least one row touch surface comprises at least two row touch surfaces interspersed with the plurality of approximate position indicative touch surfaces.

There is thus yet further provided, in accordance with at least one aspect of the present invention, a multi-touch method for detecting simultaneous multiple touches of a touch panel, the method including providing a surface-capacitance-based touch panel configured and operative to support multi-touch applications; and using the surface-capacitance touch panel to serve a multi-touch application.

There is thus yet further provided, in accordance with at least one embodiment of the present invention, a method wherein the touch panel serves at least one multi-touch application having an application-specific required resolution and wherein the using includes localizing a touch, along x and y axes, at a resolution greater than the application-specific required resolution, thereby to provide approximate x and y touch coordinates; and refining the approximate x and y touch coordinates along at least one of the x and y axes to a resolution which satisfies the application-specific required resolution.

There is thus yet further provided, in accordance with at least one embodiment of the present invention, a method wherein the touch panel includes capacitance sensors and wherein a pattern of intensities read from several adjacent sensors is used to accurately position a touch of the touch panel, rather than localizing the touch simply by identifying coordinates of an individual one of the capacitance sensors whose capacitance reading yielded a local maximum intensity.

Each intensity value typically comprises a measured capacitance value's distance from a basic capacitance value measured in a no-touch situation.

There is thus yet further provided, in accordance with at least one embodiment of the present invention, an apparatus wherein each approximate position indicative touch surface includes only that number of shapes which together generate a total touch surface whose dimensions fall within an application-specific resolution defined along at least one of the touch panel's axes.

There is thus yet further provided, in accordance with at least one embodiment of the present invention, an apparatus wherein each approximate position indicative touch surface includes a plurality of shapes.

There is thus yet further provided, in accordance with at least one embodiment of the present invention, a method wherein the touch panel has dimensions L, K respectively along first and second axes respectively and includes a multiplicity of electrically conductive shapes, and wherein the touch panel includes:

i. At least one row touch surface comprising a subset of the multiplicity of shapes arranged in a row along the first axis wherein all shapes in the subset are connected to a row-specific capacitive sensor; and ii. A plurality of approximate position indicative touch surfaces, wherein each approximate position indicative touch surface's dimensions along the first and second axes respectively are less than L and K respectively, and wherein the plurality of approximate position indicative touch surfaces are respectively uniquely connected to a respective plurality of approximate position indicative capacitive sensors.

There is thus yet further provided, in accordance with at least one embodiment of the present invention, a method wherein the using comprises scanning approximate position indicative capacitive sensors to identify at least one individual approximate position indicative capacitive sensor triggered by simultaneous multiple touches, computing approximate locations of the simultaneous multiple touches based on a known location of the individual approximate position indicative capacitive sensor; and refining the approximate locations to obtain precise locations for the simultaneous multiple touches, using information from capacitive sensors other than the approximate position indicative capacitive sensors.

There is thus yet further provided, in accordance with at least one embodiment of the present invention, a method wherein the computing is also based on a known location of at least one neighboring approximate position indicative capacitive sensor to which is shorted at least one shape adjacent to a shape shorted to the individual approximate position indicative capacitive sensor.

There is thus yet further provided, in accordance with at least one embodiment of the present invention, an apparatus wherein the approximate position indicative touch surfaces are distributed densely enough over the touch panel to ensure that each finger-sized location within the touch panel, when touched by a finger, triggers a group of finger-sized capacitive sensors to generate a corresponding group of intensities which is unique to the touch panel in that it is not reproduced when any other location within the touch panel is touched.

There is thus yet further provided, in accordance with at least one embodiment of the present invention, a method wherein the using comprises identifying an approximate location of each touch along both of the axes, based on at least one response obtained from at least one of the approximate position indicative touch surfaces, refining at least one component, along at least one of the first and second axes, along the approximate location using at least one response obtained from the at least one row touch surface, and outputting a refined location for the touch along both of the axes, accordingly.

There is thus yet further provided, in accordance with at least one embodiment of the present invention, an apparatus wherein the approximate position indicative touch surfaces are distributed such that any touch of the touch panel at least partly touches at least a portion of at least one of the approximate position indicative touch surfaces, hence can be localized.

There is thus yet further provided, in accordance with at least one embodiment of the present invention, an apparatus wherein the shapes comprise diamonds.

There is thus yet further provided, in accordance with at least one embodiment of the present invention, an apparatus wherein the distance between approximate position indicative touch surfaces is at least the size of a human finger.

Also provided are:
a. A multi touch sensing module comprising:
  a contact sensing device including contact sensors;
  a touch panel comprising:
an electrically isolating substrate;
a plurality of electrically conductive touch-shapes, most of which are substantially longer along one dimension than along another dimension, the shapes being arranged in more than two columns each including more than 2 touch shapes, wherein respective shapes in each column form staggered rows;
traces via which the plurality of electrically conductive touch-surfaces are electrically connected to the contact sensing device; and
a processing unit, connected to the contact sensing device, which is operative for: reading touch sensor measurements generated by the contact sensing device, and resolving the touch sensor measurements into multiple locations of respective multiple objects which have come into contact with the touch-surfaces.
b. A multi touch sensing module comprising:
  a touch panel comprising:
a plurality of electrically conductive touch surfaces, arranged in more than two columns each including more than 2 touch surfaces, wherein touch surfaces in corresponding positions in said columns form staggered rows; and
a contact sensing device including touch sensors operative to sense contact between a touching object and at least one of the plurality of electrically conductive touch surfaces.
c. As above, and also comprising traces via which the plurality of electrically conductive touch surfaces are electrically connected to the contact sensing device.
d. As above, and also comprising an electrically isolating substrate.
e. As above wherein the touch surfaces are staggered such that the axes of the shape define a ratio between them which is equal to the staggering level defined by said staggered touch surfaces.
f. A multi touch sensing module comprising:
  a touch panel comprising:
    a plurality of electrically conductive touch surfaces, preferably but not necessarily arranged in more than two columns each including more than 2 touch surfaces, wherein touch surfaces in corresponding positions in said columns form staggered rows; and
    a contact sensing device including touch sensors operative to sense contact between a touching object and at least one of the plurality of electrically conductive touch surfaces,
  wherein contact sensing measurements are carried out by the contact sensing device in groups such that capacitively coupled touch panel elements are not measured simultaneously.
g. A module in which the processing unit computes x coordinates of peaks using a first vicinity of the peak and computes y coordinates of the peaks using a second vicinity of the peak which differs from said first vicinity.
h. A module which has a plurality of active area terminals and wherein each active area terminal, in an active area terminal subset including most of said plurality of active area terminals, is connected to a single touch panel terminal.

Each peak may initially comprise a local maximum sensed by the contact sensing device e.g. a touch surface whose capacitance values as read by the contact sensing device are no lower than the capacitance values of its direct neighbors.

There is thus yet further provided, in accordance with at least one aspect of the present invention, a computer program product, comprising a computer usable medium having a computer readable program code embodied therein, the computer readable program code adapted to be executed to implement a method for detecting simultaneous multiple touches of a touch panel, the method including providing a surface-capacitance-based touch panel configured and operative to support multi-touch applications; and using the surface-capacitance touch panel to serve a multi-touch application.

Also provided is a computer program product, comprising a typically non-transitory computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/ or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 2b is an illustration of an area typically underlying a finger of a human user, drawn in scale relative to FIGS. 1a-1b and FIG. 2a.

FIG. 13 is a simplified illustration of an example of a staggered touch panel layout including touch surfaces arranged, constructed and operative in accordance with certain embodiments of the present invention.

FIG. 16b is a key for FIG. 16a showing the measurement groups thereof.

FIG. 17 is a simplified flowchart illustration of a touch location detection method, operative in accordance with certain embodiments of the present invention.

FIGS. 26a-26c, taken together, form a simplified flowchart illustration of a touch localization method operative in accordance with certain embodiments of the present invention.

FIG. 35 is a listing of an insertion-sort procedure useful e.g. in performing step 2320 of FIG. 21b, which is operative in accordance with certain embodiments of the present invention.

DETAILED DESCRIPTION OF CERTAIN EMBODIMENTS

Certain embodiments of the present invention solve multipoint ambiguity situations of a capacitive surface.

Figure 1A:
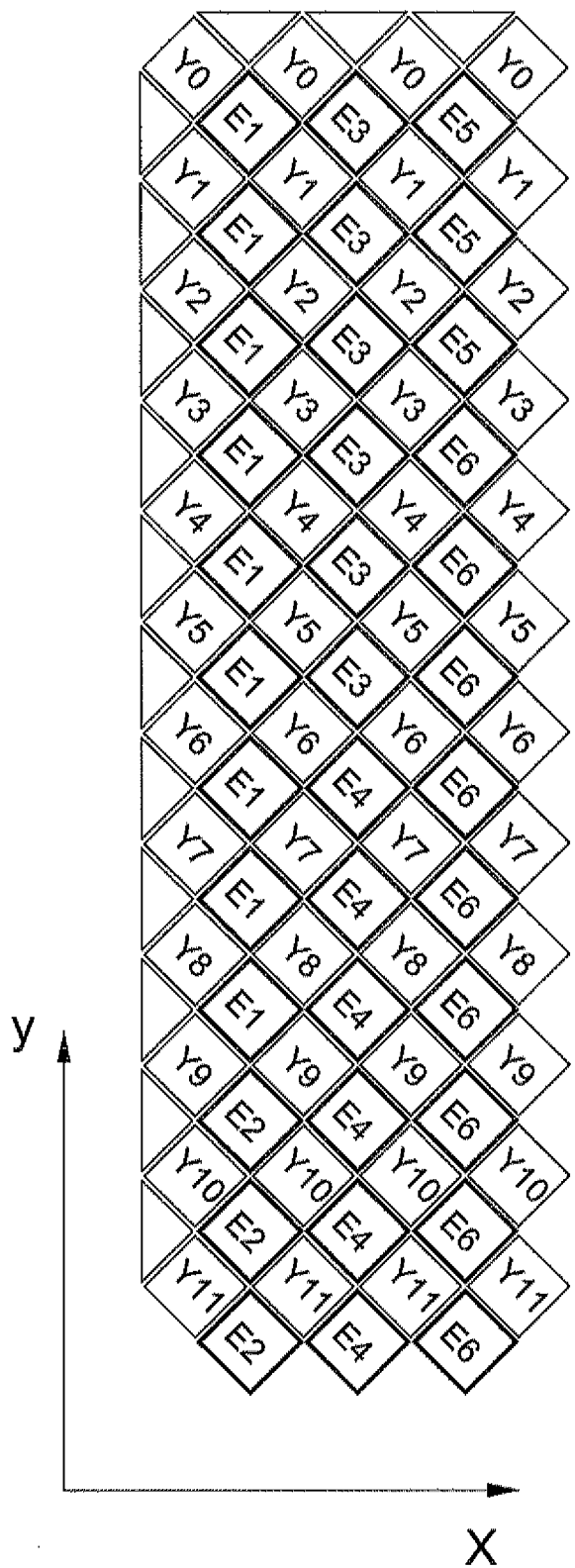
FIGS. 1a-1b and 2a are examples of grouped encapsulated surfaces connected to a separate sensor.
Figure 1B:
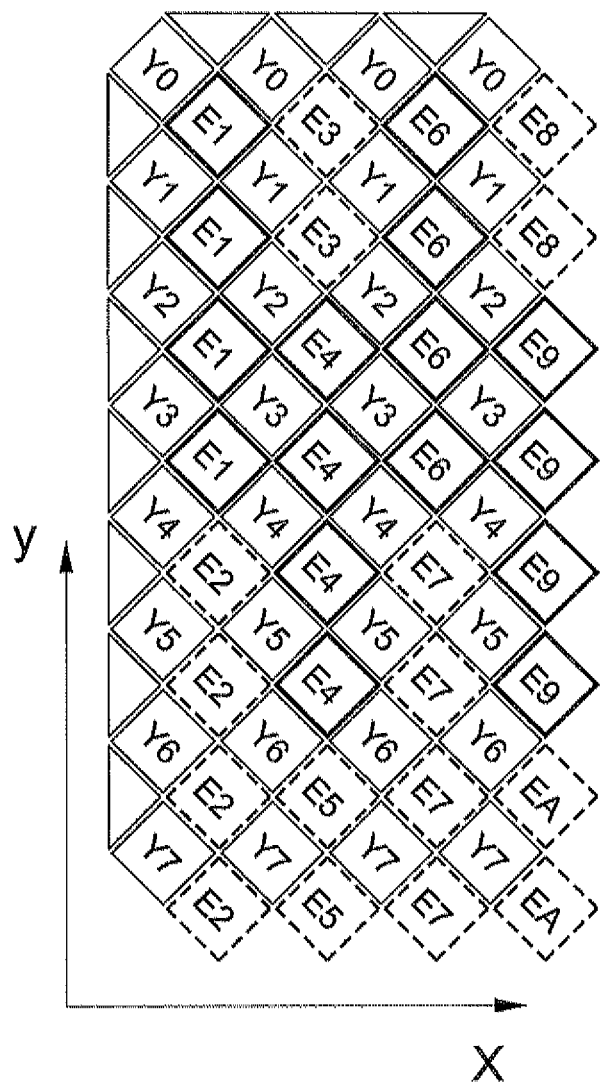
Figure 2A:
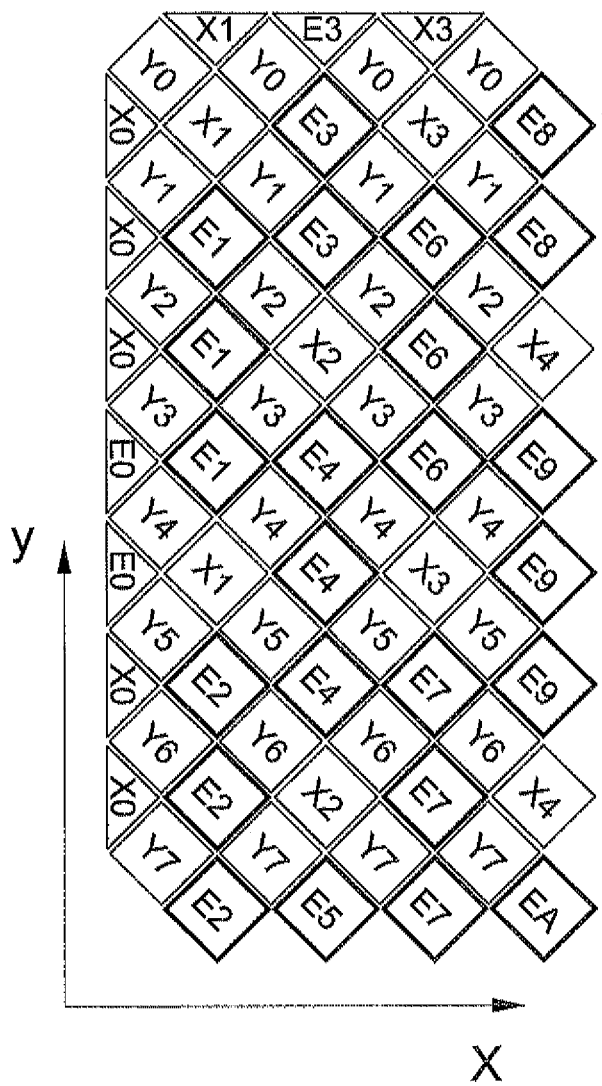

FIGS. 1a-1b and 2a illustrate examples of touch surfaces with grouped encapsulated touch surfaces. Each group of encapsulated touch surfaces, such as those marked by E1, or those marked by E6, is connected to a separate sensor.

It is appreciated that surface-capacitance or self-capacitance touch panels do not support multi-touch applications. Certain embodiments of the present invention seek to provide surface-capacitance or self-capacitance touch panels configured and operative to support multi-touch applications.

Certain embodiments of the present invention seek to provide a plurality of "E-type" touch surfaces, wherein a diamond activates the capacitance sensor serving that touch surface if and only if the diamond is included in the touch surface, and wherein the dimensions of each touch surface are selected such that two touches overlying or activating portions of or the entirety of the same touch surface are, for the purposes of a particular application, functionally equivalent.

Certain embodiments of the present invention seek to provide X-type or Y-type touch surfaces used to refine approximate X,Y coordinates provided by an E-type touch surface, and wherein the X-type or Y-type touch surfaces are characterized in that they extend along some or typically all of one of the dimensions of the touch panel and extend along a portion of the other dimension of the touch panel, which is less than the application-specific resolution characterizing an application to be served by the touch panel.

One problem which certain embodiments shown and described herein seek to solve is how to localize simultaneous multiple touches of an Absolute Capacitance or Surface Capacitance technology-based touch surface, without burdening the apparatus with the impractical solution whereby a touch sensor is wired to almost every diamond individually and without resorting to unacceptably sized diamonds. As shown, one solution to this problem is to provide "encapsulated" diamonds, also termed herein E-diamonds, distributed over the touch panel. E-surfaces refer to one or more typically adjacent diamonds which are shorted to a sensor, and have pre-defined known X and Y coordinates.

Preferably, there are no "dead" areas; any touch of any portion of the touch panel can be localized by virtue of a unique set of sensors being activated thereby in a unique pattern. Typically, the totality of E-diamonds provided in a touch panel can be partitioned into n sets of adjacent E-diamonds. These sets may be disposed close to one another e.g. as shown in the "zipper" embodiments of FIGS. 1a-1b, but they are not attached e.g. are not electrically connected to the E-diamonds of any other set, and all diamonds are all wired to a single joint sensor which is unique to that set, such that the number of sensors which wire the E-diamonds totals n. According to certain embodiments, each diamond other than the E-diamonds, is wired to a single sensor serving the entire row in which that diamond resides; if such a row exists, the diamond is termed an X diamond. According to certain embodiments, a diamond other than the E-diamonds is wired to a single sensor serving the entire column in which that diamond resides; if such a column exists, the diamond is termed a Y-diamond.

E diamonds are typically distributed over the touch panel in such a way as to enable detection of touch points at any location of the touch surface, avoiding "dead" zones. Typically, the E diamonds are distributed such that any touch of the panel activates at least one of the E diamonds.

More specifically, FIGS. 1a-1b and 2a illustrate diamond arrangements in a surface-capacitance-based multi-touch panel apparatus, according to various embodiments of the present invention. It is appreciated that the patterns shown may repeat over and over again throughout the length and breadth of the particular touch panel. Typically:
a. All X diamonds, in all repetitions along the X axis, are shorted to a single sensor;
b. All Y diamonds, in all repetitions along the Y axis, are shorted to a single sensor.
c. All identically numbered E diamonds within a particular repetition are shorted to a single sensor whereas a touch surface (sequence or, more generally, set of E diamonds) bearing the same number in other repetitions, is shorted to a different single sensor.

Figure 2B:
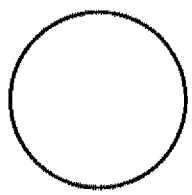

The embodiments of FIGS. 1a-1b, 2a have been found to be particularly successful in that there are no dead areas on the one hand, and there is not a particularly high number of required sensors, on the other hand, because there are not a few non-E diamonds and/or because the E diamonds are provided in runs, all shorted to a single sensor. The embodiments of FIGS. 1a-1b and 2a are characterized by "uniqueness" i.e. any location of the size shown in, say, FIG. 2b (finger size) extends over a unique set of diamonds including at least one E-diamond, hence can be localized. It is appreciated that the particular finger size illustrated in FIG. 2b is merely for illustration purposes and is not intended to be limiting. For example, y10, y11, E2 and E4 are mutually adjacent only once over the entire touch panel composed of repetitions of FIG. 1a; similarly, y1, y2, and E3 are mutually adjacent only once over the entire touch panel composed of repetitions of FIG. 1a; and such is the case for all sets of mutually adjacent diamonds—they occur only once over the entire touch-panel. (y10, y11, E2 and E4 occur in each repetition of the pattern of FIG. 1a, however, E2 and E4 differ—i.e. are shorted to a different sensor—for each and every repetition.)

It is appreciated that combining intensity information gathered from Y sensors and E-sensors allows a finger-touch to be localized. For example, in the embodiment of FIG. 1a, the sensor shorted to the E1 diamonds is uniquely (over the entire touch panel) assigned to the 9 vertically adjacent E1—diamonds shown, and as for vertical localization within the swathe occupied by the 9 E-diamonds, this is achieved by noting which Y-sensor from among Y0-Y8 is detecting above-threshold intensity. An example method for localizing touch points is described herein with reference to FIGS. 4c-4d.

Typically, each of the patterns of FIGS. 1a-1b and 2a is implemented in a two-layer layout, in which, typically, the E- and X-diamonds are implemented in the top layer and the Y-diamonds are implemented in the bottom layer which is sometimes slightly less sensitive. It is appreciated that in the illustrated embodiments, E and Y diamonds cannot co-exist in the same layer since this would cause a short; whereas E- and X-diamonds' connections to the sensors are mutually parallel hence can co-exist in the same layer.

It is appreciated that X and Y as used herein without loss of generality; X-diamonds can, if desired, be deemed Y and vice-versa.

When, in a particular touch panel, the patterns of FIGS. 1a-1b and 2a repeat themselves, say K' and L' times along the x and y axes of the panel respectively, the X1 diamonds of all K repeats all are shorted to a single capacitive sensor assigned to the column 1 along which the X1 diamonds lie, and the same is true respectively for the X2's, X3's, etc. which are respectively shorted to the capacitive sensor assigned to column 2, the capacitive sensor assigned to column 3, etc. Similarly, the Y1 diamonds of all K' repeats all are shorted to a single capacitive sensor assigned to the row 1 along which the Y1 diamonds lie, and the same is true respectively for the Y2's, Y3's, etc. which are respectively shorted to the capacitive sensor assigned to row 2, the touch sensor assigned to row 3, etc. In contrast, the E1's of the K' repeats are respectively shorted to K' different capacitive sensors, not to a single common sensor, and the same is true respectively for the E2's, E3's, etc.

It is appreciated that typically, the size of each diamond relative to the presumed impact of finger on diamond capacitance and size of each finger, as shown in FIG. 2b, is such that the finger, when centered on a diamond, always overlies, wholly or partially, three diamonds along the x-axis and three along the y-axis. "Zipper" embodiments 8a and 8b are characterized in that no two finger locations overlie the same set of diamonds. It is appreciated that the finger can be precisely positioned by (a) noting the set of diamonds which the finger overlies, i.e. activates; and (b) noting the relative intensities of each activated diamond, and taking into account that generally speaking, the intensity of each activated diamond may be a function of both effective finger capacitance (depending on the extent of contact between finger and diamond) and diamond capacitance. Typically, the intensity of each activated diamond is proportional to the impact of finger capacitance to the diamond capacitance.

For example, if a finger is centered on an individual E2 diamond in FIG. 1a, the intensity pattern read from the activated diamonds would typically include a high intensity from the E2 diamond and lower but generally equal intensities from the surrounding y-diamonds, as well as even lower intensities from the E-diamonds above and below the individual E2 diamond. In contrast, if the finger is centered at a vertex of two E-diamonds and two Y-diamonds, the intensity pattern would include four approximately equal intensities from the four diamonds bordering the vertex. If the finger is centered on a border between an E- and a Y-diamond, the intensities of those two diamonds would be high, and low intensities would be read from adjoining diamonds, and so forth.

According to certain embodiments of the invention, then, a "map" or pattern of intensities read for several adjacent sensors is used to accurately position a touch of the touch panel, e.g. as described in detail herein, rather than localizing the touch point simply by identifying coordinates of a sensor whose reading yielded the local maximum intensity.

Figure 3A:
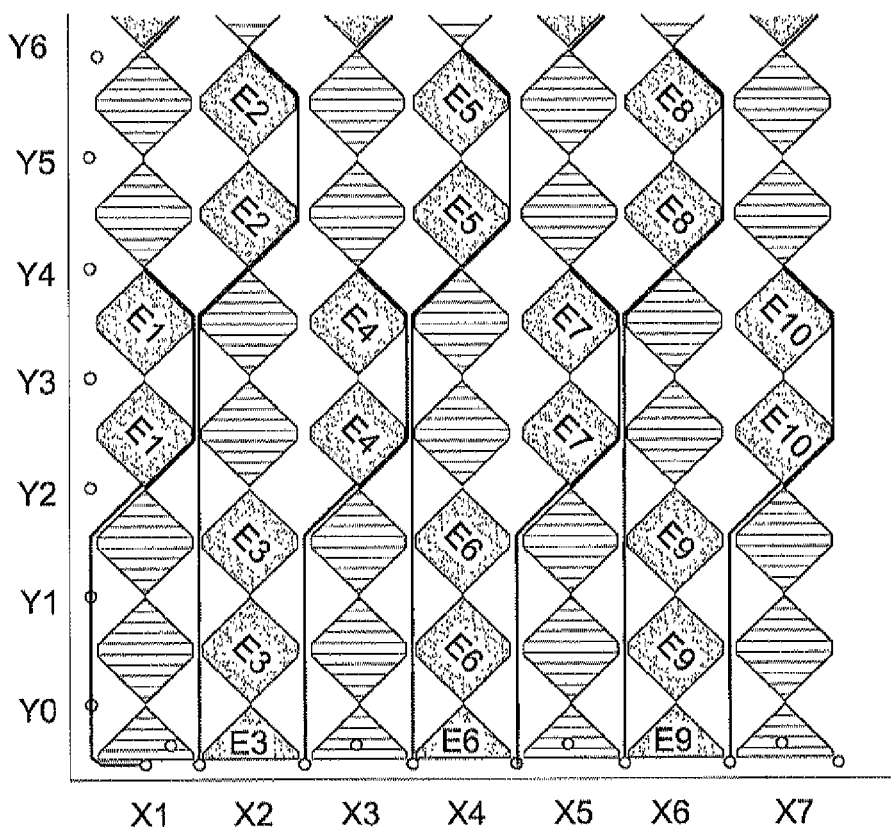
FIGS. 3a-3b are example layouts implementing patterns of encapsulated surfaces within a touch panel provided in accordance with certain embodiments of the present invention; it is appreciated that any suitable tool, such as Alegro, may be employed to generate layouts for any of the patterns shown and described herein.

FIG. 3a is an example layout implementing patterns of encapsulated surfaces within a touch panel provided in accordance with certain embodiments of the present invention.

In particular, FIG. 3*a* is an example layout of a top layer of an apparatus constructed and operative in accordance with an embodiment of the present invention.

Figure 3B:
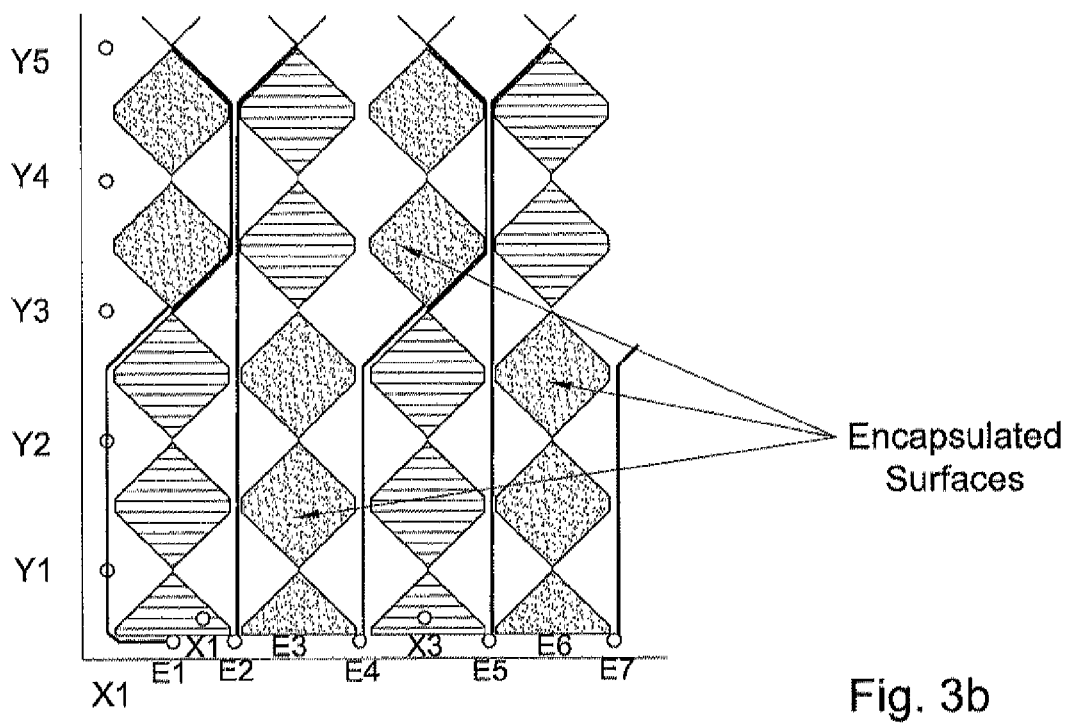

FIG. 3*b* is a detail of a portion of the layout of FIG. 3*a* showing encapsulated diamonds including one or more encapsulated diamonds therein (also termed herein E-diamonds and E-diamonds respectively; indicated in gray). X-diamonds are indicated by horizontal hatching and Y-diamonds are in the bottom layer hence are located at the white portions of FIGS. 3*a*-3*b*. As shown, various sets of E-diamonds are each shorted to their own joint sensor, as indicated by sensors E1, E2, etc. each shorting its own set of E-diamonds. The bottom Y layer is illustrated in white in FIG. 3*a*.

Typically, the Y diamonds form the bottom layer (for example) of a layout, whereas the layer including X and E diamonds is the top layer, thereby to obtain better sensitivity. Fillers of X and E diamonds may be provided to improve impact of the finger's capacity on the second layer. Fillers, namely a conductive surface connected to no sensor, are typically employed only if the second layer is affected by isolation between bottom and top layers.

Figure 4A:
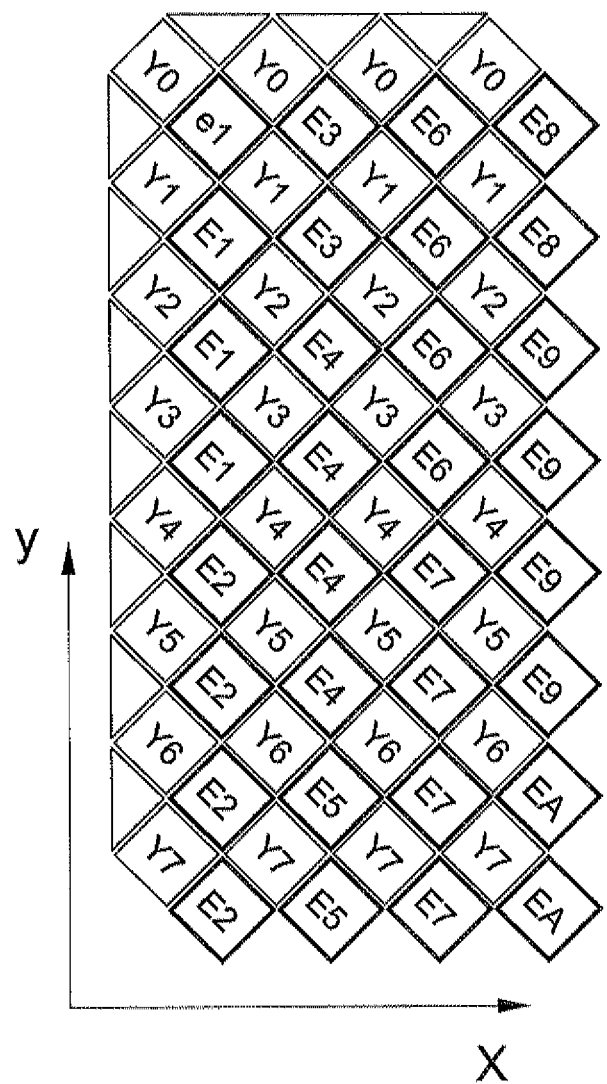
FIG. 4a is an example layout useful in describing the method of FIG. 4c below.

FIG. 4*a* is an illustration of a "Zipper"-type layout which is now used to describe a method used herein for localizing multiple simultaneous touches. It is appreciated that the method is described with reference to FIG. 4*a* merely by way of example and the method of FIG. 4*a* is general enough to apply to a wide variety of layouts including but not limited to all layout options illustrated herein. Also, an essentially infinite number of layout options are possible which include encapsulated diamonds as shown and described generally herein, and the layouts specifically illustrated herein are presented merely by way of example. For example, it is possible to combine various of the layout options shown herein; such as the diagram of FIG. 2*a*.

In FIG. 4*a*, each Y surface comprises a horizontal line of diamonds, e.g. the first line of diamonds or any of the lines directly below it. Each E surface comprises a group of vertical diamonds marked with an elliptical shape. A vertical line which supplies the X direction sensing comprises a group of E diamonds. Circles represent the centers of the E diamonds as further described herein below.

The "center" of each (non-truncated) E diamond is defined by the center of mass of its surface shape. However, in the lower and upper sides of the touch panel, there may be some diamonds which are truncated due to touch panels' rectangular topology. For these diamonds, the center is defined as the center of mass of the virtual full diamond shape as if it was not truncated.

Figure 4B:
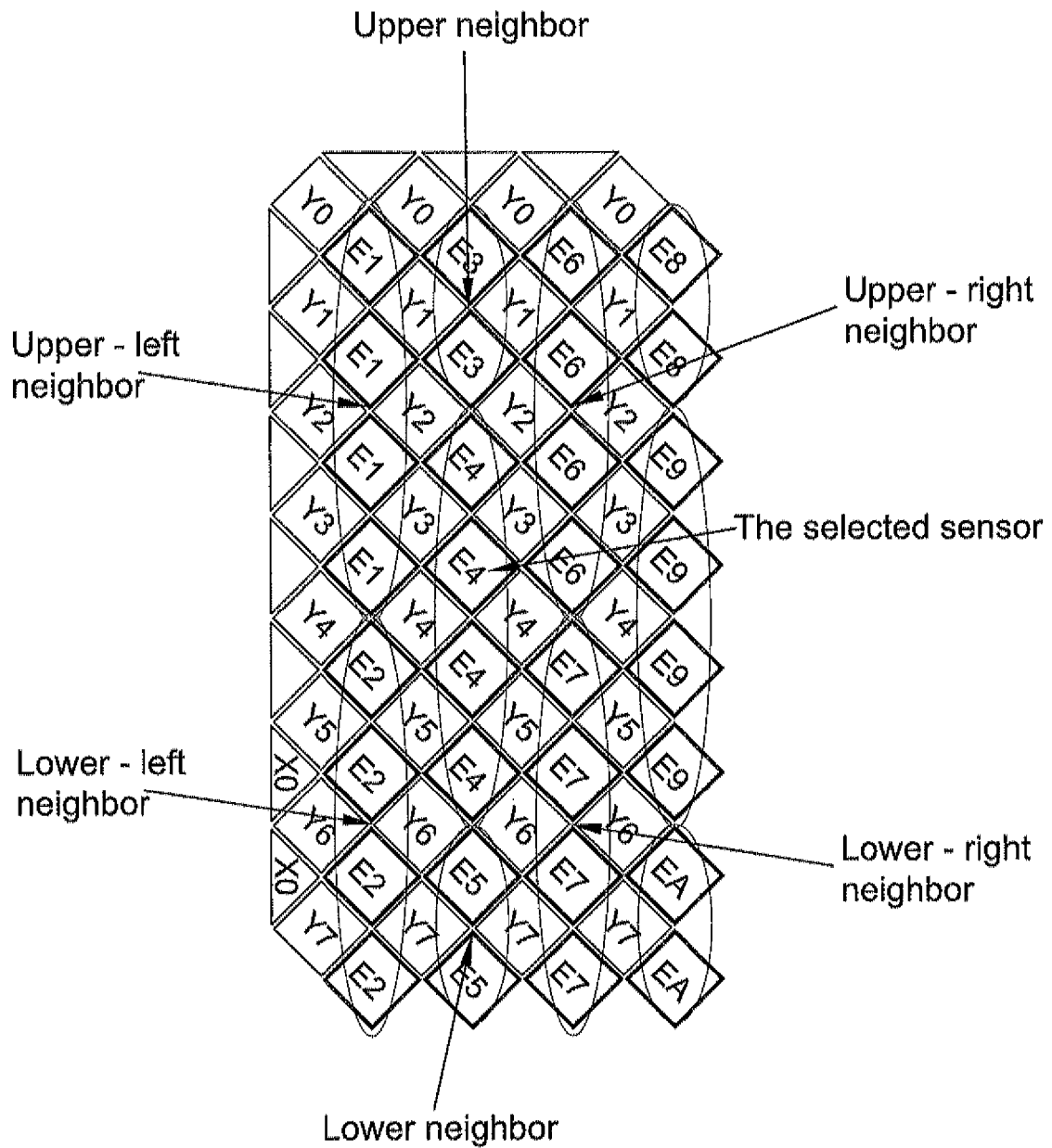
FIG. 4b is a diagram defining neighbors as the term is employed in FIG. 4c below.
Figure 4C:
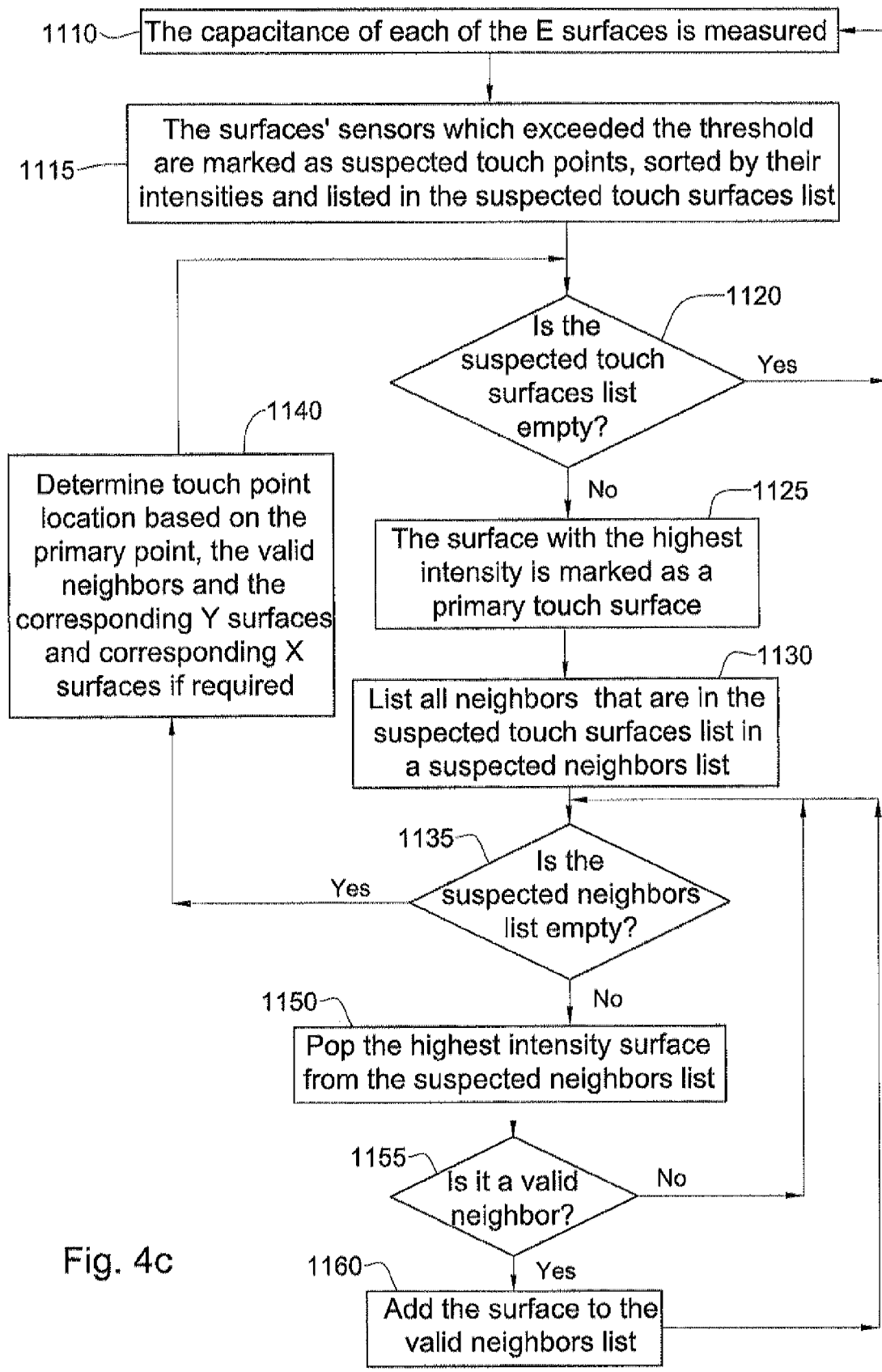
FIG. 4c is a simplified flowchart illustration of an example implementation of a method for localizing multiple touches to a surface-capacitance-based multi-touch screen apparatus provided in accordance with certain embodiments of the present invention.

The center of mass is typically employed for computing X,Y coordinates of touch points. It is appreciated that each set of E diamonds typically has exactly one set of pre-defined unique coordinates. FIG. 4*c* is a simplified generally self-explanatory flowchart illustration of a cycle of a method for extracting coordinates of simultaneous multiple touch points which are extracted from a touch panel e.g. that of FIG. 4*a* or any of those illustrated herein. The method of FIG. 4*c* typically comprises some or all of the illustrated steps, suitably ordered e.g. as shown. The method of FIG. 4*c* is typically performed periodically or generally continuously.

In FIG. 4*c*, the term "Suspected touched surfaces list" refers to a list of E surfaces whose measured capacitance is greater than the conventional touch detection threshold characterizing the touch panel; the threshold may be conventionally determined and typically depends on the particular application and/or used manufacturing materials. According to certain embodiments, this list is inspected until empty, each element in the list being removed after having been inspected.

In step 1140, the location of the primary touch surface marked in step 1125 is determined. The next highest-intensity surface is then analyzed, and so on, until all touches have been localized (or no touches have been found) at which point the method returns to capacitance measuring step 1110.

Any suitable computation may be employed in step 1140. For example, as described above, Coordinates of encapsulated sensors (E1), (E2), Y sensors (Y6), (Y7) and X sensors (X5), (X6) and (X7) are pre-defined (known) by the surface matrix topology. The measured weights (capacitance values e.g.) of the encapsulated sensors, the Y sensors and the X sensors are represented as $[w_1, w_2, \ldots, w_n]$.

The touch point X coordinate is computed as a quadratic function (parabola) of three points or as a weighted average (for example) of all X and E sensors, and the Y coordinate is computed from the Y and E sensors in a similar way. Suitable X coordinate computation may for example employ weighted average Formula I above or the quadratic function (parabola) formula II above. After detecting a preliminary or approximate position of the touch point, a more precise computation may be done using another quadratic function (parabola) taking in consideration neighbor X sensors EX−1, EX and EX+1. The coordinate Y is computed using the above quadratic function and weighted average for each touch point.

The term "Primary touch surface" refers to an E surface selected, from the suspected touched surfaces list, to mark a touch point.

The term "Neighboring surfaces" refers to surfaces that reside in proximity to the selected E surface. For example, FIG. 4*b* illustrates the 6 neighbors of a selected sensor. More generally, each E surface has at most 6 neighboring surfaces: Upper, Upper-left, Upper-right, Lower-left, Lower-right and Lower, as shown in FIG. 4*b*.

The term "Valid neighboring surfaces list" refers to a list of neighboring surfaces which is "valid" i.e. which influences a touch position discovered by a primary touch surface. A neighboring surface is typically deemed a valid neighbor (step 1155 of FIG. 4*c*) if:
1. It is present in the "suspected touched surfaces list"
2. Its addition to the valid neighbors list will not violate the following criteria:
    a. Upper neighbor cannot be included in the same set with Lower, Lower-right or Lower-left neighbor
    b. Lower neighbor cannot be included in the same set with Upper, Upper-right or Upper-left neighbor.

Figure 4D:
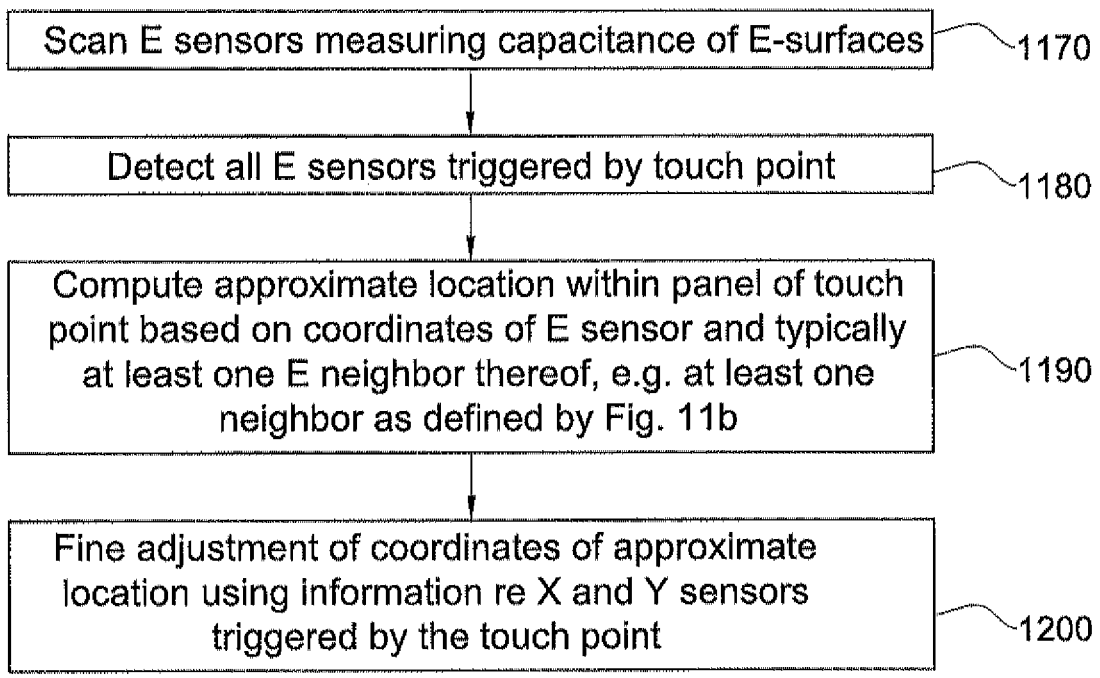
FIG. 4d is a simplified flowchart illustration of a general method for localizing multiple touches to a surface-capacitance-based multi-touch screen apparatus provided in accordance with certain embodiments of the present invention.

It is appreciated that the method of FIG. 4*c* is just one possible implementation of the more general method of FIG. 4*d* in which E sensors (capacitive sensors measuring E diamonds) are scanned, those sensors which have been triggered by one or more touch points are identified, the approximate location's of the touch point's is/are computed based on the locations of e.g. x,y coordinates of the triggered E sensor's diamond/s and, typically, at least one E sensor associated with at least one E-diamond which is a neighbor of the triggered E sensor's diamond/s, and fine-tuning the approximate location's to obtain exact locations, using information from x-sensors and y-sensors triggered by the touch point, e.g. as described above with reference to Formulae I and II.

In certain applications, the area of a finger capable of triggering a diamond beneath it (underlying it) is approximately 10 mm (5 mm for a child).

Figure 9:
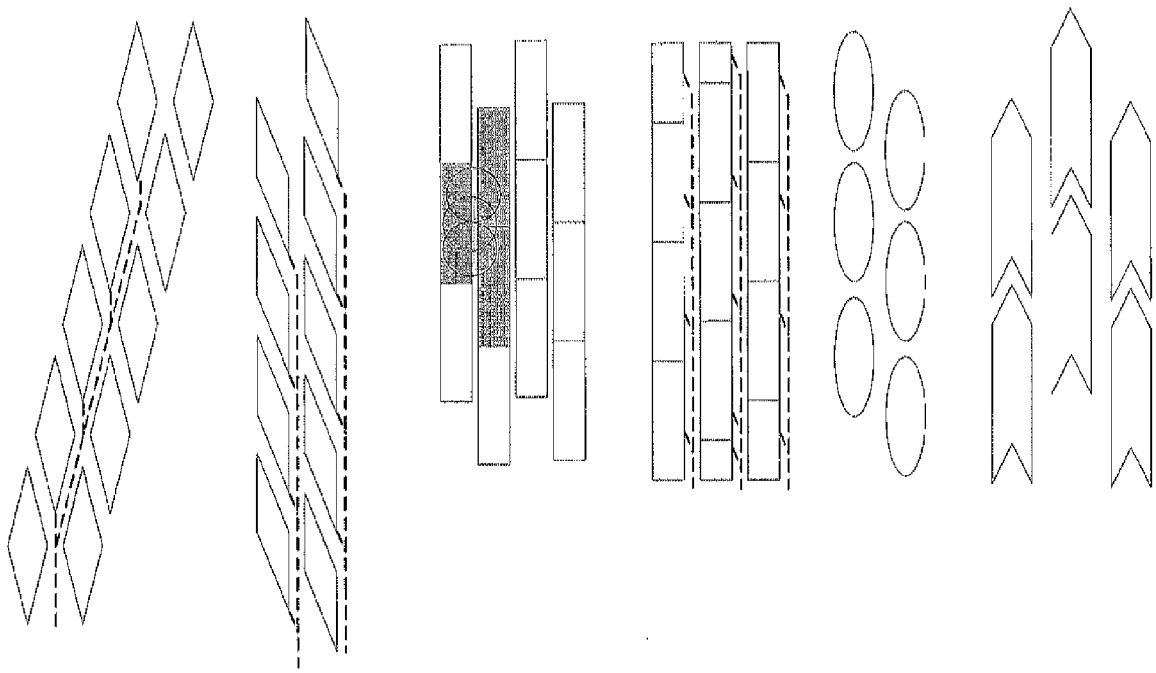
FIGS. 9-11b also illustrate layouts for detecting multiple touch points in surface-capacitance type touch panels, and methods for providing and using such in accordance with certain embodiments of the present invention.

Regarding the shaded rectangles in FIG. 9: The Y position of the circles can be determined by the combination of the capacitive sensors readings of the three shaded touch surfaces. Each circle (representing for example a touching finger) footprint is distributed in a different way above the underlying touch surfaces:

1. About half of the upper circle footprint is laid on the left shaded touch surface and about half on the upper shaded touch surface
2. About half of the central circle footprint is laid on the left shaded touch surface and the other half is substantially evenly distributed between the other two touch surfaces
3. About half of the lower circle footprint is laid on the left shaded touch surface and about half on the lower shaded touch surface.

Figure 8:
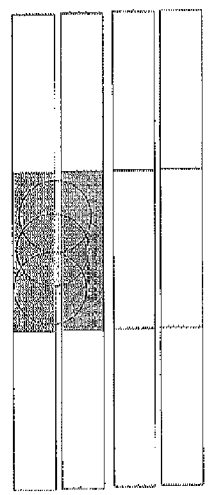

Each circle would yield a different combination of capacitive sensors readings. This was not the case in the aligned shaded touch surfaces in FIG. 8.

The dashed (---) lines in some of the examples illustrated herein symbolize the touch surfaces' connection to the perimeter. For simplicity, in some of the cases, only one wire is shown to be connected—but it symbolizes a multiplicity of wires (one for each touch surface).

There is a resemblance between the "zipper" layout and the single layer described above, however differences between them include that the zipper also includes row (Y) touch surfaces.

Figure 10A:
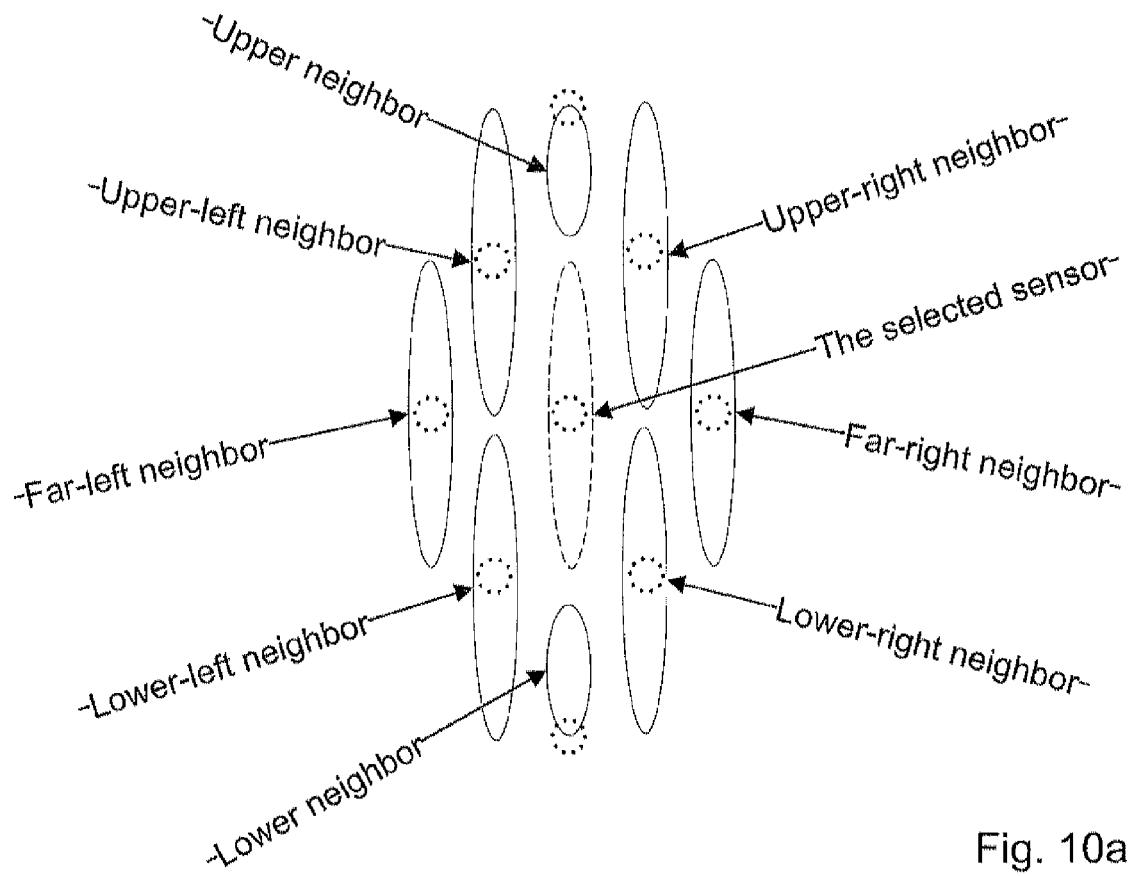
Figure 10B:
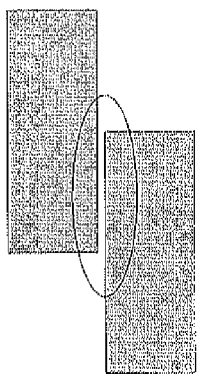

A single layer detection algorithm may be characterized by FIG. 10a and by the following description: The following section describes how the coordinates of multiple touch points are extracted from a touch panel, a portion of which is similar to the one depicted above.

In FIG. 10a: Each E surface is marked with an elliptical shape. The dotted circles represent the centers of each E surface, as later will be referred to in the description. E surface center definition (the circles): The center of each such touch surface is defined by the center of mass of the touch surface shape. In the lower and upper sides of the touch panel, there may be some touch surfaces which are chopped due to the touch panel rectangular topology. For these touch surfaces, the center is defined as the center of mass of the virtual full touch surface shape as if it was not chopped.

Suspected touched E surfaces list includes A list of E surfaces whose measured capacitance was greater than the touch detection threshold Primary touch E surface: A touch surface which was selected to mark a touch point A primary touch surface is selected from the suspected touched E surfaces list.

"Neighboring E surfaces" refer to E surfaces that reside in proximity to the selected E surface.

Each such E surface has at most eight neighboring E surfaces: Upper, Upper-left, Upper-right, Far-left, Far-right, Lower-left, Lower-right and Lower (as depicted in the drawing above).

Valid neighboring E surfaces list: A list of neighboring E surfaces which influence the touch position which was discovered by a primary touch E surface A neighboring E surface is selected as a valid neighbor if
1. It is present in the "suspected touched E surfaces list"
2. Its addition to the valid neighbors list will not violate the following criteria:
    c. Upper neighbor cannot be included in the same set with Lower, Lower-right or Lower-left neighbor
    d. Lower neighbor cannot be included in the same set with Upper, Upper-right or Upper-left neighbor FIG. 4c is a detection flow diagram. In an alternate algorithm, the neighboring E surfaces are picked according to their capacitive sensors readings and their proximity to the primary E surface or to other already confirmed neighbors.

In another embodiment, a sensor capacitance reading may be split between two primary E surfaces if it answers the neighboring rule for both.

Determining the touch location based on primary touch point and valid neighbors can be done in at least the following ways:
1. Weighted average
2. Quadratic function (square function)
3. Polynomial approx
4. Image processing Weighted Average Example:
1 Make the weighted average between all participating E surfaces' (primary E surface and valid neighbors) capacitive sensors readings (above their default un-touched cap) based on their X coordinates to determine the touch X coordinate.
2 Repeat the process for the Y axis to extract Y coordinate.

Quadratic Function:
1. Sum all participating E surfaces' capacitive sensors readings in each column to get one number per column
2. Define a quadratic function that describes the column value per X coordinate.
3. Find the function that best fits to the sum of all participating E surfaces' capacitive sensors readings in each column
4. Determine the X coordinate as the X that yields the highest function value
5. Repeat the same procedure for Y. Because E surfaces are staggered in the Y dimension, one may take the sum of bordered E surfaces capacitive sensors reading, as marked by the elliptic line in FIG. 4b, as an input to the quadratic equation Polynomial Approximation
1. Perform a large set of tests where the relation between the measurements and the X location is recorded
2. Find a polynomial that best estimates the X location based on the measurements (capacitance reading).
3. Repeat the process for Y coordinate Image Processing
1. Prepare a graphic picture of the screen topology
2. Set a value to each E surface in the picture according to its capacitance reading (above its default capacitance)
3. Run a spatial low pass filter on the image
4. Find the area with the maximum value
5. Determine the X and Y coordinates at the center of that area.

Figure 11A:
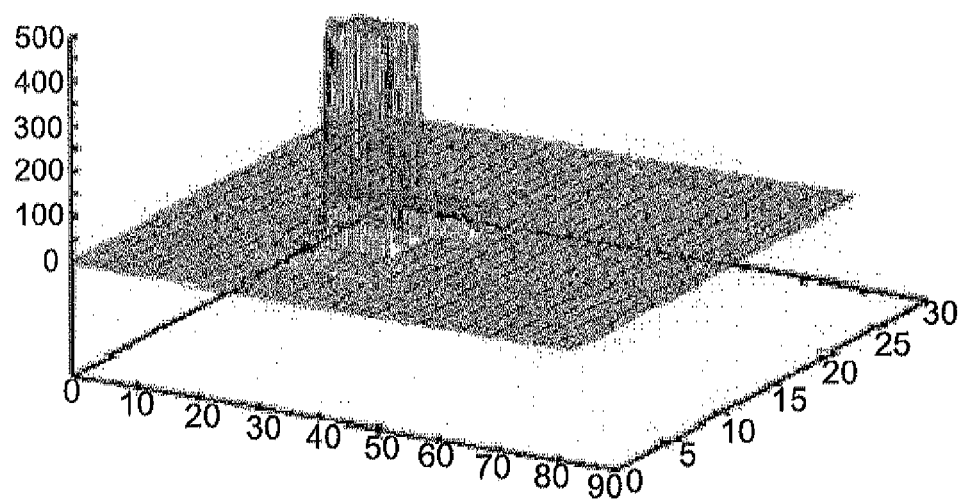

The following example is an example of image-processing, low-pass-filter based detection:

Touch surfaces' capacitive sensors reading picture example before the spatial low pass filter is shown in FIG. 11a.

Figure 11B:
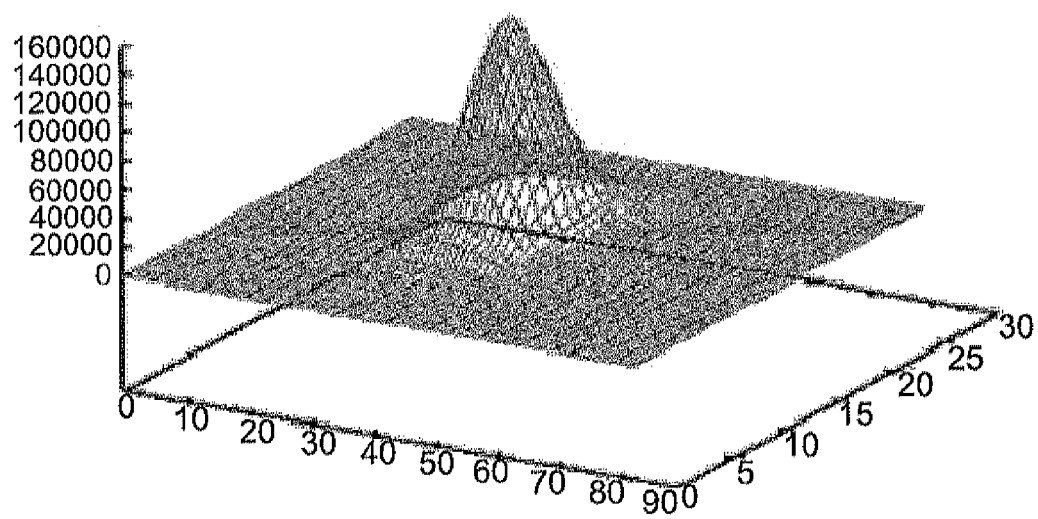

Touch surfaces' capacitive sensors reading picture example the spatial low pass filter is shown in FIG. 11b.

Layouts for detecting multiple touch points in surface-capacitance type touch panels, and methods for providing and using such are now described with reference to FIGS. 5a-11b.

Figure 5C:
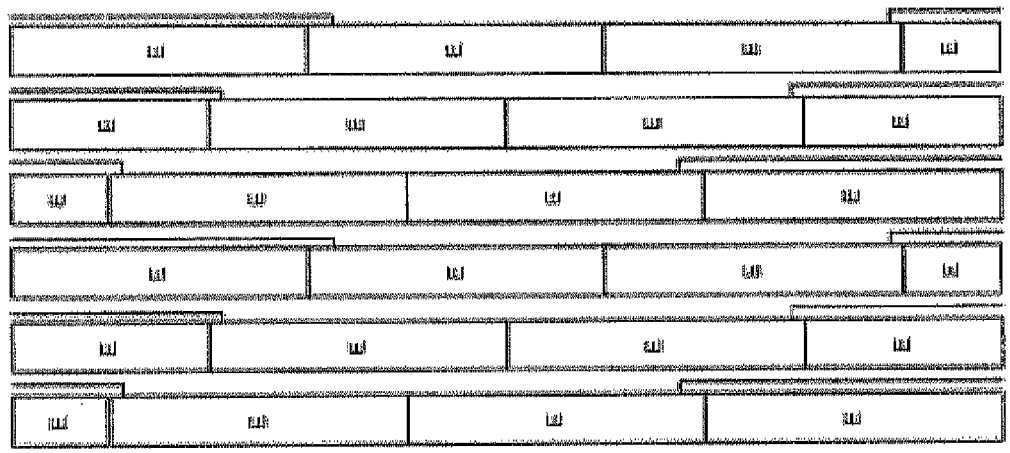
FIGS. 5a-6 illustrate layouts for detecting multiple touch points in surface-capacitance type touch panels, and methods for providing and using such in accordance with certain embodiments of the present invention.
Figure 5B:
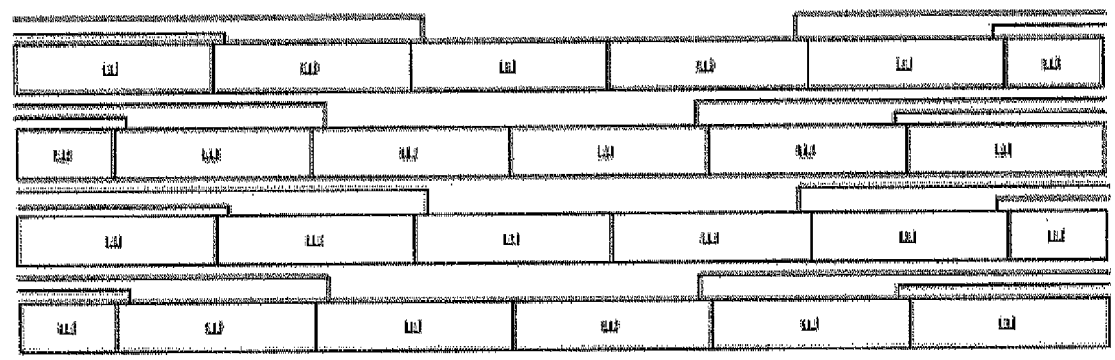
Figure 5A:
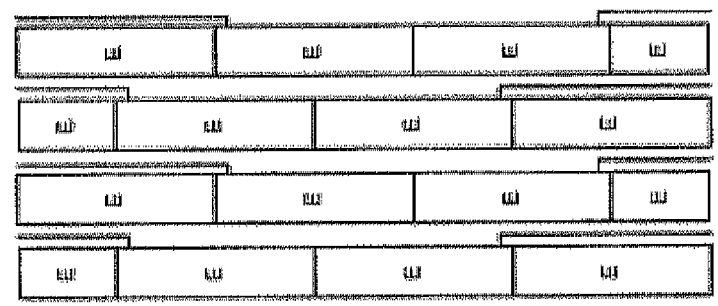
Figure 6:
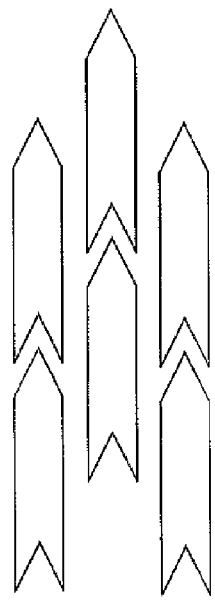

FIGS. 5a-5c illustrate exemplary touch surfaces layouts and routing connections. The routing of the E surfaces to the capacitance measuring units can be done from one side, from two sides (as in FIGS. 5a-5c), from three sides or from four sides.

Reference is made to U.S. patent application Ser. No. 13/042,965 "Systems and methods for detecting multiple touch points in surface-capacitance type touch panels", published as United States Patent Application 20110216038. The apparatus and methods shown and described herein with reference to FIGS. 5a-11b are useful in conjunction with systems and methods shown and described in U.S. patent application Ser. No. 13/042,965.

Two level staggering examples are shown in FIGS. 5a and 5c, while a three level staggering example is shown in FIG. 5b. Four or more staggering levels can be implemented in a similar way. The term 'missiles' herein refers to the layout shapes shown in FIG. 6.

Figure 7A:
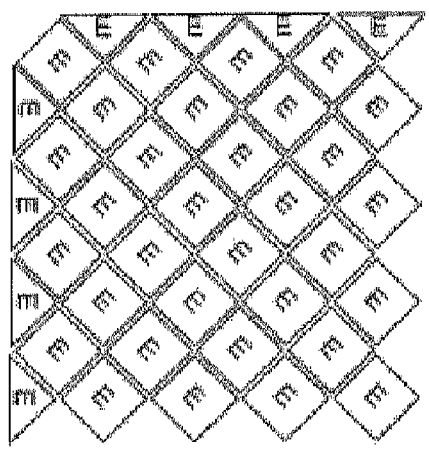
FIGS. 7a-8 illustrate layouts for detecting multiple touch points in surface-capacitance type touch panels, and methods for providing and using such.
Figure 7B:
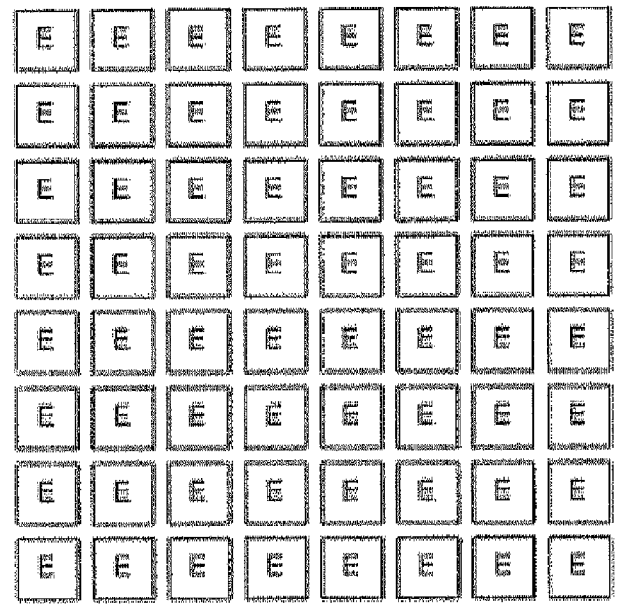

One very basic way to fill a touch panel with multiple touch surfaces is by a matrix of discrete aligned rectangles or diamond-shaped touch surfaces, as in the following examples denoted FIG. 7a and FIG. 7b respectively. The problems of such a basic layout include:
1. It may be hard to route all touch surfaces to the perimeter (on the way to the capacitive sensors). The touch surfaces connection to the perimeter takes a non negligible area of the touch panel and compromise the detection quality.
2. It employs a large number of touch surfaces to cover a touch panel Simply using long, aligned lines of touch surfaces may not be viable because it may create a difficulty in the Y coordinate detection, for example, the circles (emulating fingers) in FIG. 8, may be detected at the same place, because they influence the same touch surfaces in the same way.

It is possible to mitigate the above problems by using 'long' touch surfaces e.g. as per any of the options of FIG. 9, in which as shown one dimension is substantially larger than the other, and with staggered positioning. FIG. 9 illustrates examples of such layouts.

The Y position of each of the 3 circles shown in FIG. 9 (each representing for example a touching finger) can be determined by the combination of the capacitive sensors readings of the three typically rectangular shaded touch surfaces. Each of the 3 circles' footprint is distributed in a different way above the underlying touch surfaces:
$1^{st}$ circle: About half of the uppermost circle footprint is laid on the left shaded touch surface and about half on the upper shaded touch surface
$2^{nd}$ circle: About half of the middle circle footprint is laid on the left shaded touch surface and the other half is substantially evenly distributed between the other two touch surfaces
$3^{rd}$ circle: About half of the lowermost circle footprint is laid on the left shaded touch surface and about half on the lower shaded touch surface.

Each circle may yield a different combination of capacitive sensors readings, due to staggering of the touch surfaces, such that better localization of touch along the y-axis is obtained. This was not the case in the aligned (non-staggered i.e.) shaded touch surfaces in FIG. 8.

The dashed (- - -) lines in FIG. 9 symbolize the touch surfaces' connection to the perimeter. For simplicity, in some of the cases, only one wire is shown to be connected—but it symbolizes a multiplicity of wires (one for each touch surface).

There is a resemblance between the "zipper" layout of FIGS. 1a-1b and the single layer described above, however the zipper layout, unlike the single layer of, for example, FIGS. 5a-5c, 9, 12, 13, 27-30 also includes row (Y) touch surfaces.

A single layer detection algorithm is now described with reference to FIG. 4c: The following section describes how the coordinates of multiple touch points are extracted from a touch panel, a portion of which is similar to the one depicted in FIG. 10a.

Referring to FIG. 10a: Each E surface is marked with an elliptical shape. The dotted circles represent the centers of each E surface. The center of each touch surface is defined by the center of mass of the touch surface shape (e.g. the point from which the shape's area is equally distributed along both axes). In the lower and upper edges of the touch panel, there may be some touch surfaces which are lopped off due to the touch panel rectangular topology. For these touch surfaces, the center is defined as the center of mass of the virtual full touch surface shape as if it were not lopped of.

A suspected touched E surfaces list or "suspected touched surface list" is generated which includes a list of E surfaces whose measured capacitance was greater than the touch detection threshold. Typically, the threshold is determined, per panel type, in a setup stage or during the system (e.g. Smartphone, in which the touch panel resides) development stage.

A Primary touch E surface (touch surface which was selected to mark a touch point) is selected from the Suspected touched E surfaces list.

"Neighboring E surfaces" refer to E surfaces that reside in proximity to the selected E surface. Typically, as shown in FIG. 10a, each E surface has at most eight neighboring E surfaces: Upper, Upper-left, Upper-right, Far-left, Far-right, Lower-left, Lower-right and Lower.

A valid neighboring E surfaces list or "valid neighbors list" is generated which includes a set e.g. list of neighboring E surfaces which influence the touch position which was discovered by a primary touch E surface A neighboring E surface is selected as a valid neighbor if
1. It is present in the "Suspected touched E surfaces list" generated above; and
2. Its addition to the valid neighbors list will not violate the following criteria:
   e. Upper neighbor cannot be included in the same set with Lower, Lower-right or Lower-left neighbor
   f. Lower neighbor cannot be included in the same set with Upper, Upper-right or Upper-left neighbor In an alternative to the detection flow diagram of FIG. 4c, the neighboring E surfaces are picked according to their capacitive sensors readings and their proximity to the primary E surface or according to other already confirmed (valid) neighbors.

In another embodiment, a sensor capacitance reading may be split between two primary E surfaces if it answers the neighboring rule for both.

Step 1140 in FIG. 4c (Determining the touch location based on primary touch point and valid neighbors) can be performed in at least the following ways:
a. Weighted average example implementation of Step 1140 in FIG. 4c:
   To determine the touched X coordinate, compute weighted average between capacitive sensor readings (above their default un-touched capacitance, e.g. after reducing the sensor reading which was received when the touch surfaces of the corresponding touch sensors were not touched) of all participating E surfaces (.e.g. primary E surface and its valid neighbors) where weights are based on X coordinates of participating E surfaces. For example, assuming that three E surfaces with X coordinates XE1, XE2 and XE3 and sensor readings RE1, RE2 and RE3 correspondingly, the X coordinate of the touch may be computed according to the following formula:

$$X \text{ coordinate} = (XE1*RE1 + XE2*RE2 + XE3*RE3)/(RE1 + RE2 + RE3)$$

To determine the Y coordinate of the touch, repeat the above, using weights based on Y coordinates of participating E surfaces, rather than on X coordinates thereof.
b. Quadratic function example implementation of Step 1140 in FIG. 4c:

1. Sum all participating E surfaces' capacitive sensors readings in each column, referred to as Colval (e.g. far left: C−2, upper-left and lower-left: C−1, upper, lower and primary touch column: C, upper-right and lower-right: C+1, far right: C+2, to obtain one scalar per column
2. Define a quadratic function that describes the column value per X coordinate, for example: $X=a*(Colval)^2+b*(Colval)+c$
3. Find the function (e.g. find parameters a, b and c from the equation in (2) above) that best fit/s the sum of all participating E surfaces' capacitive sensors readings in each column
4. Determine the X coordinate by selecting the X that yields the highest function value
5. Repeat the same procedure for Y. Because E surfaces are staggered in the Y dimension, one may take the sum of bordered E surfaces' capacitive sensors reading, as marked by the elliptic line in FIG. 10b, or use the filtered up-scaled matrix, described in FIG. 17 step 2030, as an input to the quadratic equation of (2).

c. Polynomial approximation example implementation of Step 1140 in FIG. 4c:
1. Perform a plurality of tests in which the relation between the measurements and the X location is recorded
2. Find a polynomial that best estimates the X location based on the measurements (capacitance readings).
3. Repeat steps 1, 2 for the Y coordinate d. Image processing example implementation of Step 1140 in FIG. 4c:
1. Prepare a graphic picture of the screen topology, where each E surface represents a pixel.
2. Set a value to each E surface in the graphic picture according to its capacitive sensor reading
3. Up-scale the picture. An up-scaled picture example can be seen in FIG. 11a.
4. Run a spatial (two dimensional) low pass filter on the up-scaled image. FIG. 11b shows an example of a filtered up-scaled image which resulted from applying a low pass filter function on the up-scaled picture of FIG. 11a.
5. Find the area with the maximum value, e.g. a square of pixels whose sum yields the maximum value e.g. relative to other same-sized squares.
6. Determine the X and Y coordinates of the center of that area.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order.

Any or all of computerized sensors, output devices or displays, processors, data storage and networks may be used as appropriate to implement any of the methods and apparatus shown and described herein.

The invention includes but is not limited to the following embodiments:
1. An interleaved layout e.g. as shown herein or a method for providing or using such.
2. A layout with long touch surface shapes e.g. as shown herein or a method for providing or using such.
3. A layout or method according to embodiment 2 in which touch surface shape dimensions fulfill Y>>X.
4. A layout or method according to embodiment 2 in which touch surface shape dimensions fulfill Y<<X.
5. A layout or method according to any of the preceding embodiments with two level staggering.
6. A layout or method according to any of the preceding embodiments with 3 level staggering.
7. A layout or method according to any of the preceding embodiments wherein there are at least two E surfaces on one axis and at least two on another.
8. A layout or method according to any of the preceding embodiments which is used for 'self-capacitive' touch screen applications.

Generally, FIGS. 1a-4b illustrate a single-layer touch surface apparatus according to an embodiment of the present invention, characterized by a dual-layer touch surface whose E surfaces reside on a single-layer of conductive material and may enable touch localization using only those E surfaces. In contrast, for example, FIGS. 5a-5c, 12-14, 27-30 illustrate a single-layer touch surface apparatus according to an embodiment of the present invention, characterized by a single-layer touch surface. FIG. 4c is a simplified flowchart illustration of one possible method of operation, including touch location detection, useful in conjunction with the dual-layer touch surface apparatus of FIGS. 1a-4b. FIG. 4d is a more general representation of a method of operation, including touch location detection, useful in conjunction with the dual-layer touch surface apparatus of FIGS. 1a-4b (or even the single-layer touch surface apparatus of, for example, FIGS. 5a-5c, 12-14, 27-30), since the particularities of FIG. 4c are not, of course, intended to be limiting. Generally, step 1110; step 1115; steps 1120, 1125, 1130, 1135, 1150, 1155 and 1160 taken together; and step 1140 of FIG. 4c are parallel to steps 1170, 1180, 1190 and 1200, respectively, of FIG. 4d.

Figure 21A:
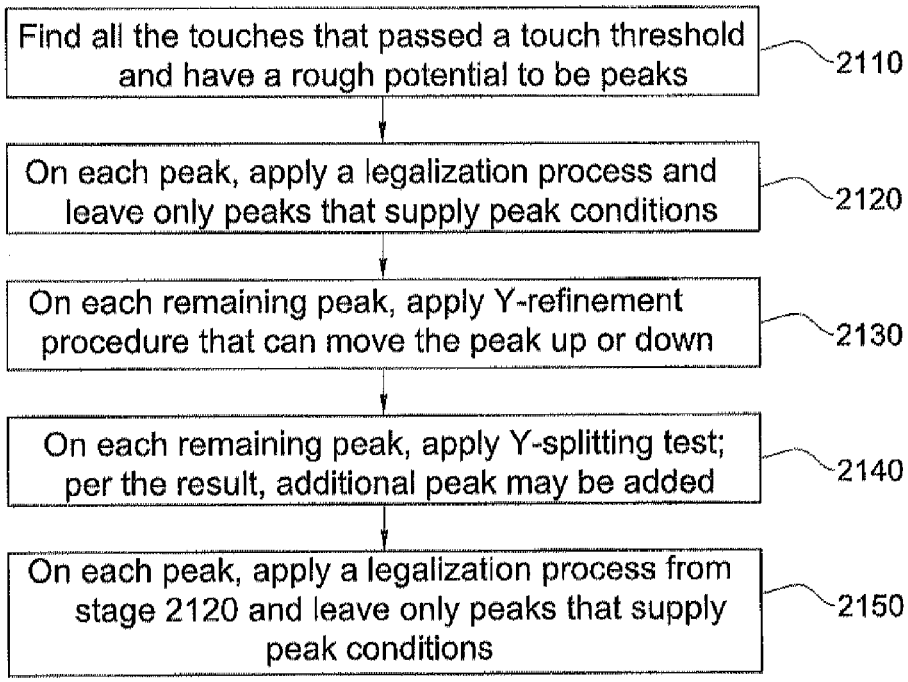
FIG. 21a is a simplified flowchart illustration of one possible method for implementing Step 2040 of the method of FIG. 17, operative in accordance with certain embodiments of the present invention.
Figure 21B:
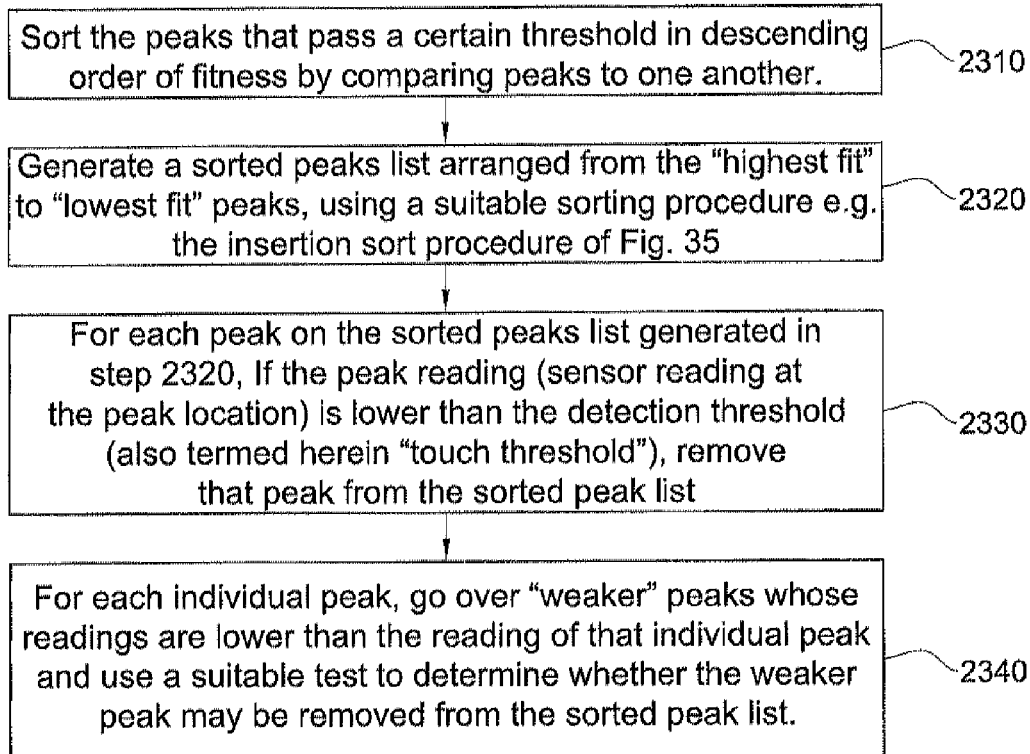
FIG. 21b is a simplified flowchart illustration of one possible method for implementing legalization Step 2120 of FIG. 21A, operative in accordance with certain embodiments of the present invention.

FIG. 17 is a simplified flowchart illustration of one possible method of operation, including touch location detection, useful in conjunction with the single-layer touch surface apparatus of, for example, FIGS. 5a-5c, 12-14, 27-30. FIG. 21a is a simplified flowchart illustration of one possible method for implementing Step 2040 of the method of FIG. 17. FIG. 21b is a simplified flowchart illustration of one possible method for implementing legalization Step 2120 of FIG. 21A.

It is appreciated that Step 1110 of FIG. 4c and step 1170 of FIG. 4d are each generally parallel to Measurement step 2000 of FIG. 17; generally, the measurement steps precede the touch location detection steps e.g. steps 2010-2050 of FIG. 17. Steps 1115-1160 of FIG. 4c are generally parallel, as a whole, to steps 2010-2040 of FIG. 17 of which, according to one embodiment, steps 2010-2030 may even be omitted. Steps 1180 and 1190 of FIG. 4d are together generally parallel to Step 2040 of FIG. 17. Step 1140 of FIG. 4c and step 1200 of FIG. 4d are each generally parallel to Step 2050 of FIG. 17; it is appreciated that this step may, as in FIG. 4c, be performed in the middle of the flow, e.g. iteratively, or may, as in the method of FIG. 17, be performed as the last Step e.g. after termination of iterations.

Figure 27:
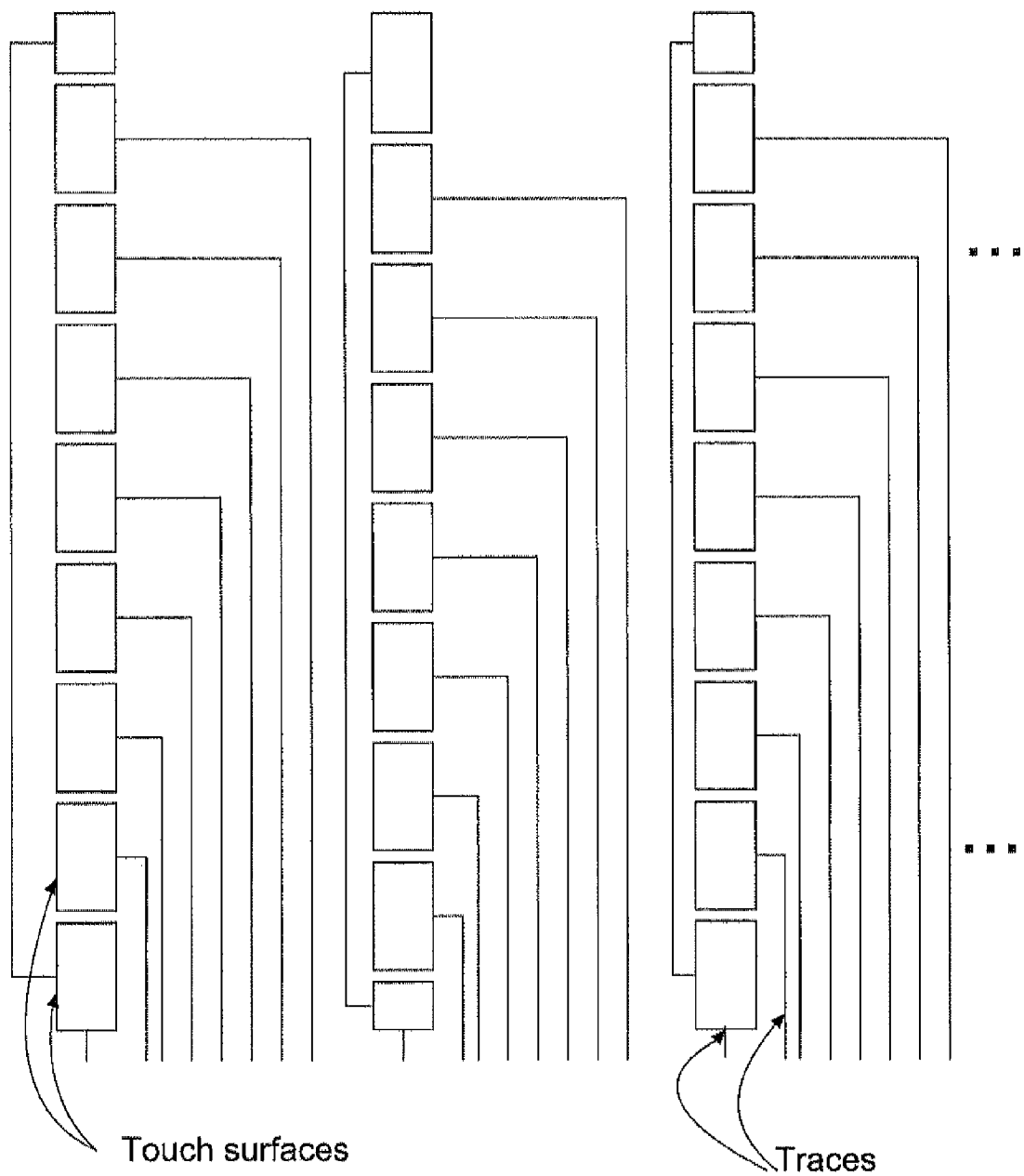
FIG. 27 is a schematic view of traces and touch surfaces forming an active area of a single-layer touch panel exemplifying certain embodiments of the present invention; the touch surfaces and traces illustrated forming part of the touch panel of FIG. 13.

FIG. 27 is a schematic description of touch surfaces forming an active area of a single-layer touch panel. In the illustrated embodiment, each touch surface comprises exactly one touch shape and all traces are routed to the bottom side of the panel.

Figure 28:
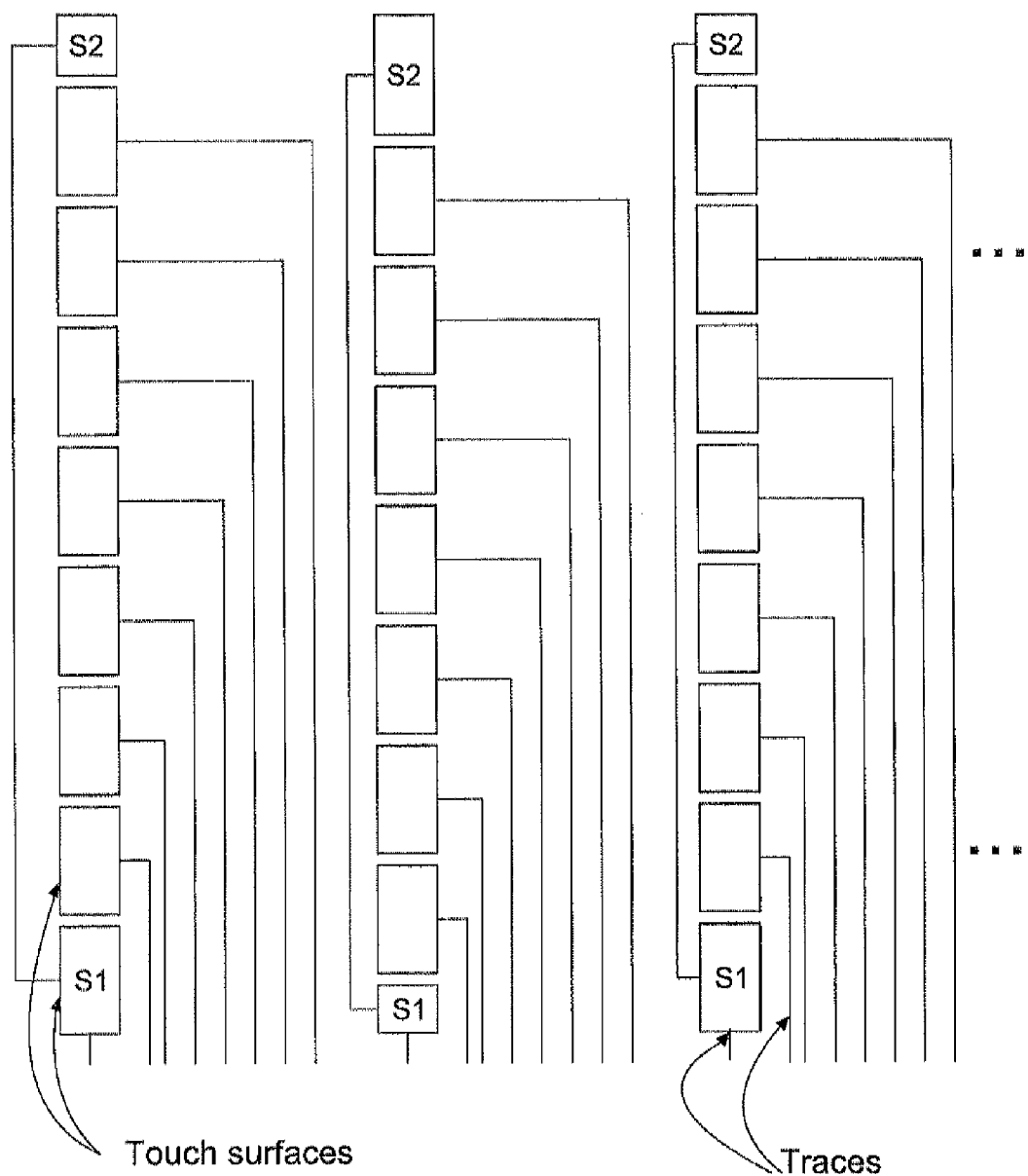
FIGS. 28 and 29 are schematic illustrations of 2 examples of touch surfaces forming an active area of a single-layer touch panel which is constructed and operative in accordance with certain embodiments of the present invention.
Figure 29:
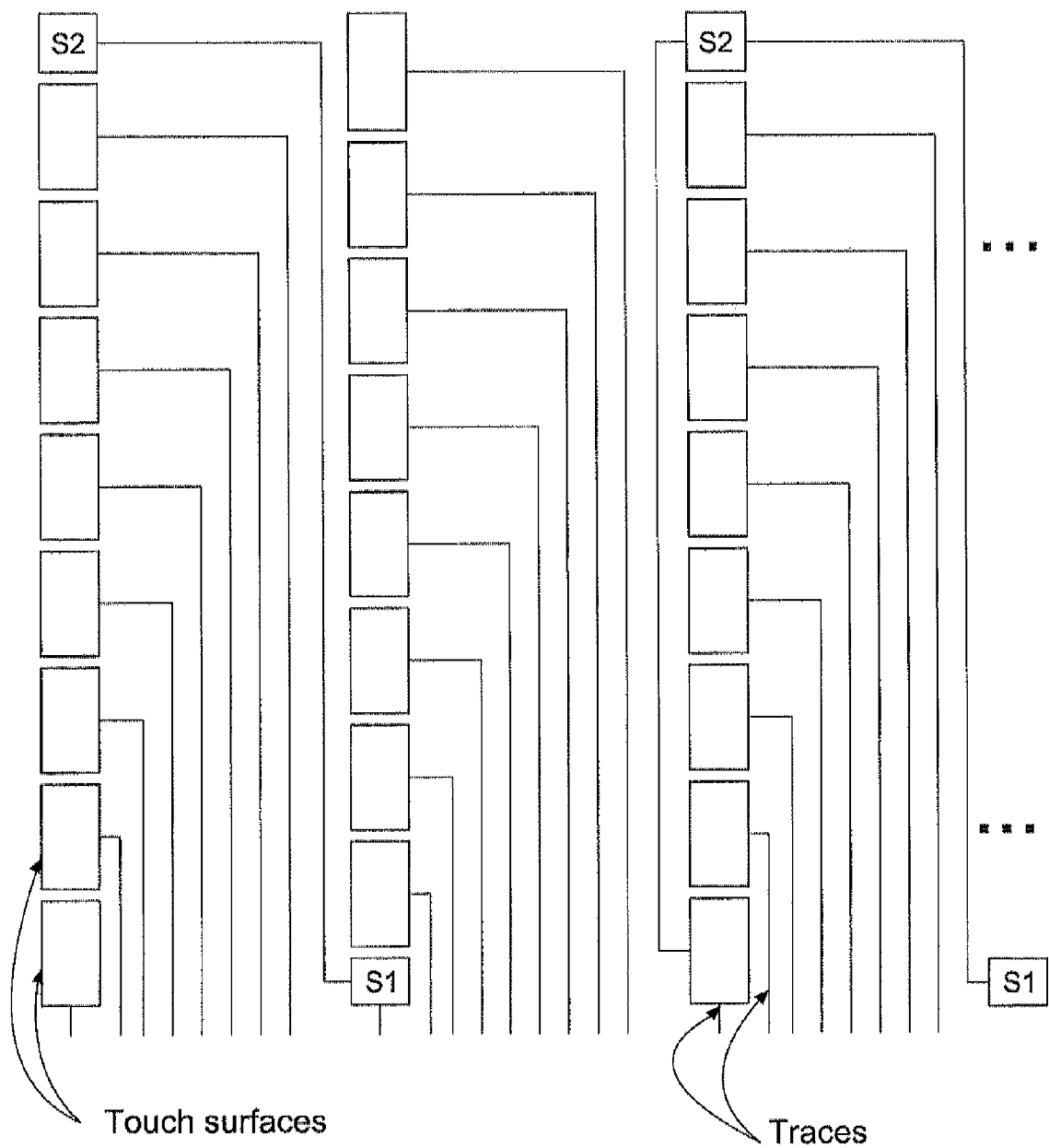

FIGS. 28 and 29 are schematic illustrations of 2 examples of touch surfaces forming an active area of a single-layer touch panel. In these embodiments, some of the touch surfaces comprise two touch shapes each, interconnected via traces. The touch shapes which form these touch surfaces are marked S1 and S2.

Figure 30:
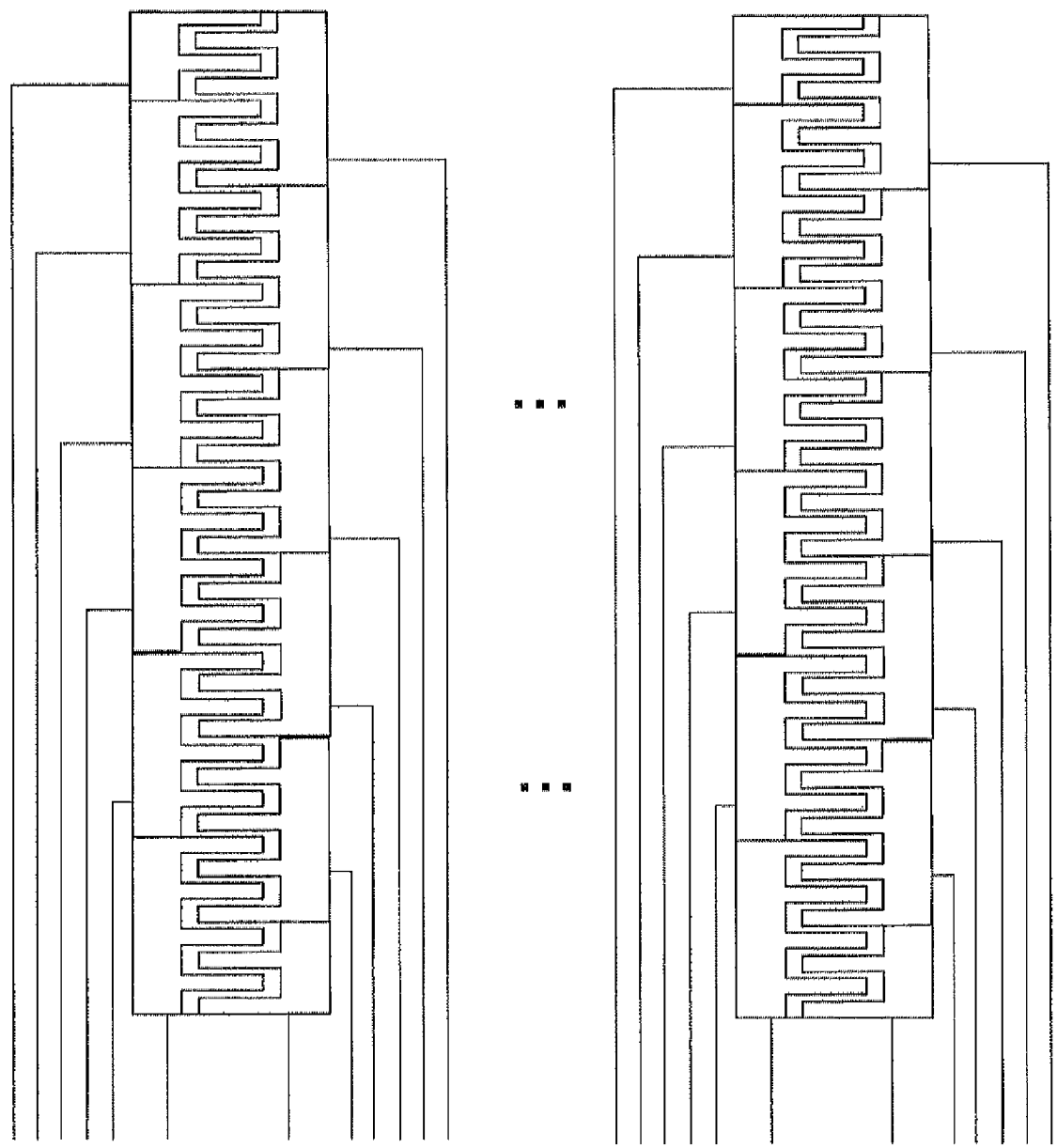
FIG. 30 is a schematic illustration of touch surfaces forming an active area of a single-layer touch panel which is constructed and operative in accordance with certain embodiments of the present invention.

FIG. 30 is a schematic illustration of touch surfaces forming an active area of a single-layer touch panel. In this embodiment, as in the embodiment of FIG. 27, each touch surface comprises exactly one touch shape and all traces are routed to the bottom side of the panel. However, in this embodiment, the touch surfaces of the odd and even columns are interleaved such that between such columns lies an area common to both.

One advantage of the layout type of FIG. 30 over, for example, rectangular layouts, may be that touch surfaces with a wider pitch may be employed, thereby reducing the number of surfaces required to cover a touch panel having a given size. The disadvantage of the layout of FIG. 30 may be that it may increase touch localization inaccuracy, especially in cases of two touch objects closely positioned side by side.

Figure 31A:
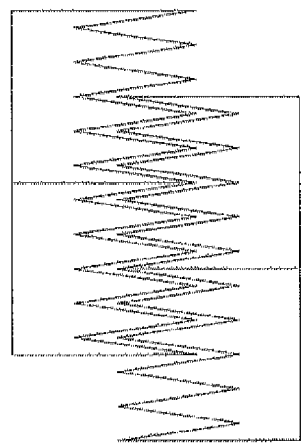
FIGS. 31a-31c illustrate other touch surface shapes that may also be used to implement the embodiment of FIG. 30, all constructed and operative in accordance with certain embodiments of the present invention.
Figure 31B:
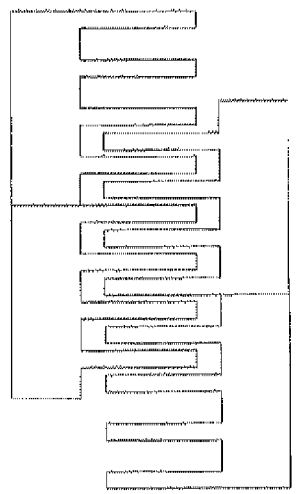
Figure 31C:
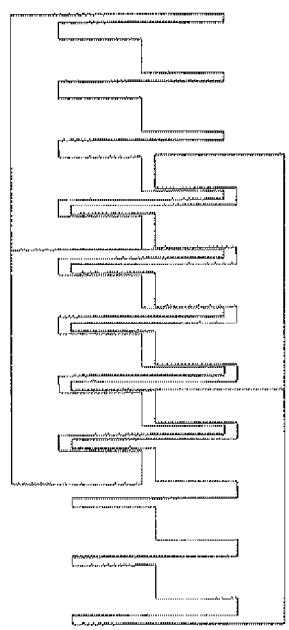

FIGS. 31a-31c illustrate other touch surface shapes that may also be used to implement the embodiment of FIG. 30. In particular, FIG. 31b illustrates a portion of FIG. 30 and FIGS. 31a, 31c illustrate the same portion, in which the touch surface shapes are modified.

Figure 32:
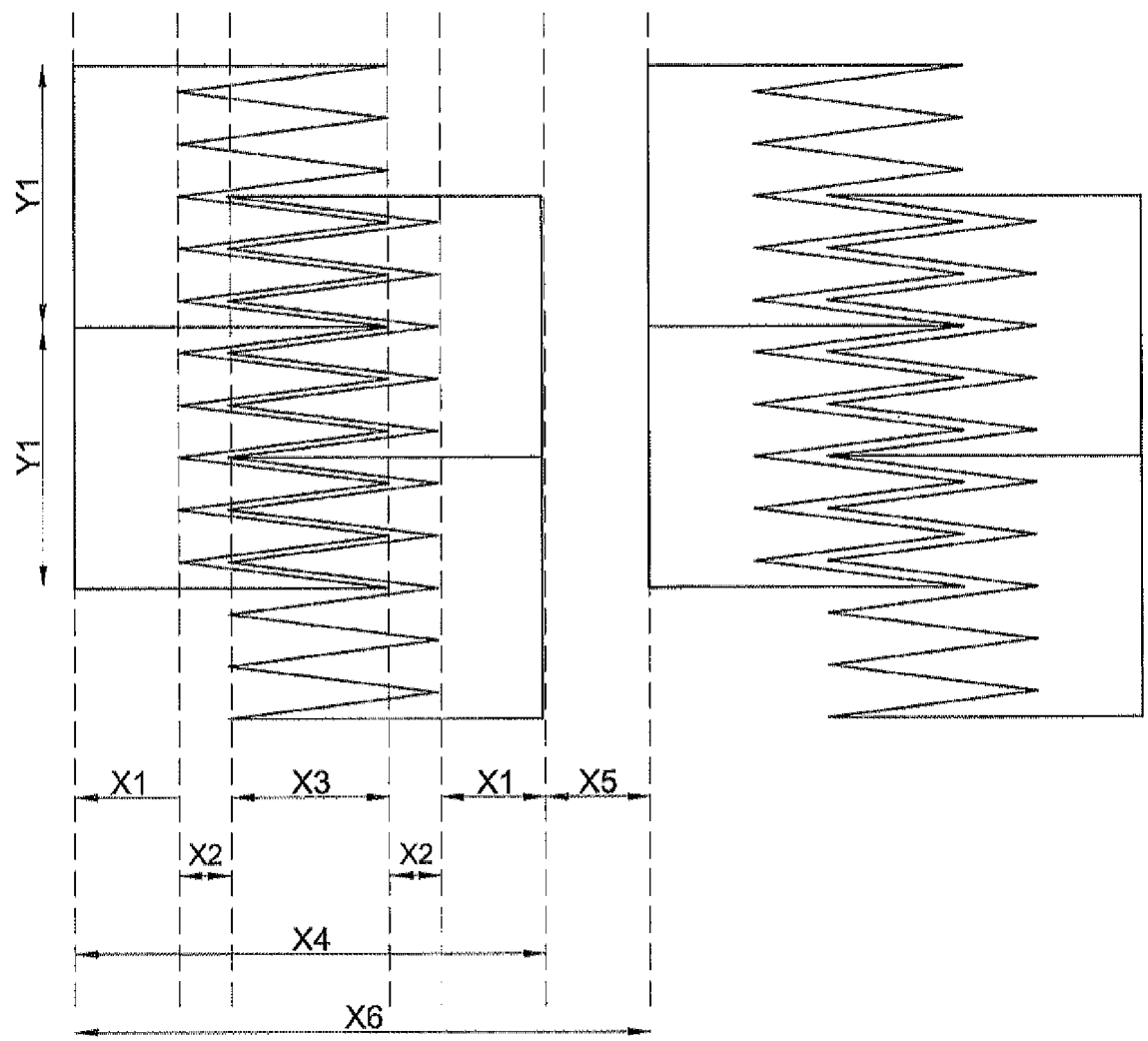
FIG. 32 illustrates an example of possible dimensions for one of the touch surfaces of FIG. 31, in accordance with certain embodiments of the present invention.

FIG. 32 illustrates an example of possible dimensions for the touch surfaces described in FIG. 31a, relating to the following numbers (in mm units):

X1=4 mm—Width of the solid portion of the each left and right column
X2=0 mm—cut width between the touch surfaces—negligible
X3=5.5 mm—The interleaved area between the columns
X4=13.5 mm—The width of the two interleaved columns
X5=1.5 mm—estimated total trace width that may require for the traces
X6=15 mm—Two columns pitch.
Y1=11 mm—Touch surface pitch in a column It is appreciated that other dimensions could fit as well, for example, Y1 may be modified so that an integer number of half of the touch surface's pitches matches the touch panel/s active area height. Y1, X1 and X3 may be shorter which employs more surfaces to cover a touch panel, but enables more accurate coordinate detection and better distinction between two close touch objects. X5 typically depends on some or all of: the touch panel minimum trace pitch, the ITO resistance, the touch sensor technology, the number of surfaces per row, the number of directions through which the touch surfaces may be routed. X5 is typically kept to a minimum given the abovementioned constraints. Typically, X1-X6 and Y1 are set such that for any touch location, touch is detected by at least two touch sensors.

Reference is now made to a further simplified layout diagram which does not show dimensions and trace routings. In particular, FIG. 12 is an example of a simplified touch panel layout suitable e.g. for the touch panel of FIG. 27.

Figure 12:
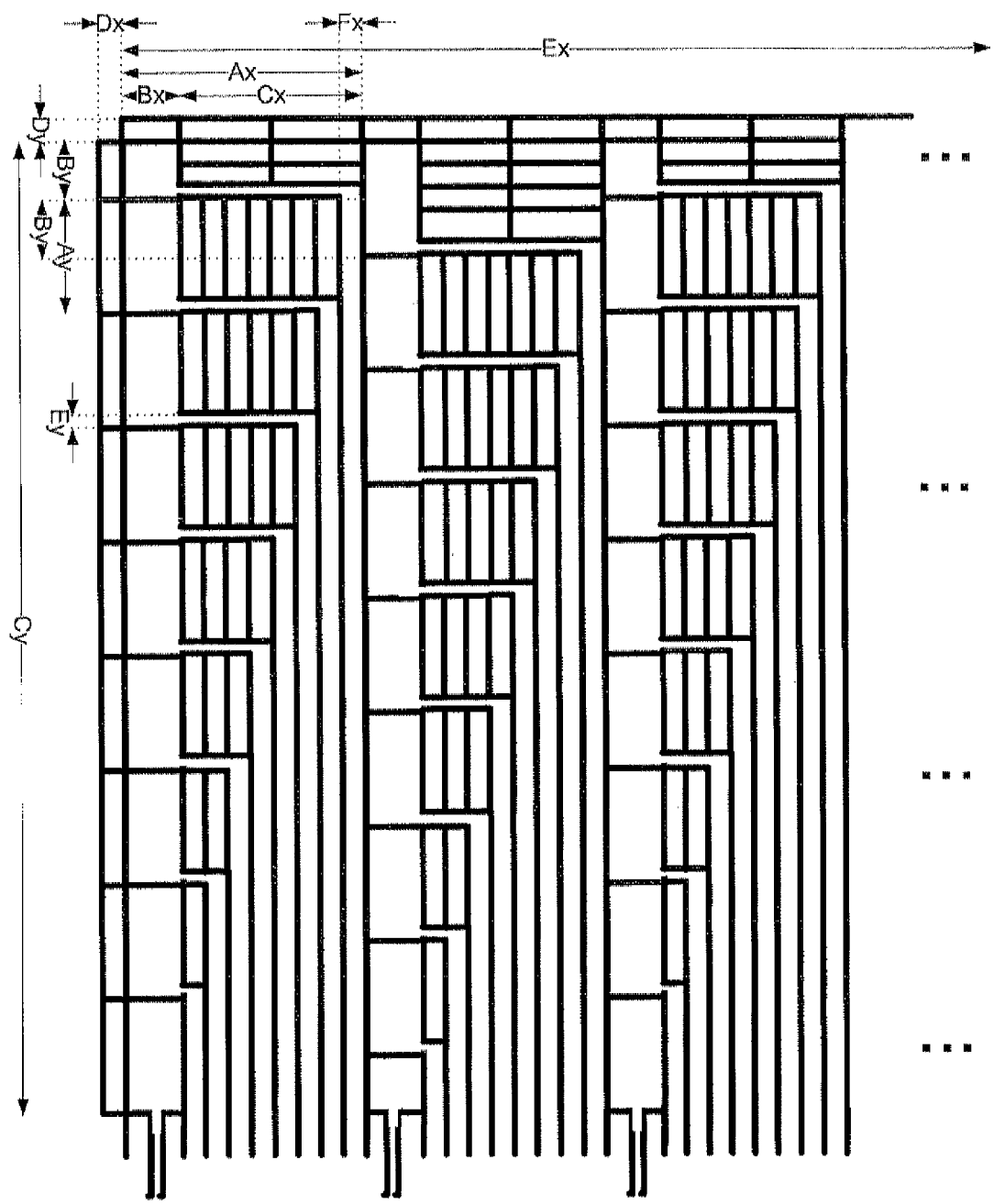
FIG. 12 is a simplified illustration of an example ITO patterning (layout) of the touch panel portion of FIG. 27.
Figure 13:
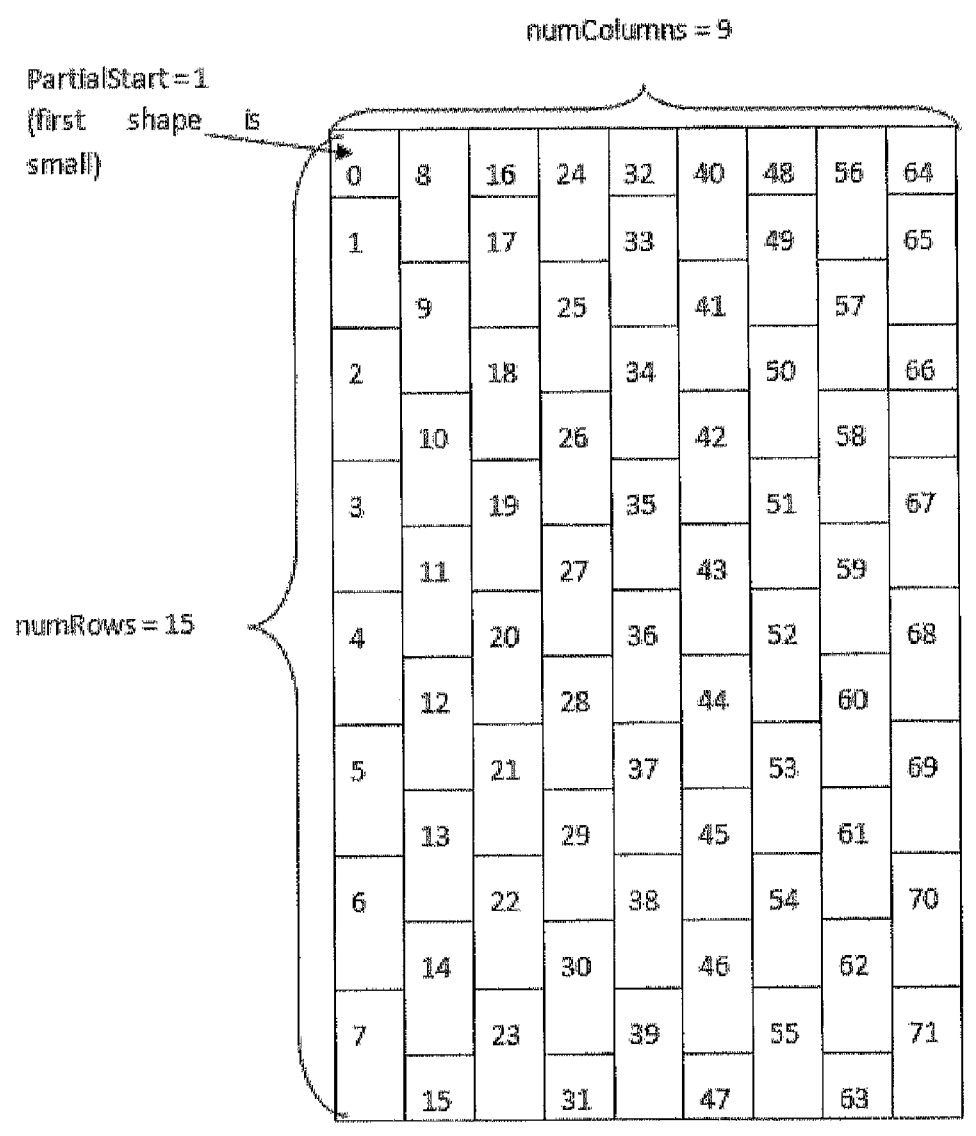

FIG. 12 shows connections to touch surfaces, whereas FIG. 13 shows geometry of the touch surfaces. It is appreciated that FIG. 12 inter alia is not necessarily proportional. The black lines represent cuts in an ITO layer.

Following are examples for the above touch panel dimensions

| | |
|---|---|
| Ax = 5 mm | Ay = 12 mm |
| Bx = 4.2 mm | By = 6 mm |
| Cx = 0.8 mm | Cy = 102 mm |
| Dx = 0.5 mm | Dy = 0.5 mm |
| Ex = 55 mm | Ey = 0.1 mm |
| Fx = 0.1 mm | |

In the above example, all sensor traces are routed to the bottom side of the panel. A connector (not depicted) is used to connect the touch surfaces traces to a touch-controller which may perform the methods described below with reference to FIGS. 17, 21.

Still referring to FIG. 12, it is appreciated that other dimensions could fit as well. For example, Ay and By may be modified so that an integer number of half touch surface pitches (By) matches the touch panel's active area height. Ay, By and Ax may be made shorter which may employ more surfaces to cover a touch panel, but enables more accurate coordinate detection and a better distinction between two close touch objects. Typically, Ax+Cx is kept smaller than 7 mm and Ay is kept smaller than 16 mm. Ey and Fx depend on some or all of on the touch panel minimum trace pitch, the ITO resistance, the touch sensor technology, the number of surfaces per row, and the number of directions through which the touch surfaces may be routed. They are typically kept to a minimum given the abovementioned constraints. Dx and Dy are optional and may change in size as appropriate, typically to at least 0.2 mm. Dx and Dy isolate the active area of the touch panel from other floating conductive materials on the touch panel. Alternatively or in addition, the surrounding conductive matter may be eliminated or connected to ground.

FIG. 12 schematically describes the touch layout, without depicting trace routings. In the illustrated example, the panel comprises 72 touch surfaces, numbered 0-71, arranged in 9 columns (numColumns=9) and 15 rows (numColumns=15), where a different row is defined each half-length of a touch surface. The surfaces are numbered in column-by-column order. Because each touch surface extends over two rows, this layout type is termed herein a "two-level" staggered layout. Three or more levels of staggering is also possible.

The touch surfaces in the layout of FIG. 12 are characterized by lengths which are approximately twice the corresponding widths, however this is not intended to be limiting. This particular layout may start, e.g. at its upper left corner, either with full-length surface (PartialStart=0) or half-length surface (PartialStart=1). In the example of FIG. 13, the first surface is half-length (PartialStart=1). The Number of touch surfaces in this layout is then computed e.g. using the following formula:

$$\text{Number of touch surfaces} = \left\lfloor \frac{(numColumns \times (numRows + 1)) + partialStart}{2} \right\rfloor$$

$$\text{Number of touch surfaces} = \left\lfloor \frac{(9 \times 16) + 1}{2} \right\rfloor = 72$$

Measurements—FIG. 17, step 2000: The sensors periodically measure the corresponding touch surfaces' capacitance. The resulting measurements are also termed herein "sensor readings". Generally, when a touch object comes in proximity to or touches a touch surface, its capacitance increases, and therefore, touch can be detected.

In one exemplary implementation, the sensor readings of the untouched touch surfaces, representing their corresponding touch surfaces capacitance, are preserved as a reference, so that when a touch occurs, the additive sensor reading, representing the additional capacitance of the corresponding touch surfaces due to touch, may be recorded. The untouched touch surfaces measured capacitance may change over time, therefore, calibration of the touch sensors may be conducted on occasion, e.g. while the touch panel is not being touched, hence is idle. Calibration may be performed either periodically, e.g., once an hour, or by demand, or as triggered by an external event for example, when the host (phone, tablet, etc) changes screen brightness. In one exemplary calibration process, each sensor is measured several times, and the value of each sensor is filtered, for example using median, averaging or a combination of the two, and the resulting value of each sensor is recorded as the untouched touch surface reference. This calibration method is time consuming but yields a very accurate reference. In another exemplary calibration process, each sensor is measured only once and the resulting values of each sensor are recorded as the untouched touch surface reference. This calibration method is less time and power consuming, but the resulting reference is of lesser accuracy.

In yet another exemplary calibration process, a partial calibration is applied, in which only some of the sensors are measured to obtain a result. According to the result, a correction to all sensors' references may be applied. For example, if there was an average increase of a certain value in the measured sensors, that value may be added to the references of all sensors. A combination of several of the above calibration methods may be applied, for example, based on partial calibration results. For example, if the difference in sensors' reference is larger than 5% of a typical touch additive contribution to the reference value, a more accurate calibration method may be conducted.

Many self-capacitance measurement methods, suitable for touch detection using touch panel as described in embodiments of the present invention are known in the art. One such self-capacitance measurement method is described in co-owned U.S. Pat. No. 7,797,115.

Measurements by sensors of touch surfaces may be carried out individually or in measurement groups—groups of simultaneously measured touch surfaces.

When using the capacitance measurement method described in co-owned U.S. Pat. No. 7,797,115, it is suggested not to measure touch surface A and touch surface B simultaneously if they have a large capacitive coupling between them. Large capacitive coupling may occur when the touch surfaces or their traces are physically close to one another. To verify that the capacitive coupling is within a reasonable level i.e. not too large, a prototype may be built on which to test that a touch on touch surface A has a small enough effect on touch surface B. As an alternative, an electrical model of the touch panel and the sensors may be developed and evaluation may then be effected using a suitable simulation tool, like Spice.

Figure 14:
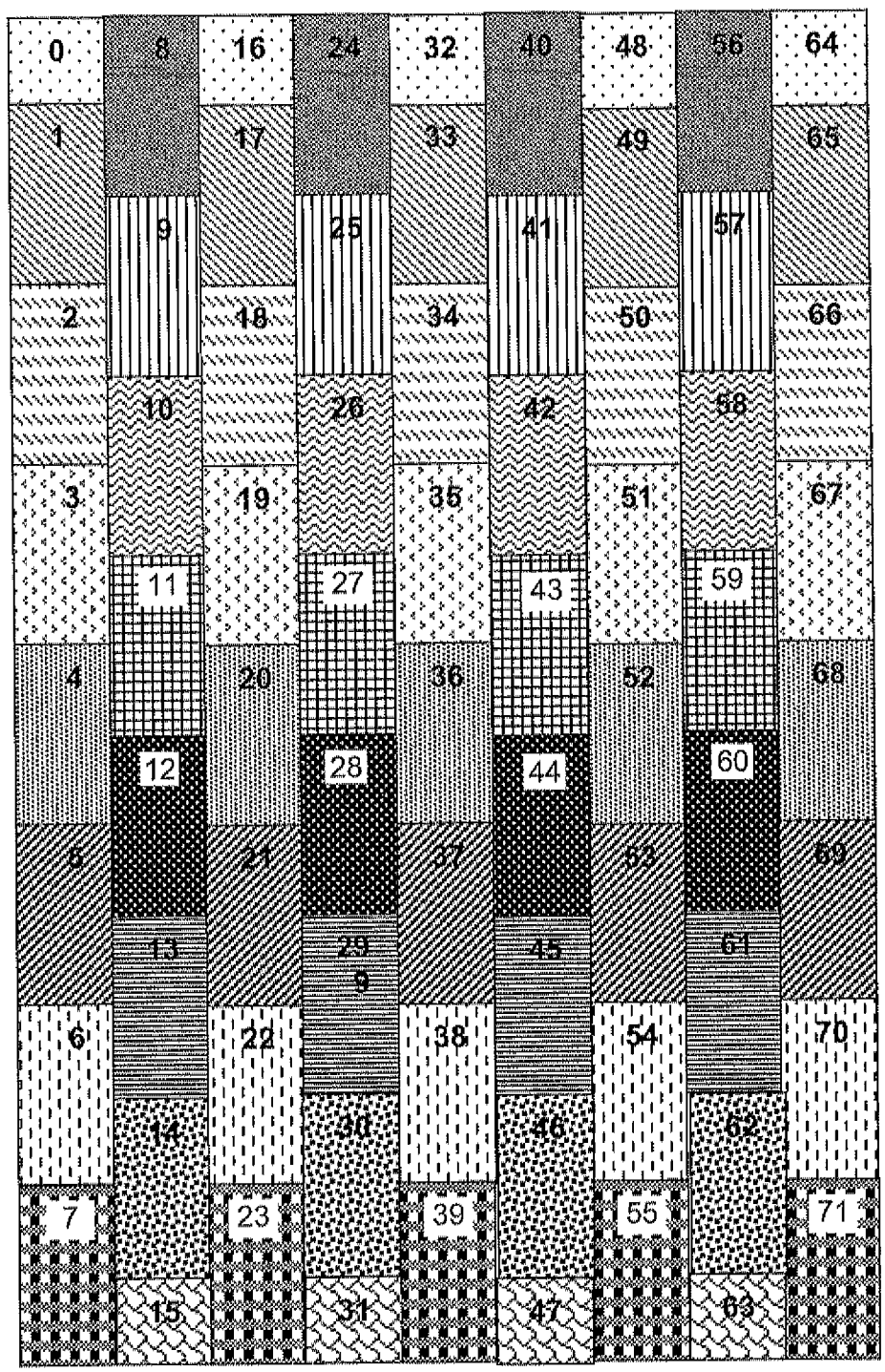
FIG. 14 illustrates a touch panel including touch surfaces grouped to measurement groups using a first grouping scheme, all in accordance with certain embodiments of the present invention.

The example of FIG. 14 illustrates a touch screen including 72 touch surfaces, grouped to measurement groups as shown. For example, touch surfaces 1 and 17 are similarly textured to indicate that they are from a single measurement group, group 2 in FIG. 15. Also, touch surfaces 2 and 18 are similarly textured to indicate that they are from a single measurement group, group 4 in FIG. 15.

Figure 15:
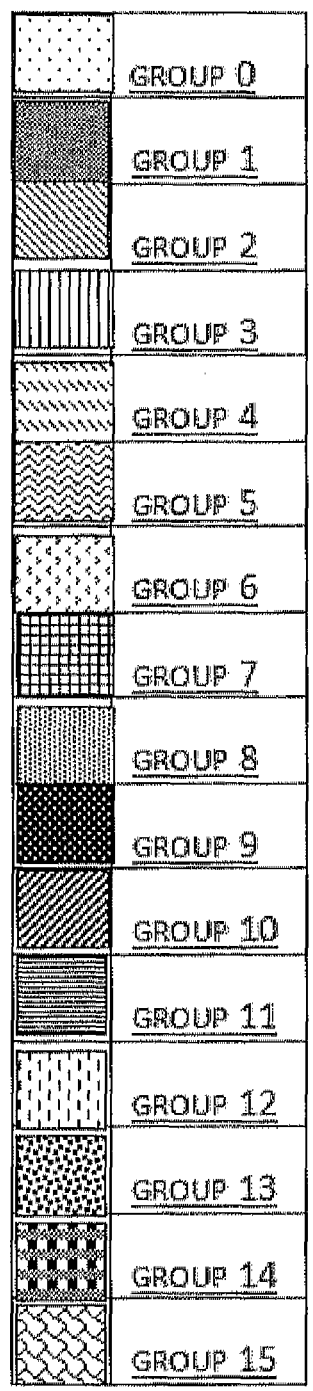
FIG. 15 is a key for FIG. 14 showing the measurement groups thereof.

FIGS. 14-15 illustrate one possible grouping, grouping 1, in which the touch surfaces of a single group, such as surfaces 1, 17, 23, 49, 65, are not found in the same column. In this example the entire touch screen includes 16 measurement groups as shown in FIG. 15.

Figure 16A:
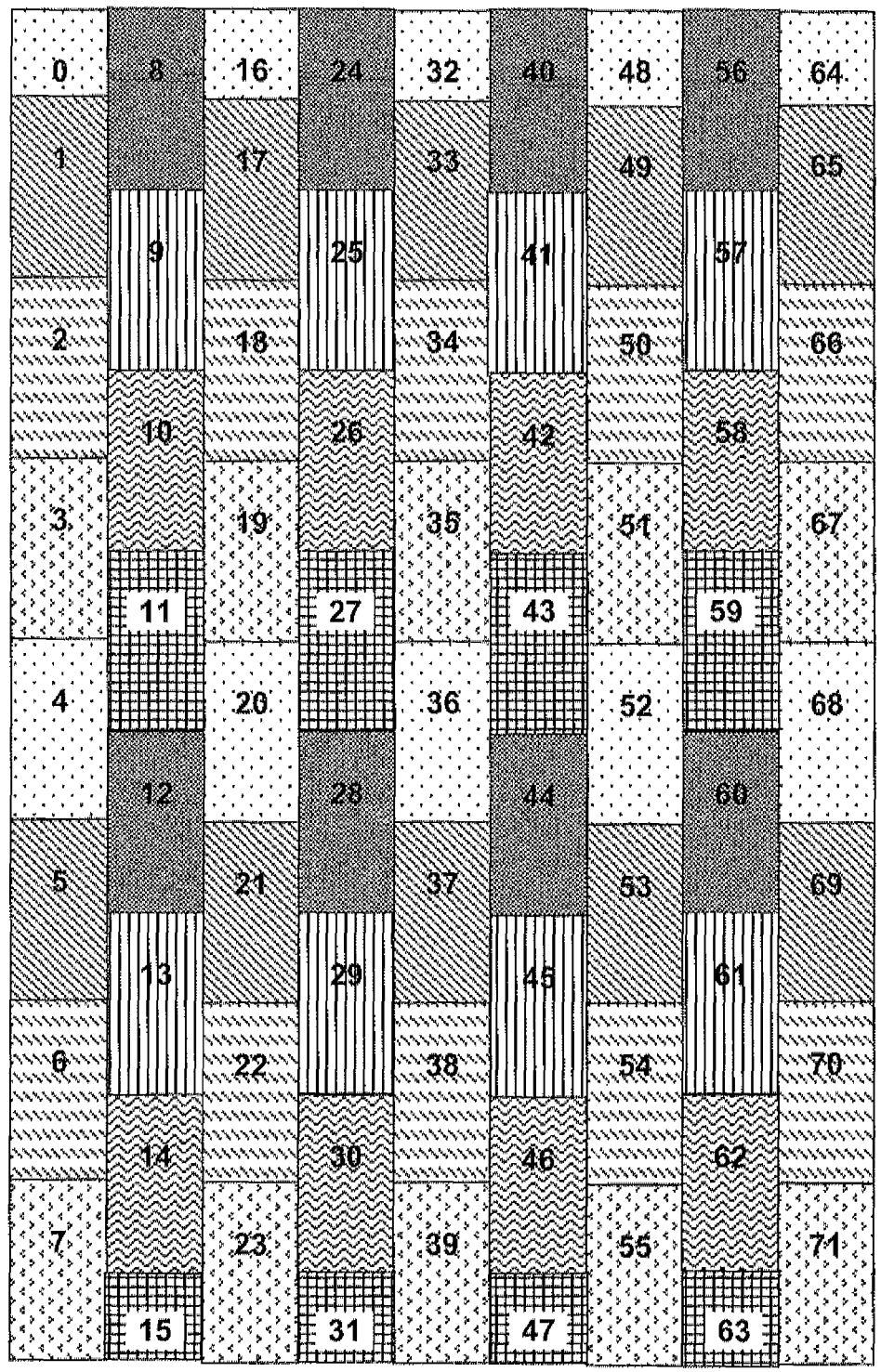
FIG. 16a illustrates a touch panel including touch surfaces grouped to measurement groups using a second grouping scheme, all in accordance with certain embodiments of the present invention.

Another possible grouping (grouping 2), as shown in FIGS. 16A-16B, is such that touch surfaces of the same group may be found in the same column, e.g. surfaces 1 and 5 or 2 and 6 or 40 and 44, but are never adjacent. In the illustrated example, there are 8 groups, as shown in FIG. 16b.

Measurement of touch surfaces is typically effected periodically e.g. in cycles: Typically, a measurement value, also termed herein "sensor reading", is supplied for each touch surface every "cycle" where a cycle typically includes 5 to 20 milliseconds. To overcome system noise, more than one measurement of each touch surface may be taken during such measurement cycle. A noise filter may then be applied on the measurement results. Such a noise filter may include for example, averaging, a median-filter, or a combination thereof. The noise filter type is typically selected to suit system requirements and constraints. An example of such filter may be: measuring each touch surface 15 times during a measurement cycle, averaging each 5 measurements, thereby to yield three averages, and taking the median of the three averages to yield a final sensor reading. For example:
Measurement set I: 33, 35, 32, 38, 35: average=34
Measurement set II: 38, 37, 32, 35, 36: average=35
Measurement set III: 22, 28, 23, 23, 23: average=23
Median=34, hence the value taken as a "sensor reading" is 34. The median values may be taken in an aggregating or in-line manner, where in-line median means that the median value is taken between the current cycle averaging and two previous cycles averaging results so that only 5 measurements are required per cycle. Aggregating median means that all 15 measurements are taken within the same measurement cycle. The above example is of an aggregating median.

Given a layout described above with reference to FIG. 14, a touch location detection method, e.g. as shown in FIG. 17, may be operative to perform some or all of steps 2010-2050, suitably ordered e.g. as shown, once per cycle. Typically, the method obtains the touch surfaces measurement readings from measurement step 2000 as input and computes the location of touching objects on the touch panel.

The touch location detection steps 2010-2050 of FIG. 17 are now described in detail.

At step 2010, the raw data representing touch intensity on each one of touch surfaces on the panel, undergoes fixing if needed, to compensate for capacitive coupling effects between adjacent touch elements. This step is optional.

The touch surfaces and their corresponding traces (touch elements) might have a cross coupling (capacitive coupling) with other touch surfaces and their corresponding traces. Typically, such a cross coupling is more likely to happen between traces which pass near others of the same measurement group. For example, in some embodiments, the resulting inaccuracy may reach 5% to 10% of the touch additive value, i.e. a non touched touch surface may show a false additive measurement reading of 5% to 10% of the coupled touched touch surface. In such a case, the false additive measurement values may be recorded, typically during the development stage of the system (e.g. Smartphone, on which the touch panel resides). Recording may for example be effected by touching each touch surface in its turn and recording the percentage of the touch surface's touch intensity that was reflected by the untouched touch surfaces sensor readings. This percentage is referred to as the false additive percentage. The false additive percentage may be stored in a computer-memory stored cross coupling table at which each touch sensor has a list of influenced sensors with their corresponding false additive percentage. The false additive percentage may be compensated during run time. Typically, small false additive percentage values, e.g. less than 2%, are not retained in the table, to reduce memory and computation power.

The output of step 2010 is a list of sensors' readings. In steps 2020 and 2030, the list of 72 (say) sensor readings provided once per cycle, once per touch surface as depicted in FIG. 13) is typically converted into a 2-dimensional matrix of aligned rectangles (rows and columns) also termed herein "up-scaled matrix" which compensates distortion caused by staggered layout.

For this purpose, each touch surface may be split e.g. partitioned into virtual surfaces in a process termed herein "upscaling". The number of virtual surfaces into which each touch surface is split may be equal to the staggering layer. Each one of the virtual surfaces is assigned the same sensor reading value as its originating touch surface. So, the term "virtual surfaces" is typically used to refer to a set of touch screen regions (a) obtained by partitioning each of the touch surfaces; (b) which are aligned rather than staggered relative to other columns; and (c) to which are assigned the same sensor reading value as the touch surface partitioned to obtain the "virtual surface".

Figure 18:
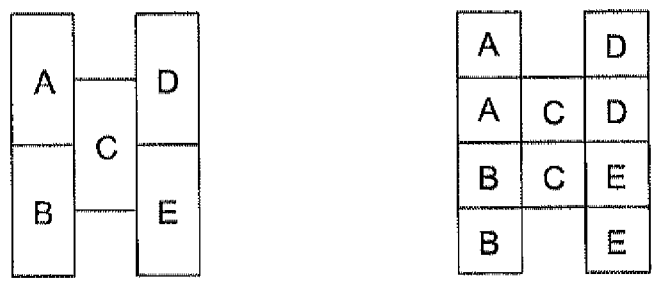
FIGS. 18, 19 illustrate an example useful in understanding Step 2020 of FIG. 17, in accordance with certain embodiments of the present invention.
Figure 19:
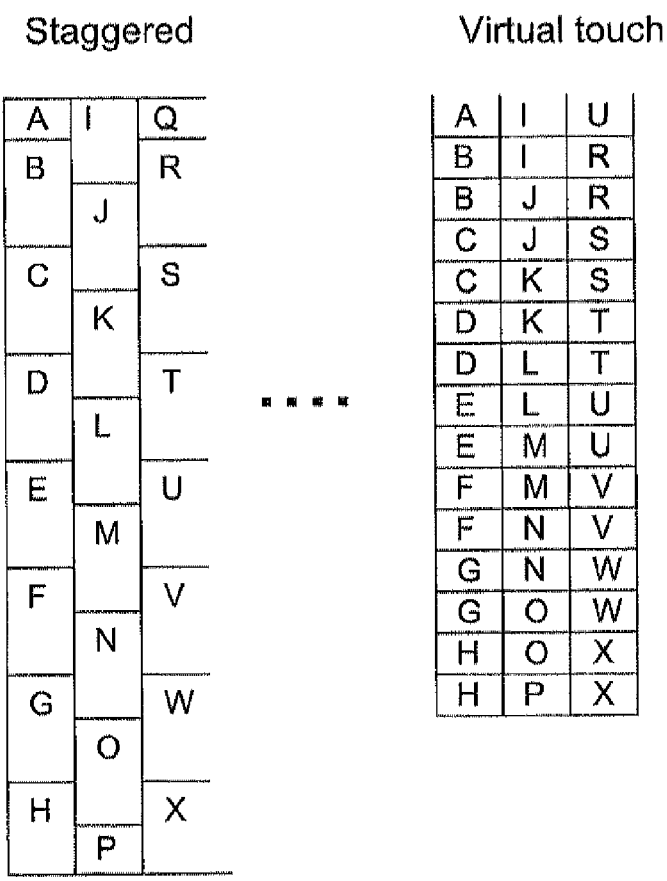

For example, sensor values of 5 surfaces, from among the surfaces of FIG. 13 (say), in the example shown in the left-hand image in FIG. 18, are denoted A, B, C, D, E. The right-hand image in FIG. 18 depicts the allocation of the virtual surfaces of the corresponding portion of the up-scaled matrix. A larger segment of the touch panel is shown in FIG. 19 in which again, the right-hand image depicts a portion of the up-scaled matrix. Step 2030 of FIG. 17 uses up-scaled matrix so generated. So, Steps 2020 and 2030 are typically operative to transform from a staggered sensors configuration which is more area efficient to a filtered up-scaled matrix with higher resolution to which standard detection methods may be applied, thereby to detect touch object locations.

The up-scaled matrix generated by Step 2020 might suffer from distortion caused by staggered layout. So, in step 2030, a filter aimed to remove the distortion may be applied, thereby to create a filtered up-scaled matrix which is used for touch detection and coordinate computation steps 2040, 2050 of FIG. 17. Elements in the filtered up-scaled matrix are examples of virtual surfaces.

Figure 20:
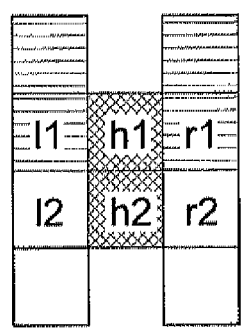
FIG. 20 illustrates an example useful in understanding Step 2030 of FIG. 17, in accordance with certain embodiments of the present invention.

For example, a possible distortion-fixing filter may be applied to determine the filtered value of virtual surfaces h1 and h2 as depicted in FIG. 20 based on their original values and on the values of their virtual surfaces neighbors l1, l2 r1 and r2 as depicted in FIG. 20 that were computed in Step 2030:

$$W1 = \min(L1, R1)/a + \max(L1, R1)/b;$$

$$W2 = \min(L2, R2)/a + \max(L2, R2)/b;$$

$$H1F = (H*W1)/((W1+W2))$$

$$H2F = (H*W2)/((W1+W2))$$

where:
L1=value of virtual surface l1 as computed in Step 2020
L2=value of virtual surface l2 as computed in Step 2020
R1=value of virtual surface r1 as computed in Step 2020
R1=value of virtual surface r2 as computed in Step 2020
H=value of virtual surfaces h1 and h2 as computed in Step 2020
H1F=is the resulting filtered value of virtual surface h1 as computed in Step 2030
H2F=is the resulting filtered value of virtual surface h2 as computed in Step 2030
and where a and b may vary; for example a=1; b=4. It is appreciated that any 2 values, such as a=1, b=2, which are empirically or otherwise known to provide good touch detection may be employed. The optimal a and b settings may be different from one system to another; several combinations of a and b values may be considered and the combination that yields the best touch detection may be employed.

The resulting computed theoretical capacitance readings of the virtual surfaces (e.g. H1F and H2F) are referred to as filtered virtual reading.

Step 2040 of FIG. 17 includes detecting the number of and rough location of touch peaks used to compute coordinates. An example method for performing Step 2040 is shown in FIG. 21a.

In Step 2110 of FIG. 21a, the method typically finds all the filtered virtual readings that passed a touch threshold hence have a rough potential to be peaks. The threshold may be set, for example, to the smallest possible filtered virtual reading that a valid touch peak may have. This value may differ from one device model to another.

Figures 22A, 22B, 23:
FIG. 22a is a pictorial illustration of neighbor-relations useful in understanding step 2310 of FIG. 21b, in accordance with certain embodiments of the present invention.
FIG. 22b illustrates an example useful in understanding step 2310 of FIG. 21B, in accordance with certain embodiments of the present invention.
FIG. 23 is an illustration of an original matrix fragment and search area matrix, in accordance with certain embodiments of the present invention.

Step 2120 of FIG. 21A typically comprises a legalization process applied to each peak, which typically discards some peaks and leaves only peaks that satisfy predetermined peak conditions, thereby to filter out most of the non-genuine peaks out of the list created in Step 2110 of FIG. 21a. An example legalization method with example predetermined peak conditions is shown in FIG. 21b and described in detail below. The method of FIG. 21b may include some or all of the following steps, suitably ordered e.g. as shown. In step 2310 of FIG. 21b, peaks are compared so as to sort in descending order of fitness e.g. suitability to be deemed a peak, using a suitable "fitness" criterion, such as for example the following:

One criterion for fitness may be generated by grading filtered virtual readings according to their size, i.e. a higher filtered virtual reading means a better fitness. Another criterion for fitness may be generated by taking peak neighbors into account, for example, relating to FIG. 22a, let P1 and P2 be potential peaks with upper and lower neighbors P1h, P1l, P2h and P2l as depicted in FIG. 22a, let RP1 be the filtered virtual reading of P1,
let RP2 be the filtered virtual reading of P2,
let RP1h be the filtered virtual reading of P1h,
let RP1l be the filtered virtual reading of P1l,
let RP2h be the filtered virtual reading of P2h and
let RP2l be the filtered virtual reading of P2l.
If (P1+P1l+P1h+ABS(P1h−P1l))>P2+P2l+P2h+ABS(P2h−P2l)) then P1 is a better fit; else, P2 is a better fit.

Still referring to FIG. 22a and to the above notations, the following pseudo-code represents another example of how neighbors may be taken under consideration when evaluating fitness:

```
If ( RP2 > RP1 ) {
    If (((RP2h + RP2l) < (RP1h + RP1l)) AND (ABS(RP2h − RP2l) < ABS(RP1h − RP1l)));
        P1 is a better fit.
    Else
        P2 is a better fit
}
Else {
    If (((RP2h + RP2l) < (RP1h + RP1l)) OR (ABS(RP2h − RP2l) < ABS(RP1h − RP1l)));
        P1 is a better fit.
    Else
        P2 is a better fit
}
```

FIG. 22b demonstrates a numerical example corresponding to the above pseudo-code showing that P2 may be selected as a better fit even though its value is lesser than P1. In the example of FIG. 22, for P2 to be selected, the following expression should be FALSE:

$$(((RP2h+RP2l)<(RP1h+RP1l)) \text{OR} (ABS(RP2h-RP2l)< ABS(RP1h-RP1l)));$$

Setting the numbers in place yields:
⇒ (((95+50)<(90+50)) OR (ABS(95−50)<ABS(90−50)))
⇒ ((145<140) OR (45<40))
⇒ FALSE
⇒ P2 is a better fit.

In step 2320 of FIG. 21*b*, the sorted peaks list is sorted from the "highest fit" to "lowest fit" peaks, using a suitable sorting procedure e.g. the insertion sort procedure of FIG. 35.

In FIG. 35, the DETECTION_PeakCompare( ) routine may comprise use of the above-described "fitness" criteria described above.

In step 2330 of FIG. 21*b*, if the peak reading is lower than the detection threshold ("touch threshold), remove that peak from the list.

In step 2340 of FIG. 21*b*, for each peak, go over peaks whose readings are lower than current reading and test whether the weaker peak may be removed. A suitable condition (also termed herein a "peak removal test") determining that the weaker peak may be removed is for example:

i. If the two compared peaks are vertically or horizontally adjacent e.g. referring to FIG. 22, P1 is vertically adjacent to P1h and to P1l, is diagonally adjacent to P2h and to P2l and is horizontally adjacent to P2. And/or:

ii. If one or both of the peaks represents a "wide" touch, e.g. the width of the touch is at least 25 mm on X axis and 50 mm on Y axis, Then the removal condition for the weaker peak may be:

Delta$X$=|$X(P1)$−$X(P2)$|

Delta$Y$=|$Y(P1)$−$Y(P2)$|

Width$X(P1)$
value defining how much area this touch object takes on X axis, in mm
Width$Y(P1)$
value defining how much area this touch object takes on Y axis, in mm (Delta$X$<=2 AND Delta$Y$<=1)

AND

Width$X(P1)$≥25 & Width$Y(P1)$≥50)

The weaker peak is typically removed if and only if the above removal condition is true.

In some embodiments, two close touch objects may yield only one peak. A single peak resulting from two close touch objects may be characterized by a long flat plateau with sharp slopes along one axis, typically along the long axis of the touch surfaces and a much shorter plateau, ruling out a thumb or wide single object, along the orthogonal axis. For example, referring to the embodiment of FIG. 10*a*, the primary touch E surface and its neighbors may represent two close touch objects if the upper and lower neighbors are higher than the far-left and far-right neighbors. In such a case a peak splitting procedure may be employed, for example, as described in steps 2130 and 2140 of FIG. 21A.

Step 2130 of FIG. 21A comprises a Y-refinement process in which a peak is moved either up or down.

On each remaining peak (from those that were not ruled out during the legalization process e.g. as described in FIG. 21*a* step 2340), an optional Y-refinement procedure may be applied e.g. as shown in FIG. 21*a* Step 2130, in which the peak may be moved one virtual surface up or down.

To apply this step, do the following for each remaining peak:
Create a search area for secondary peaks.
  Sum the column of the peak with the two adjacent columns (the column on the left and the column on the right if any)
  Take the portion of the summed column which does not overlap with other peaks in any of: the same column, the column on the left and the column on the right. For example, referring to FIG. 23, if r3, m3 or l3 were remaining peak, then the rows of m2 and m3 would not be taken as part of the summed column.

The original matrix fragment and search area matrix are shown in FIG. 23.

The method aims to decide whether the peak is located at the original location y(P), one virtual surface up or one virtual surface down (the bolded area in the search matrix of FIG. 23. This may be done by performing some or all of the following:

Refine peak Y location by max grade criteria:

$$\text{Grade}[n] = z[n] - \left(\frac{z[n-1] + z[n+1]}{2}\right)$$

where z is the value for the search area matrix, and n may take values of y(P), y(P)−1 or y(P)+1.

The Y virtual surface of the peak P is selected at the location from among y(P), y(P)−1 and y(P)+1 which received the highest grade. For example, referring to FIG. 23:

$$\text{Grade}(y(P)) = 10 + p + r0 - \left(\frac{l1 + m1 + r1 + L1 + M1 + R1}{2}\right),$$

$$\text{Grade}(y(P) - 1) = l1 + m1 + r1 - \left(\frac{l2 + m2 + r2 + 10 + P + r0}{2}\right),$$

$$\text{Grade}(y(P) + 1) = L1 + M1 + R1 - \left(\frac{10 + P + r0 + L2 + M2 + R2}{2}\right)$$

So, if Grade(y(P)) is the largest, the peak remains in the same position; if Grade(y(P)−1) is the largest, the peak is repositioned at m1 location; and if Grade(y(P)−1) is the largest, the peak is repositioned at M1 location.

Step 2140 of FIG. 21A comprises a Y-splitting test applied to each remaining peak which determines whether or not to split an existing peak into two peaks on the Y axis. Typically, if and only if the test is satisfied, the current peak is split into 2 on Y axis. Sometimes, two close touch objects roughly positioned on the same or on adjacent columns (e.g. m1 and M1 of FIG. 23) may create only one peak. Step 2140 defines a method for detecting the additional peak; this method is referred to as the "Y splitting test". For the Y splitting test, the search area for secondary peaks is used (as was done in Step 2130).

Step 2150 of FIG. 21A typically comprises a legalization process, which may be similar, mutatis mutandis, to the previous legalization process, that of step 2120.

Figure 24:
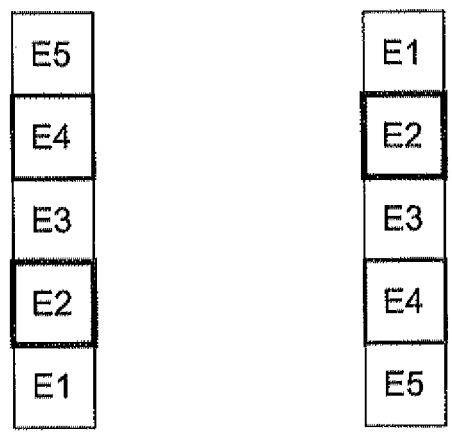
FIG. 24 is an illustration of search area matrices, in accordance with certain embodiments of the present invention.

Example of the operation of FIG. 21A: Search area matrix fragments are shown in FIG. 24. Operation of the method of FIG. 21A on these is now described:

In the example of FIG. 24, the E2 is an existing peak. The Y-splitting test of Step 2140 checks whether E4 is also a peak. For example, the test may be that E4 is a peak if all the following conditions are satisfied:

$E5*3+E4>E2$ $E3>=E4$ $E4>=E5$ $E3*(E4-E5)/(E4-E5+E2-E1)<E4$

Step 2150: At each peak, repeat the legalization process of Step 2120 on the output of steps 2130 and 2140

Step 2050 of FIG. 17 is now described.

At this point all the peaks are finalized in the sense that all candidate peaks have been verified to be peaks, and X and Y coordinates are computed around each peak found. The coordinates may for example be computed using a weighted average e.g.:

$$x = \frac{\sum_{i=0}^{n} w_i x_i}{\sum_{i=0}^{n} w_i}$$

$$y = \frac{\sum_{i=0}^{n} w_i y_i}{\sum_{i=0}^{n} w_i}$$

Referring to the above formula, $x_i$ represents the x-coordinates of the centers of each virtual surface used to compute the x-coordinates ('x') of the touch. $y_i$ represents the y-coordinates of the centers of each virtual surface used to compute the y-coordinates ('y') of the touch. $w_i$ represents the filtered virtual reading of the corresponding virtual surfaces.

Figure 36:
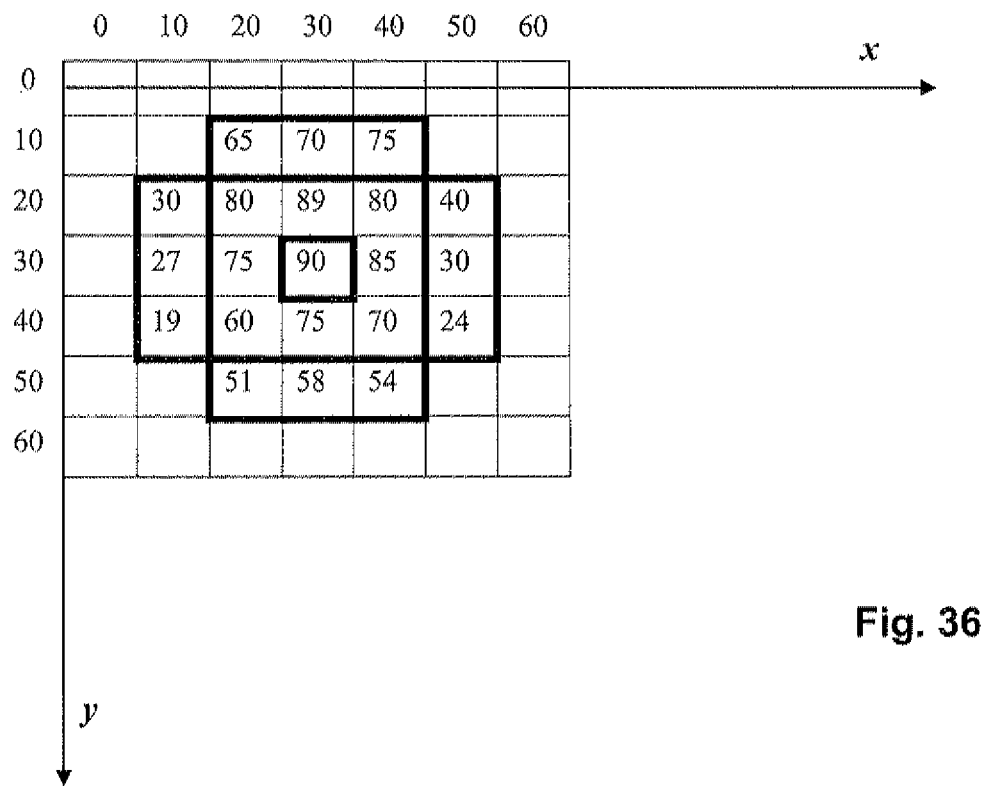
FIG. 36 is a pictorial illustration of an example of touch surfaces surrounding a current "local maximum" touch surface of interest, in accordance with certain embodiments of the present invention.

FIG. 36 shows an example of several filtered virtual readings corresponding with a filtered up-scaled matrix as described in FIG. 17 step 2030, which may be used for computation of X and Y coordinates of a peak filtered virtual reading in the middle with filtered virtual reading of 90. In this instance, using the above peak localization process, the x coordinate of the peak would be 30.6 and the y coordinate would be 30.3:

$$x = \frac{\sum_{i=0}^{n} w_i x_i}{\sum_{i=0}^{n} w_i}$$

$$= \frac{\begin{array}{c}30*10 + 80*20 + 89*30 + 80*40 + 40*50 + 75*20 + \\ 90*30 + 86*40 + 30*50 + 19*10 + 60* \\ 20 + 75*30 + 70*40 + 24*50\end{array}}{\begin{array}{c}30 + 80 + 89 + 80 + 40 + 27 + 75 + 90 + 85 + \\ 30 + 19 + 60 + 75 + 70 + 24\end{array}} =$$

$$= 30.6$$

$$y = \frac{\sum_{i=0}^{n} w_i y_i}{\sum_{i=0}^{n} w_i}$$

$$= \frac{\begin{array}{c}65*20 + 70*30 + 75*40 + 80*20 + 89*30 + 80*40 + \\ 75*20 + 90*30 + 85*40 + 60*20 + 75*30 + \\ 70*40 + 51*20 + 56*30 + 54*40\end{array}}{\begin{array}{c}65 + 70 + 75 + 80 + 89 + 80 + 75 + 90 + 85 + 60 + \\ 75 + 70 + 51 + 58 + 54\end{array}} =$$

$$= 30.3$$

In the above example, all 15 virtual surfaces of the wide and short bolded rectangle are used for X coordinate computation and all 15 virtual surfaces of the narrow and high bolded rectangle are used for Y coordinate computation, because there are no adjacent peaks and all far filtered virtual readings' neighbors were lower than the corresponding nearer neighbors. However, it is appreciated that if this is not the case, e.g. if some far filtered virtual readings' neighbors are not lower than the corresponding nearer neighbors, then less than all of the virtual surfaces would have been used for X or Y coordinate computation.

It is appreciated that this results in a more accurate localization of the peak than would have resulted by merely noting that 90 is a local maximum hence defining the x,y location of the peak as 30, 30.

Figure 25A:
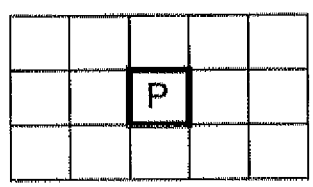
FIG. 25a-25d are pictorial illustrations of windows of 5×3 virtual surfaces which may be used for X and Y coordinate computation which, as examples, are useful in understanding step 2050 of FIG. 17 in accordance with certain embodiments of the present invention.
Figure 25C:
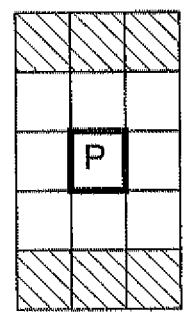
Figure 25B:
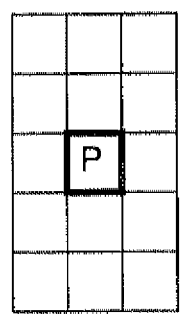
Figure 25C:
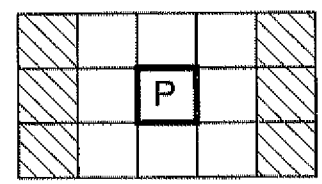

It is appreciated that a dynamic "window" of virtual surfaces may be employed for touch coordinate detection. In particular, different virtual surfaces are typically employed in the computations of the weighted averages for X and Y coordinate computation respectively. For X coordinate computation, a window of 3×5 virtual surfaces may be used, e.g. as shown in FIG. 25*a*. For Y coordinate computation, a window of 5×3 virtual surfaces may be used e.g. as shown in FIG. 25*b*. More generally, typically the window used for x-coordinate computation may include more rows than columns e.g. 5 rather than 3, whereas the window used for y-coordinate computation correspondingly may include more columns than rows.

When the X and Y dimensions of a virtual surface are substantially equal to each other, the X windows and Y window are of the same size, but with rotation. When the X and Y dimensions of a virtual surface are not equal to each other, the X windows and Y window may be chosen so that their resulting areas are equal to each other after rotation.

FIGS. 25*a*-25*d* illustrate portions of the filtered up-scaled matrix generated in step 2030 of the method of FIG. 17. Referring again to windows used to compute x- and y-coordinates of peaks, each almost-adjacent (shown patterned in FIG. 25*c*) virtual surface around the peak, even within the windows as defined above, is typically taken in account for purposes of x, y coordinate computation only if they create a descending pattern (only if the patterned virtual surfaces values are lower or equal to the directly-adjacent (shown white) virtual surfaces values). Typically, if some almost-adjacent surfaces are lower/equal and others are not, the lower/equal ones are taken into account and the higher almost-adjacent surfaces are not.

Typically, if two peaks, 1 and 2, are found within a single window, peak 2 is not taken into account when computing peak 1 location and vice versa, and values of nearby virtual surfaces' filtered virtual readings are distributed or divided between the two peaks. For example, half of such filtered virtual reading may be taken for each of the two peaks location computation. Such filtered virtual readings may also be distributed or divided in other ways, for example proportionally to each of the peaks' values.

Figure 25D:
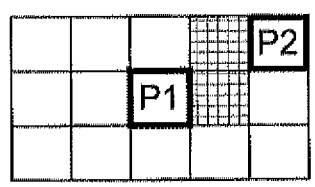

For example, FIG. 25*d* illustrates an X coordinate computation window of peak P1 with an additional peak P2 and with patterned virtual surfaces that are adjacent to both P1 and P2. In the example of FIG. 25*d*, the values of the patterned virtual surfaces are partitioned between the peaks P1 and P2. So, typically, when computing the location of P1 only a portion of the patterned virtual surfaces reading is taken, and the same is the case for P2. The portion taken for each may be proportional to the value of each of the peaks. For example, if the P1 virtual reading is 100 and P2 virtual reading is 200 then for P1 X coordinate computation, only a third of the patterned virtual surfaces may be taken. The outputs of the detection process include X and Y coordinates of one or more touch objects on the touch panel.

The term "secondary peak" refers to a peak added due to detection of two close-together touch objects as a result of the Y-splitting test of step 2140. The term "wide touch" refers to a touching object whose relevant dimensions (of the portion of the object which actually touch the screen) are, say, more than 25 mm wide and more than 50 mm high.

Figure 26C:
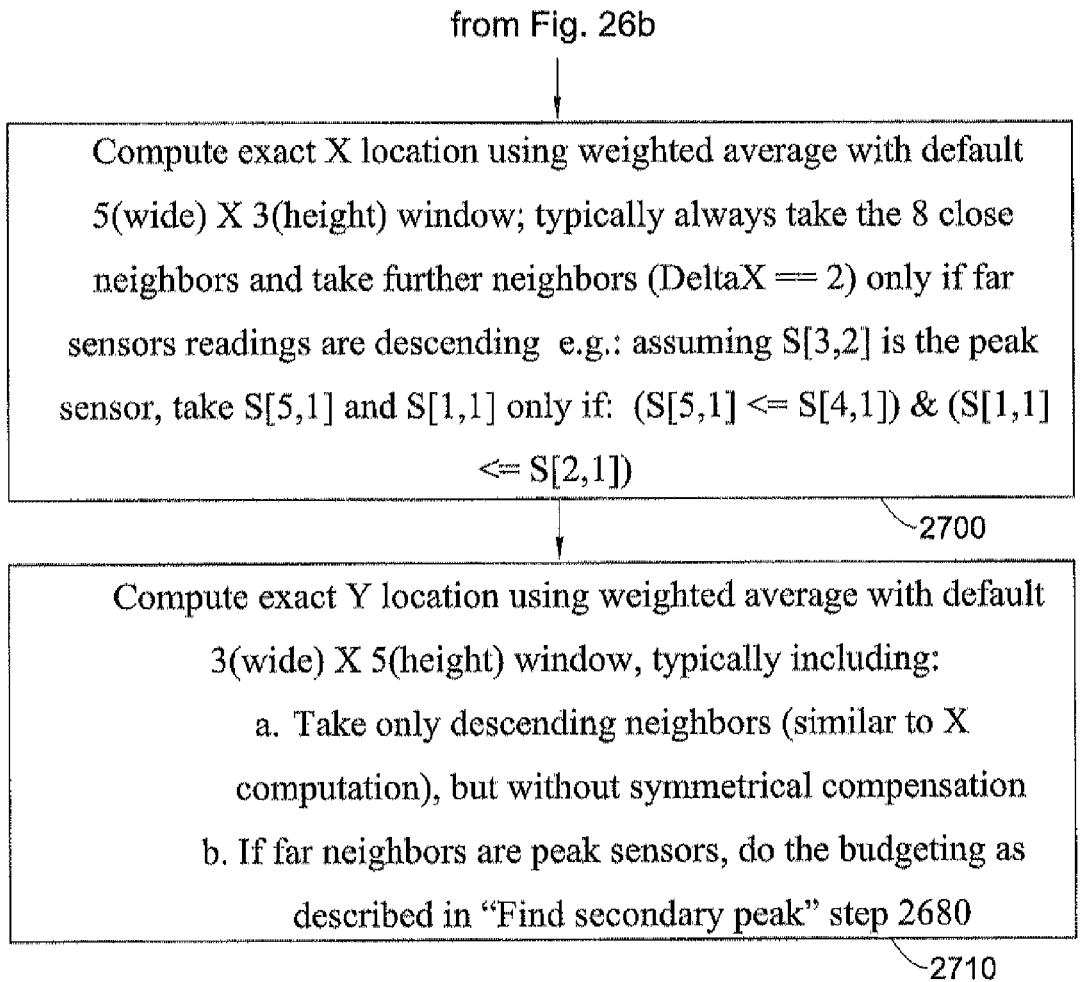

It is appreciated that the localization method shown in FIG. 17 is not intended to be limiting and alternatively, any other suitable localization method may be employed such as the method of FIG. 4d or any other suitable hybrid method combining certain of the features of FIG. 4d and of FIG. 17. Another example is the alternative touch localization method shown in FIGS. 26a-26c.

Figure 33:
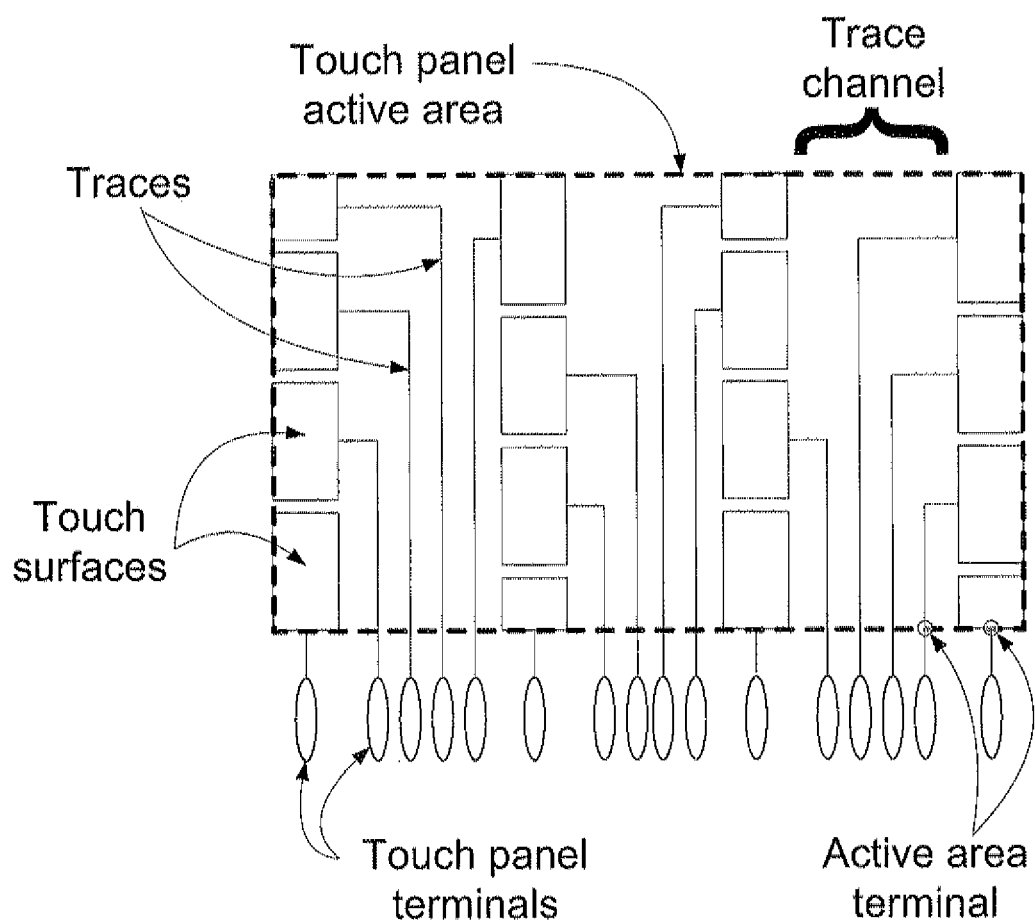
FIG. 33 is an illustration of a frameless layout constructed and operative in accordance with certain embodiments of the present invention.

FIG. 33 is an illustration of an example of a frameless layout for a touch panel, including a plurality e.g. four columns of touch surfaces, each containing a plurality of e.g. four touch surfaces.

In this embodiment, traces are routed only from one side (e.g. the bottom side of the touch panel in the illustrated embodiment). Furthermore, besides the bottom side, no wiring is provided outside the active area of the touch panel, thereby to yield a frameless touch panel.

Typically, the number of traces per trace channel, e.g. as shown in FIG. 33, is kept equal, resulting in uniform distances between the columns which reduce the worst case (widest) trace channel width to a minimum.

Figure 34:
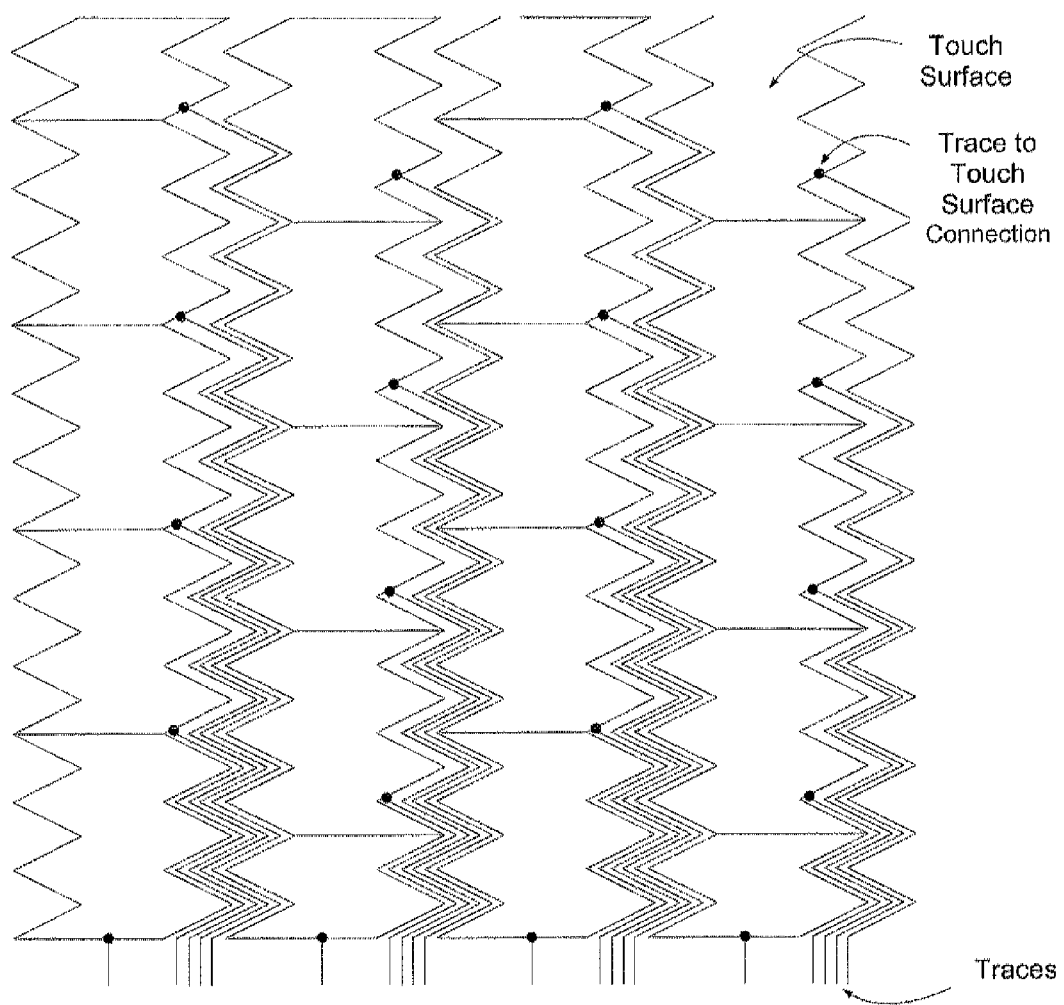
FIG. 34 is an illustration of a zig-zag staggered layout in which the traces pass between the surfaces in non straight lines, constructed and operative in accordance with certain embodiments of the present invention.

FIG. 34 is an illustration of a portion of a zig-zag layout for a touch panel including a plurality e.g. four columns of touch surfaces, with five, say, touch surfaces in each column. Typically, each of the middle (non edge) columns is interleaved with the column on its left and with the column on its right.

The traces in this case are typically longer than in the case of rectangle based layout as for example in FIGS. 27-30, so the traces may be routed through the zigzag space between the columns. One advantage of such a layout is that touch surfaces may be wider such that less touch surfaces are required for covering a touch panel. Another advantage is that the touch surfaces centers are uniformly distributed over the touch panel active area e.g. as opposed to the crowns/castles embodiment herein in which the columns were arranged in couples. As in the crown sensors embodiment, here too, other touch surface shapes, analogous for example to those described herein with reference to the 'combs' and 'castles' embodiment/s, may be used for the embodiments of FIGS. 33, 34 as well.

Figure 37:
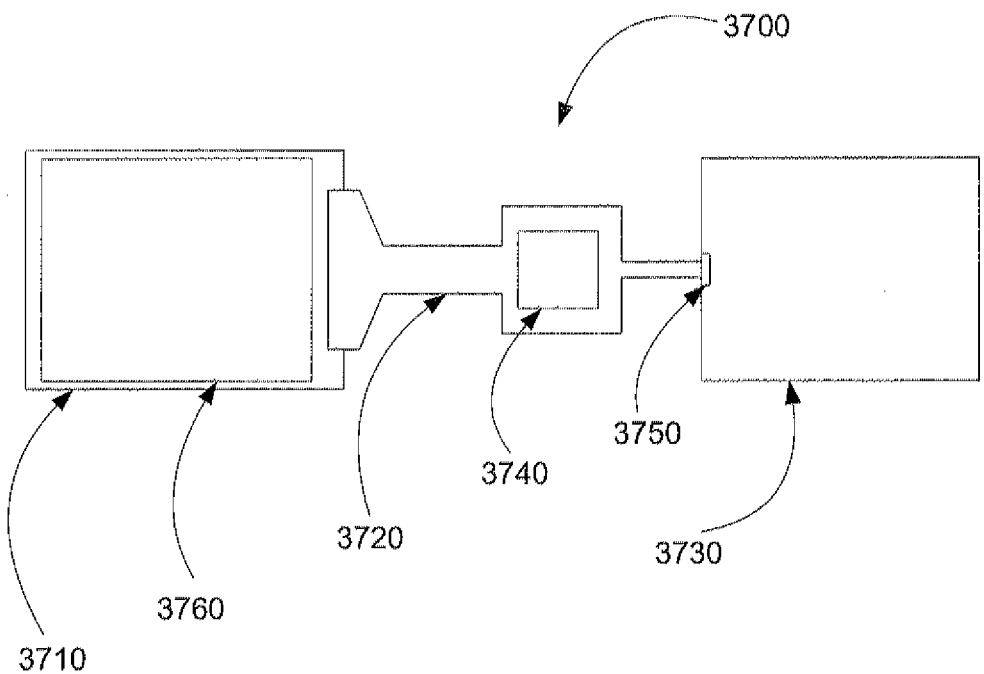
FIG. 37 is a simplified block diagram illustration of a system constructed and operative in accordance with certain embodiments of the present invention which comprises a touch panel 3710, typically a touchscreen, which is constructed and operative in accordance with any of the embodiments shown and described herein.

FIG. 37 is a simplified block diagram illustration of a system 3700 constructed and operative in accordance with certain embodiments of the present invention which comprises a touch panel 3710, typically a touchscreen, which is constructed and operative in accordance with any of the embodiments shown and described herein. The touch panel is typically disposed above a screen active area 3760 such that the active area of the touch panel fully overlaps with the active area of the screen. Typically, the touch panel 3710 comprises an active area beneath which a display is disposed. The touch panel 3710 is connected to a flexible member, also termed herein FPC 3720, with a multiplicity of conductive lines (not shown). The FPC 3720 typically connects the touch panel 3710 with a main board 3730 via a suitable connector 3750. A controller chip 3740, operative to perform some or all of the methods shown and described herein, may be mounted on the FPC 3720. Typically, the controller chip 3740 includes a touch sensing device as described herein, and a processing unit which performs some or all of the touch surface measurement and touch detection operations shown and described herein. The touch controller 3740 then passes the processed data to a main processor (not shown) for further processing e.g. as shown and described herein. Typically, the main board 3730 hosts at least the main processor, main system memory and display controller and may also host other devices.

It is appreciated that in the present specification and claims, the terms "rows" and "columns" need not necessarily refer to linear arrays which are respectively parallel to the horizontal and vertical axes of the touch screen; instead they may refer to other pairs of axes e.g. the vertical and horizontal axes of the touch screen respectively.

When two touch objects touch the touch panel one near the other along the long axis of the touch surface, also referred to here as the Y axis, only one peak may be detected which is an error in most applications. So, according to any embodiment, the combination of peak removal involving 'wide' touch (e.g. as per section ii of step 2340 of FIG. 21b), the Y-refinement procedure e.g. of step 2130 of FIG. 21a and the Y-splitting test (e.g. s per step 2140 of FIG. 21a) serve to identify topologies with a long flat top and sharp slopes on the Y axis and with relatively narrow top on the X axis (to rule out a thumb or a very wide single touch object). Such filtered virtual reading topologies are not likely to be formed by a single touch object. For example, in cases where the long axis of the touch surface is 10 mm to 15 mm, with reference to FIG. 24, cases of two touch objects that yield a single peak may be reflected by high but similar values of E2, E3 and E4, as opposed to low values for E1 and E5.

It is appreciated that terminology such as "mandatory", "required", "need" and "must" refer to implementation choices made within the context of a particular implementation or application described herein for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or clients for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A multi touch sensing module comprising:
a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material,
the module also comprising:
a contact sensing device including touch sensors operative to sense contact between a touching object and at least one of the plurality of electrically conductive touch surfaces; and a processing unit, connected to the co act sensing device, which is operative for: reading self-capacitance measurements generated by the contact sensing device, and resolving the touch sensor measurements into multiple locations of respective multiple objects which have come into contact with the touch surfaces,
wherein said resolving comprises compensating for possible distortion caused by staggering between linear arrays of touch surfaces, by converting readings of sensors connected to touch surfaces into a matrix of computed theoretical capacitance readings of virtual surfaces partitioned from the touch surfaces to form non-staggered rows of surfaces.

2. The module of claim 1 wherein most of the touch surfaces are substantially longer along one dimension than along another dimension.

3. The module of claim 2 wherein the electrically conductive touch surfaces satisfy:

$$0.6*\{stagger\ level\} <= \{row\ pitch\}/\{column\ pitch\} <= 1.8*\{stagger\ level\}).$$

4. The module of claim 1 wherein most traces pass between, rather than through, touch surfaces.

5. The module of claim 1 wherein said rows have a staggering level equal to 2.

6. The module of claim 1 wherein the touch surfaces are rectangular.

7. The module of claim 1 wherein the processing unit times contact sensing measurements carried out by the contact sensing device to occur in groups such that capacitively coupled touch panel elements are not measured simultaneously.

8. The module of claim 1 in which the processing unit adjusts at least one individual touch sensor reading to compensate for known capacitive coupling effects of adjacent touch panel elements on the individual touch sensor reading.

9. The module of claim 1 wherein said resolving comprises identifying sensed peaks on the touch panel.

10. The module of claim 9 wherein said identifying comprises finding peaks which represent possible touches and applying a peak removal test to filter out peaks that do not represent real touches.

11. The module of claim 10 wherein at least one first peak which is adjacent to a second peak with a higher grade than the first peak, is filtered out.

12. The module of claim 9 wherein a peak splitting procedure is applied.

13. The module of claim 9 wherein computing coordinates of each individual peak comprises, for each coordinate along an x or y axis:
computing a weighted average of sensor readings generated by the touch sensors adjacent said individual peak where the weight of each sensor reading comprises a coordinate of a center of the sensor along said axis.

14. The module of claim 1 wherein the traces extend beyond the active area of the touch panel only on one side of the touch panel and not on any side of the touch panel other than said one side.

15. The module of claim 1 wherein the portion of the traces connecting each of at least most of the touch surfaces with a corresponding active area terminal, are routed in non-straight lines such as a sequence of straight segments.

16. The module of claim 1 wherein the portion of the traces connecting each of at least most of the touch surfaces with a corresponding active area terminal, are routed in straight lines.

17. The module of claim 1 wherein said resolving comprises using image processing.

18. The module of claim 1 wherein said resolving comprises using polynomial approximation.

19. A multi touch sensing module comprising:

a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material, the module also comprising:

a contact sensing device including touch sensors operative to sense contact between a touching object and at least one of the plurality of electrically conductive touch surfaces; and a processing unit, connected to the contact sensing device, which is operative for: reading self-capacitance measurements generated by the contact sensing device, and resolving the touch sensor measurements into multiple locations of respective multiple objects which have come into contact with the touch surfaces, wherein said resolving comprises identifying sensed peaks on the touch panel, and in which the processing unit computes X and Y coordinates of peaks using sets of virtual surfaces partitioned from the touch surfaces to form non-staggered rows of surfaces, and wherein more rows of virtual surfaces than columns of virtual surfaces are used for X coordinate computation, and more columns of virtual surfaces than rows of virtual surfaces are used for Y coordinate computation.

20. The module of claim 19 wherein within rows and columns used for coordinate computation, at least one almost-adjacent virtual surface around a peak is used only if the almost-adjacent surface's value is lower than or equal to a more directly-adjacent virtual surface around the peak.

21. The module of claim 19 wherein the processing unit times contact sensing measurements carried out by the contact sensing device to occur in groups such that capacitively coupled touch panel elements are not measured simultaneously.

22. The module of claim 19 in which the processing unit adjusts at least one individual touch sensor reading to compensate for known capacitive coupling effects of adjacent touch panel elements on the individual touch sensor reading.

23. The module of claim 19 wherein said resolving comprises identifying sensed peaks on the touch panel.

24. The module of claim 19 wherein said resolving comprises using image processing.

25. The module of claim 19 wherein said resolving comprises using polynomial approximation.

26. A computer program product, comprising a non-transitory tangible computer readable medium having computer readable program code embodied therein, said computer readable program code adapted to be executed to implement a touch detection method operative in conjunction with a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material, said method comprising:

reading self-capacitance measurements and resolving the touch sensor measurements into multiple locations of respective multiple objects which have come into contact with the touch surfaces, wherein said resolving comprises partitioning virtual surfaces from the touch surfaces to form non-staggered rows of surfaces; and compensating for possible distortion caused by staggering between linear arrays of touch surfaces, by converting readings of sensors connected to touch surfaces into a matrix of computed theoretical capacitance readings of the virtual surfaces.

27. The computer program product of claim 26 wherein most of the touch surfaces are substantially longer along one dimension than along another dimension.

28. The computer program product of claim 26 wherein all traces pass between, rather than through, touch surfaces.

29. Apparatus according to claim 26 residing in a processing unit.

* * * * *